United States Patent
Butani

(10) Patent No.: US 11,036,735 B2
(45) Date of Patent: Jun. 15, 2021

(54) DIMENSION CONTEXT PROPAGATION TECHNIQUES FOR OPTIMIZING SQL QUERY PLANS

(71) Applicant: Oracle International Corporation, Redwood Shores, CA (US)

(72) Inventor: Harish Butani, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 16/248,061

(22) Filed: Jan. 15, 2019

(65) Prior Publication Data

US 2019/0220464 A1 Jul. 18, 2019

Related U.S. Application Data

(60) Provisional application No. 62/617,970, filed on Jan. 16, 2018, provisional application No. 62/747,642, filed on Oct. 18, 2018.

(51) Int. Cl.
| | |
|---|---|
| *G06F 16/2453* | (2019.01) |
| *G06F 16/2455* | (2019.01) |
| *G06F 16/28* | (2019.01) |
| *G06F 16/248* | (2019.01) |

(52) U.S. Cl.
CPC ...... *G06F 16/24542* (2019.01); *G06F 16/248* (2019.01); *G06F 16/2455* (2019.01); *G06F 16/283* (2019.01)

(58) Field of Classification Search
None
See application file for complete search history.

(56) References Cited

U.S. PATENT DOCUMENTS

| | | | |
|---|---|---|---|
| 6,014,656 A | 1/2000 | Hallmark et al. | |
| 6,567,802 B1 * | 5/2003 | Popa | G06F 16/24542 |
| 7,080,062 B1 * | 7/2006 | Leung | G06F 16/24542 |
| 7,133,865 B1 * | 11/2006 | Pedersen | G06F 16/24539 |

(Continued)

OTHER PUBLICATIONS

"Sparkline BI Accelerator", Sparkline Data, Release 0.4.0, Aug. 3, 2018 (date of last commit comment), 6 pages, Retrieved from the Internet: <URL: https://index.scala-lang.org/sparklinedata/spark-druid-olap/spl-accel/0.4.1?target=_2.10>.

(Continued)

*Primary Examiner* — Uyen T Le
(74) *Attorney, Agent, or Firm* — Kilpatrick Townsend & Stockton LLP

(57) ABSTRACT

Techniques for efficient execution of queries. A query plan generated for the query is optimized and rewritten as an enhanced query plan, which when executed, uses fewer CPU cycles and thus executes faster than the original query plan. The query for which the enhanced query plan is generated thus executes faster without compromising the results obtained or the data being queried. Optimization includes identifying a set of one or more fact scan operations in the original query plan and then, in the rewritten enhanced query plan, associating one or more dimension context predicate conditions with one or more of the set of fact scan operations. This reduces the overall cost of scanning and/or processing fact records in the enhanced query plan compared to the original query plan and makes the enhanced query plan execute faster than the original query plan.

20 Claims, 23 Drawing Sheets

(56) References Cited

U.S. PATENT DOCUMENTS

| | | | |
|---|---|---|---|
| 10,528,599 B1* | 1/2020 | Pandis | ............... H04L 67/1097 |
| 2005/0097078 A1* | 5/2005 | Lohman | ............ G06F 16/90335 |
| 2008/0288524 A1* | 11/2008 | Dumitru | ............. G06F 16/2272 |
| 2009/0281985 A1* | 11/2009 | Aggarwal | .............. G06F 16/283 |
| 2013/0117255 A1* | 5/2013 | Liu | ....................... G06F 16/283 |
| | | | 707/714 |
| 2013/0173528 A1 | 7/2013 | Betawadkar-Norwood et al. | |
| 2013/0275364 A1 | 10/2013 | Wang et al. | |
| 2016/0098446 A1 | 4/2016 | Dickie | |

OTHER PUBLICATIONS

Butani, "Analytical Queries: It Pays to Understand the Dimensional Context", Published Jan. 29, 2018, 13 pages, Retrieved from the Internet: <URL: https://www.linkedin.com/pulse/analytical-queries-pays-understand-dimensional-context-harish-butani>.

Butani et al., "Benefits of BI Semantics in Spark SQL: A View Through the TPCDS Benchmark", Sep. 19, 2018, 12 pages, Retrieved from the Internet: <URL: https://medium.com/@rhbutani/https-medium-com-oracle-snap-benefits-of-bi-semantics-in-spark-sql-a-view-through-the-tpcds-benchmark-5cca8d6d25d2>.

Butani, "Combining Druid and Spark: Interactive and Flexible Analytics at Scale", Published on Sep. 18, 2015, 8 pages, Retrieved from the Internet: <URL: https://www.linkedin.com/pulse/combining-druid-spark-interactive-flexible-analytics-scale-butani?trk=portfolio_article-card_title>.

Butani, "Integrated Business Intelligence on Big Data Stacks", Mar. 29, 2017, 14 pages, Retrieved from the Internet: <URL: https://www.linkedin.com/pulse/integrated-business-intelligence-big-data-stacks-harish-butani>.

Chaudhuri, "An Overview of Query Optimization in Relational Systems", Proceedings of the seventeenth ACM SIGACT-SIGMOD-SIGART Symposium on Principles of Database Systems, Seattle, Washington, USA, Jun. 1-4, 1998, pp. 34-43.

Desikan, "Why you Should not Pre-Aggregate Data for Deep Analysis—Multi-Dimensional Analysis at Scale", published on Nov. 29, 2017, 3 pages, Retrieved from the Internet: <URL: https://www.linkedin.com/pulse/why-you-should-pre-aggregate-data-deep-analysis-scale-desikan>.

Jeffcock, "Interactive Data Lake Queries at Scale", Oracle Big Data Blog, Apr. 22, 2018, 8 pages, Retrieved from the Internet: <URL: https://blogs.oracle.com/bigdata/interactive-data-lake-queries-at-scale>.

Luscher et al., Oracle9i Database Performance Tuning Guide and Reference, Release 2 (9.2), Part No. A96533-01, Mar. 2002, 63 pages (2 cover pages and 61 pages Chapter 1: Introduction to the Optimizer).

Sharma et al., "Analysis of Joins and Semi Joins in a Distributed Database Query", International Journal of Computer Applications, vol. 49, No. 16, Jul. 2012, pp. 14-18.

International Application No. PCT/US2019/013827, International Search Report and Written Opinion dated May 20, 2019, 18 pages.

International Application No. PCT/US2019/013827, Invitation to Pay Additional Fees and Partial Search Report dated Mar. 27, 2019, 11 pages.

\* cited by examiner

DIMENSION CONTEXT PROPAGATION TECHNIQUES FOR OPTIMIZING SQL QUERY PLANS

REFERENCES TO OTHER APPLICATIONS

The present application is a non-provisional of and claims the benefit and priority of U.S. Provisional Application No. 62/617,970, filed Jan. 16, 2018, entitled "DIMENSION CONTEXT PROPAGATION TECHNIQUE FOR ANALYTICAL SQL QUERIES," and U.S. Provisional Application No. 62/747,642, filed Oct. 18, 2018, entitled "DIMENSION CONTEXT PROPAGATION TECHNIQUE FOR ANALYTICAL SQL QUERIES." The entire contents of the 62/617,970 and 62/747,642 applications are incorporated herein by reference for all purposes.

BACKGROUND

Analytical solutions enable enterprises to better understand the different activities of their business over dimensions such as time, space, products, and customers. This may include performing contextual or correlation analysis, performance management, what-if analyses, forecasting, slicing-and-dicing analysis, Key Performance Indicators (KPIs) and trends analysis, dash-boarding, and the like. A key aspect of any multidimensional analysis is the dimensional context that specifies both the focus of the analysis and the input of the analysis.

Online analytical processing (OLAP) database systems are often used to mine data and generate reports in order to gain insights or extract useful patterns about a variety of business-related activities. For example, OLAP databases can be used to identify sales trends, analyze marketing campaigns, and forecast financial performance. This typically involves evaluating analytical queries against large amounts (e.g., millions of records) of multi-dimensional database data. For example, sales data can be analyzed in terms of such dimensions as time, geographical region, department, and/or individual products.

Analysts generally have a semantic model in mind about their data. It is common to think of data in terms of dimensions and metrics, where the metrics capture details about an activity (e.g., sales amount, sales quantity), and the dimensions capture the context of the activity (e.g., type of product sold, the store where the sale happened, the state in which the store is located, customer who bought, etc.). Business data is generally multi-dimensional and semantically rich.

A large number of data analytics solutions use a relational database system as the back-end with some query language such as SQL (Structured Query Language) being used as the analysis language. Multi-dimensional database data typically comprises fact records (e.g., sales data) storing the metrics, which are stored separately from dimension records (e.g., time data, geographic data, department data, product data) storing the dimensions or context information. For example, fact records may be stored in fact tables and dimension records may be stored in dimension tables.

In the SQL realm, analytics solutions are built on top of star schemas (named because of how their Entity-Relationship (ER) diagrams look, see FIG. 4) and queried using a SQL query. A typical analysis query may involve several building block query sub-plan/common table expressions that are combined by joins or union. A query sub-plan for a query typically involves a join of a fact table with dimension tables and aggregate calculations on a slice of the multidimensional space. A large portion of the cost of executing a query is typically the scan of the sources of the fact records. Further, analyzing the fact records in terms of dimension records often involves joining the fact records with the dimension records, for example, joining fact tables with dimension tables. However, joining fact records with dimension records can be computationally intensive for at least the reason that it involves processing a significant number of the fact records. Some existing technologies focus on optimizing query execution by using pre-computation, such as using OLAP cubes, extracts and materialized pre-aggregated tables. However, execution improvement provided by these techniques is still limited. Additionally, pre-aggregation has several downsides such as loss of granularity, inability to run ad-hoc queries, and the like.

Compounding the computational overhead is the way in which database queries are often drafted and evaluated. The drafting of database queries is generally outsourced to database programmers, who have little domain or contextual knowledge. Further, drafting such queries in a language such as SQL is quite difficult. Different parts of a query are typically evaluated in a segregated manner, and this can result in unnecessary and duplicative processing of data. For example, due to the manner in which a query is written, a query plan for the query may specify a filter operation at a late stage of the query plan. When a query plan operation is performed at an early stage of the query plan without regard to the filter operation, much of the data processing performed at the early stage may be for naught because much of the data processed at the early stage may be filtered out at the late stage as irrelevant data.

BRIEF SUMMARY

The present disclosure relates generally to execution of queries. More particularly, techniques are described for enhancing query execution performance. Various inventive embodiments are described herein, including methods, systems, non-transitory computer-readable storage media storing programs, code, or instructions executable by one or more processors, and the like.

The present disclosure relates generally to techniques for efficient execution of analytical queries such as ad-hoc database queries. For a query, such as a SQL ad-hoc query, the query plan generated for the query is optimized and enhanced and rewritten as an optimized or enhanced query plan. The enhanced query plan, when executed, uses fewer CPU cycles than the original non-optimized query plan and thus executes faster than the original query plan. As a result, the query for which the enhanced query plan is generated executes faster without compromising the results obtained or the data being queried. In certain embodiments, the optimized or enhanced query plan, when executed, also uses fewer memory resources then the original non-optimized query plan.

In certain embodiments, the original query plan is optimized by identifying a set of one or more fact scan operations/operators in the original query plan and then, in the rewritten enhanced query plan, associating dimension context with one or more of the set of fact scan operations. In certain embodiments, dimension context is associated with a fact scan operation by association one or more predicate conditions (also referred to as dimension context predicate conditions) corresponding to the dimension context with the fact scan operation. A fact scan operation is an operation in a query plan that is configured to scan or read facts (also referred to as fact records or fact rows) from a source of fact records (also referred to as a fact source). The association of a predicate condition with a fact scan operation in the enhanced query plan is also referred to as propagation of the predicate condition or dimension context to the fact scan operation or propagation of the predicate condition or dimension context to the fact source on which the fact scan operation operates. Due to the associations or propagations, the overall cost of scanning/reading and/or processing fact records in the enhanced query plan is a lot less compared to the original query plan. As a result, the enhanced query plan, when executed, uses fewer CPU cycles than the original non-optimized query plan and thus executes faster than the original query plan.

In certain embodiments, the process of optimizing a query plan may include identifying which one or more fact scan operations in the query plan are candidates for predicate condition propagation, identifying the one or more predicate conditions to be associated with each candidate fact scan operation, and then rewriting the query plan with the associations. The query plan for the query is executed with the associations. Various different techniques disclosed herein may be used to perform this processing.

Various different techniques may be used to identify a predicate condition to be associated with a fact scan operation. For example, a predicate condition from one part of the original query plan may be propagated to a fact scan operation in another part of the query plan in the rewritten enhanced query plan. As an example, a dimension predicate condition applied to a dimension table in one part of the query plan, may be propagated and associated with a fact scan operation in another part of the query plan. In some other instances, instead of associating a particular predicate condition with a fact scan operation, a new predicate condition is inferred from the particular predicate condition or from an original predicate condition in the query plan (also referred to as translation or mapping of the particular predicate condition or original predicate condition to the new predicate condition) and the new predicate condition is associated with the fact scan operation instead of the particular predicate or original condition. The new predicate condition is such that the cost (e.g., the time of execution) of executing the fact scan operation with the new predicate condition is less than the cost of executing the fact scan operation with the particular predicate condition or original predicate condition. In some instances, instead of scanning fact records from the fact table referenced in the query, other physical fact structures (fact sources) such as OLAP Indexes, pre-aggregated materialized views may be used for performing the scans.

As indicated above, the enhanced query plan, when executed, uses fewer CPU cycles than the original non-optimized query plan and thus executes faster than the original query plan. There are different ways in which this may be achieved. In certain instances, due to an associating of a predicate condition with a fact scan operation in the query plan, the number of fact records that are processed by the rewritten query plan is reduced compared to the original query plan. For example, as a result of a predicate condition associated with a fact scan operation, only the fact records that satisfy the predicate condition are provided from the fact scan operation to the next downstream operation in the query plan. This reduces the number of fact records that are provided to and have to be processed by downstream operations (e.g., a join operation between a fact table and a dimension table) in the enhanced query plan. This reduces the computational overhead associated with performing the downstream operations in the enhanced query plan. This filtering of fact records based upon the predicate condition reduces unnecessary and duplicative processing of fact records by the query plan. A reduction in the number of fact records processed by the query plan translates to faster execution times for the query plan and thus for the query itself for which the query plan is generated. A reduction in the number of fact records processed by the query plan may also translate to fewer memory resources being used for executing the rewritten query plan. As described above, in certain embodiments, a new predicate condition inferred or translated from a particular predicate condition may be associated with a fact scan operation instead of the particular predicate condition. The new predicate condition is such that the cost (e.g., the time of execution) of executing the fact scan operation with the new predicate condition is less than the cost of executing the fact scan operation with the particular predicate condition. For example, the fact scan operation in association with the particular predicate condition may take 2 seconds to execute, while the same fact scan operation in association with the new predicate condition may only take 1 second to execute. The inferring or translation of predicate condition makes the enhanced query plan execute faster than the non-optimized query plan. Additionally in certain embodiments faster execution times are achieved by performing fact scans on available alternate fact representations such as OLAP Indexes in such a manner so as to leverage the scan capabilities of the fact representation. For example converting to an OLAP Index scan on some predicate "P", such that the combination can leverage fast predicate evaluation and skip scan of OLAP Indexes resulting in, in some cases orders of magnitude reduction in fact scan processing.

From a performance perspective, the enhanced query plans may execute faster and may potentially use fewer resources than non-enhanced query plans. A significant number of queries executed based upon the teachings disclosed herein executed 10×, 25× to even 100×, or even higher order of magnitudes faster than queries with non-enhanced query plans. This is because fact tables are orders of magnitude bigger than dimension tables and so reducing the scan costs associated with processing fact records leads to huge performance gains. For example, in one instance, query execution time for an ad-hoc query was reduced from 206 seconds to 16 seconds.

Various different pieces of information may be used to facilitate the query plan optimization described herein. In certain embodiments, query plans generated for database queries may be optimized and enhanced based upon: structure of the query, structure of the query plan generated for the query, schema information related to the database being queried, and semantics information available to the query plan optimizer and/or enhancer. For example, business semantics or business intelligence (BI) semantics information may be used to rewrite the query plans. The semantics information may include business data having rich value and structural semantics based upon real-world processes, organizational structures, and the like. The semantics information may comprise information about business models like business hierarchies and functional dependencies in data. For example, dependencies information may comprise information describing relationships (e.g., hierarchical or non-hierarchical) between different fields (e.g., columns) of database data. For example, dependency metadata may comprise information describing a hierarchical relationship between values of a "city" column and values of a "state" column (e.g., San Francisco is a city within the state of California). Examples of hierarchies include time period hierarchies (e.g., day, week, month, quarter, year, etc.), geographical hierarchies (e.g., city, state, country), and the like. In certain embodiments, the semantics information may be determined, without any user input, from analyzing information about the structure and schema of the database storing the data being analyzed. Inferences drawn from such analysis may be used to rewrite a query plan to generate an optimized and enhanced query plan.

In certain embodiments, an original query plan generated for a query for querying data stored in a relational database may be received. The original query plan may comprise a first fact scan operation configured to scan fact records from a source of fact records. The original query plan may further comprise a second operation configured to receive a set of records from the first scan operation. A first predicate condition to be associated with the first fact scan operation is identified. The original query plan may be rewritten to generate an enhanced query plan, wherein, in the enhanced query plan, the first predicate condition is associated with the first scan operation, and the second operation receives only those one or more scanned fact records that satisfy the predicate condition. The enhanced query plan executes faster than the original query plan due to the association of the first predicate condition with the first scan operation. The enhanced query plan may be executed to obtain a result set of records for the query. The result set of records maybe provided as a response to the query.

The data being queried by the query (or on which the query is operating) may be non-pre-aggregated data. The analytics platform enables ad-hoc interactive querying of such non-pre-aggregated data.

As indicated above, the enhanced query plan executes faster than the original query plan. This is because the enhanced query plan takes fewer CPU cycles to execute as compared to the original query plan. In some embodiments, this is because a number of fact records received by and processed by the second operation is smaller in the enhanced query plan than in the original query plan.

In certain embodiments, identifying the first predicate condition involves identifying the first fact scan operation as operating on a first fact table in the original query plan. Starting at the first scan operation, the original query plan is then walked to identify a list of one or more applicable predicate conditions for the first fact scan operation, the list of applicable predicate conditions including the first predicate condition.

In certain embodiments, identifying the first predicate condition comprises identifying, from the original query plan, that: the first fact scan operation operates on a first fact table; a second fact scan operation operating on a second fact table; a join operation between the second fact table and a dimension table, wherein the first predicate condition is associated with the dimension table; and a common dimension between the first fact table and the second fact table, wherein the first predicate condition is based upon an attribute from the common dimension.

In certain embodiments, identifying the first predicate condition comprises identifying a plurality of predicate conditions applicable for the first fact scan operation. A net benefit metric is then computed for each predicate condition in the plurality of predicate conditions, wherein the net benefit measure for a particular predicate condition in the plurality of predicate conditions is a measure of a reduction in the cost of processing fact rows from the source of fact records minus the cost of applying the particular predicate condition to the first fact scan operation. The predicate conditions in the plurality of predicate conditions are then ordered based upon the net benefit metrics computed for the plurality of predicate conditions. One or more predicate conditions are then selected for associating with first fact scan operation based upon the ordering. In certain embodiments, a predicate condition with the highest net benefit metric is selected for associating with the first fact scan operation.

In certain embodiments, identifying the first predicate condition comprises identifying an applicable predicate condition for the first fact scan operation. A net benefit metric is computed for the applicable predicate condition. Based upon the net benefit metric computed for the applicable predicate condition, it is determined that the applicable predicate condition is not feasible for associating with the first fact scan operation. Another predicate condition to be associated with the first fact scan operation is then inferred from the applicable predicate condition using functional dependencies information.

The source of fact records may be of multiple types including a table storing fact records, a materialized view, or an online analytical processing (OLAP) index.

In certain embodiments, identifying the first predicate condition comprises identifying a third operation in the original query plan, wherein the first predicate condition is associated with the third operation. The third operation may be associated with a dimension table in the original query plan.

In certain embodiments, identifying the first predicate condition comprises identifying a second predicate condition to be associated with the first scan operation, and translating the second predicate condition to the first predicate condition. The translating may comprise using functional dependencies information to translate the second predicate condition to the first predicate condition. In one instance, the second predicate condition specifies a value for a first dimension field and the first predicate condition specifies a value for a second dimension field different from the first dimension field, wherein the second dimension field is a column field in a dimension table or in the source of fact records.

In certain embodiments, a first sub-plan may be identified in the original query plan, the first sub-plan comprising the first fact scan operation, wherein the first sub-plan only comprises one or more aggregate, join, project, filter, or fact scan operations. The enhanced query plan when generated may include the first sub-plan with the first predicate condition being associated with the first scan operation.

In certain embodiments, the processing may include determining, based upon a star schema, that the source of fact records is capable of being joined with a dimension table, and wherein the first predicate condition includes a condition related to a dimension key in the dimension table to be joined with the source of fact records.

In certain embodiments, the source of fact records is an OLAP index, the OLAP index comprising a table and an index indexing dimension values in the table. The table may comprise data resulting from joining a fact table storing fact records with a dimension table comprising the dimension values, and the first predicate condition is evaluated against the dimension values in the OLAP index.

The foregoing, together with other features and embodiments will become more apparent upon referring to the following specification, claims, and accompanying drawings.

DETAILED DESCRIPTION

Figure 1A:
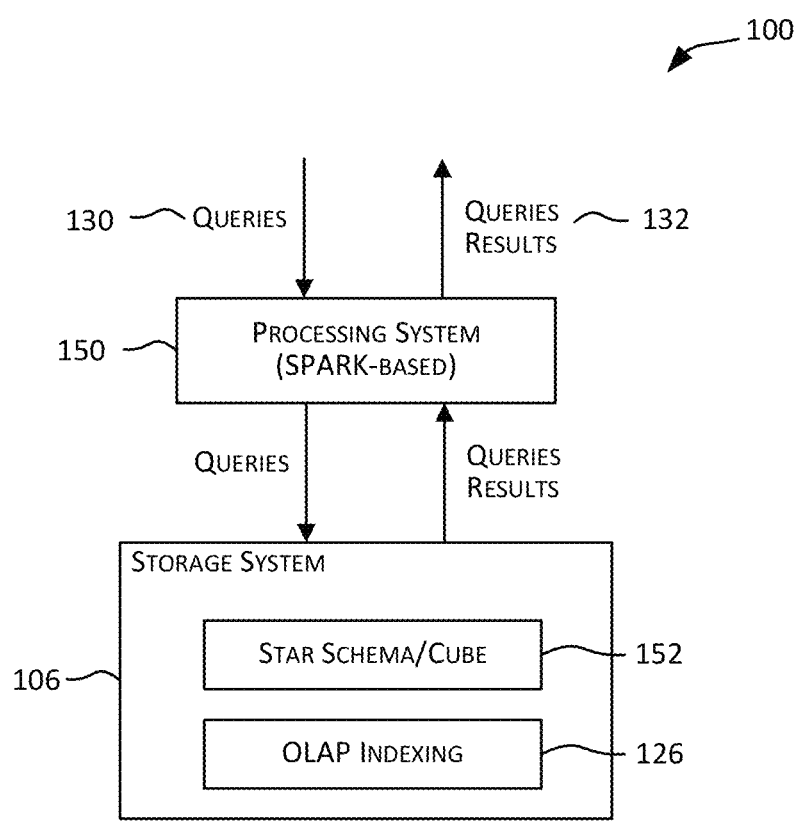
FIGS. 1A and 1B are simplified block diagrams of an analytics platform, in accordance with certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive.

The present disclosure relates generally to techniques for efficient execution of analytical queries such as interactive ad-hoc database queries. For a query, such as a SQL ad-hoc query, the query plan generated for the query is optimized and enhanced and rewritten as an optimized or enhanced query plan. The enhanced query plan, when executed, uses fewer CPU cycles than the original non-optimized query plan and thus executes faster than the original query plan. As a result, the query for which the enhanced query plan is generated executes faster without compromising the results obtained or the data being queried. In certain embodiments, the optimized or enhanced query plan, when executed, also uses fewer memory resources then the original non-optimized query plan.

In certain embodiments, the original query plan is optimized by identifying a set of one or more fact scan operations/operators in the original query plan and then, in the rewritten enhanced query plan, associating dimension context with one or more of the set of fact scan operations. In certain embodiments, dimension context is associated with a fact scan operation by association one or more predicate conditions (also referred to as dimension context predicate conditions) corresponding to the dimension context with the fact scan operation. A fact scan operation is an operation in a query plan that is configured to scan or read facts (also referred to as fact records or fact rows) from a source of fact records (also referred to as a fact source). The association of a predicate condition with a fact scan operation in the enhanced query plan is also referred to as propagation of the predicate condition to the fact scan operation or propagation of the predicate condition to the fact source on which the fact scan operation operates. Due to the associations or propagations, the overall cost of scanning/reading and/or processing fact records in the enhanced query plan is a lot less compared to the original query plan. As a result, the enhanced query plan, when executed, uses fewer CPU cycles than the original non-optimized query plan and thus executes faster than the original query plan.

In certain embodiments, the process of optimizing a query plan may include identifying which one or more fact scan operations in the query plan are candidates for predicate condition propagation, identifying the one or more predicate conditions to be associated with each candidate fact scan operation, and then rewriting the query plan with the associations. The query plan for the query is executed with the associations. Various different techniques disclosed herein may be used to perform this processing.

Various different techniques may be used to identify a predicate condition to be associated with a fact scan operation. For example, a predicate condition from one part of the original query plan may be propagated to a fact scan operation in another part of the query plan in the rewritten enhanced query plan. As an example, a dimension predicate condition applied to a dimension table in one part of the query plan, may be propagated and associated with a fact scan operation in another part of the query plan. In some other instances, instead of associating a particular predicate condition with a fact scan operation, a new predicate condition is inferred from the particular predicate condition or from an original predicate condition in the query plan (also referred to as translation or mapping of the particular predicate condition to the new predicate condition) and the new predicate condition is associated with the fact scan operation instead of the particular or predicate condition. The new predicate condition is such that the cost (e.g., the time of execution) of executing the fact scan operation with the new predicate condition is less than the cost of executing the fact scan operation with the particular predicate condition or original predicate condition. In some instances, instead of scanning fact records from the fact table referenced in the query, other physical fact structures (fact sources) such as OLAP Indexes, Pre-aggregated materialized views may be used for performing the scans.

As indicated above, the enhanced query plan, when executed, uses fewer CPU cycles than the original non-optimized query plan and thus executes faster than the original query plan. There are different ways in which this may be achieved. In certain instances, due to an associating of a predicate condition with a fact scan operation in the query plan, the number of fact records that are processed by the rewritten query plan is reduced compared to the original query plan. For example, as a result of a predicate condition associated with a fact scan operation, only the fact records that satisfy the predicate condition are provided from the fact scan operation to the next downstream operation in the query plan. This reduces the number of fact records that are provided to and have to be processed by downstream operations (e.g., a join operation between a fact table and a dimension table) in the enhanced query plan. This reduces the computational overhead associated with performing the downstream operations in the enhanced query plan. This filtering of fact records based upon the predicate condition reduces unnecessary and duplicative processing of fact records by the query plan. A reduction in the number of fact records processed by the query plan translates to faster execution times for the query plan and thus for the query itself for which the query plan is generated. A reduction in the number of fact records processed by the query plan may also translate to fewer memory resources being used for executing the rewritten query plan. As described above, in certain embodiments, a new predicate condition inferred or translated from a particular predicate condition may be associated with a fact scan operation instead of the particular predicate condition. The new predicate condition is such that the cost (e.g., the time of execution) of executing the fact scan operation with the new predicate condition is less than the cost of executing the fact scan operation with the particular predicate condition. For example, the fact scan operation in association with the particular predicate condition may take 2 seconds to execute, while the same fact scan operation in association with the new predicate condition may only take 1 second to execute. The inferring or translation of predicate condition makes the enhanced query plan execute faster than the non-optimized query plan. Additionally in certain embodiments faster execution times are achieved by performing fact scans on available alternate fact representations such as OLAP Indexes in such a manner so as to leverage the scan capabilities of the fact representation. For example converting to an OLAP Index Scan on some predicate "P", such that the combination can leverage fast predicate evaluation and skip scan of OLAP Indexes resulting in, in some cases orders of magnitude reduction in fact scan processing.

From a performance perspective, the enhanced query plans may execute faster and may potentially use fewer resources than non-enhanced query plans. A significant number of queries executed based upon the teachings disclosed herein executed 10×, 25× to even 100×, or even higher order of magnitudes faster than queries with non-enhanced query plans. This is because fact tables are orders of magnitude bigger than dimension tables and so reducing the scan costs associated with processing fact records leads to huge performance gains. For example, in one instance, query execution time for an ad-hoc query was reduced from 206 seconds to 16 seconds. Queries can be executed in sub-seconds on large data set (e.g., terabyte data sets).

Various different pieces of information may be used to facilitate the query plan optimization described herein. In certain embodiments, query plans generated for database queries may be optimized and enhanced based upon: structure of the query, structure of the query plan generated for the query, schema information related to the database being queried, and semantics information available to the query plan optimizer and/or enhancer. For example, business semantics or business intelligence (BI) semantics information may be used to rewrite the query plans. The semantics information may include business data having rich value and structural semantics based upon real-world processes, organizational structures, and the like. The semantics information may comprise information about business models like business hierarchies and functional dependencies in data. For example, dependencies information may comprise information describing relationships (e.g., hierarchical or non-hierarchical) between different fields (e.g., columns) of database data. For example, dependency metadata may comprise information describing a hierarchical relationship between values of a "city" column and values of a "state" column (e.g., San Francisco is a city within the state of California). Examples of hierarchies include time period hierarchies (e.g., day, week, month, quarter, year, etc.), geographical hierarchies (e.g., city, state, country), and the like. The semantics information may include data cube model semantics information. In certain embodiments, the metadata used for query plan enhancement may include information about how the data being analyzed is stored physically and also logical information identify the relationships between the data. In certain embodiments, the semantics information may be determined, without any user input, from analyzing information about the structure and schema of the database storing the data being analyzed. Inferences drawn from such analysis may be used to rewrite a query plan to generate an optimized and enhanced query plan.

For example, a query plan generated for a query may be analyzed to identify fact scan operations on fact sources. Semantics information (e.g., join operations of fact and dimension context tables, functional dependencies among columns of a database, physical materialization of facts) may then be used to actively identify and push dimensional context conditions on the fact scanning operations in a rewritten optimized query plan. This leads to a significant reduction in the costs (e.g., time) involved for processing fact records in the rewritten query plan. The rewritten query plan thus executes faster (e.g., uses fewer CPU cycles) and may, in many instances, use fewer memory resources than the non-optimized query plan. This translates to the query for which the query plan is generated executing faster and potentially using fewer memory resources.

FIG. 1A is a simplified block diagram of an analytics platform or infrastructure 100 incorporating an example embodiment. Analytics platform 100 may comprise multiple systems communicatively coupled to each other via one or more communication networks. The systems in FIG. 1A include a processing system 150 and a storage system 106 communicatively coupled to each other via one or more communication networks. The communication networks may facilitate communications between the various systems depicted in FIG. 1A. The communication network can be of various types and can include one or more communication networks. Examples of such a communication network include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. The communication network may include any infrastructure that facilitates communications between the various systems depicted in FIG. 1A.

Analytics platform 100 depicted in FIG. 1A is merely an example and is not intended to unduly limit the scope of claimed embodiments. The platform can elastically scale out as needed to accommodate changes in the size of the data being queried and changes in workload (e.g., the number of queries being performed in parallel or otherwise). One of ordinary skill in the art would recognize many possible variations, alternatives, and modifications. For example, in some implementations, analytics platform 100 may have more or fewer systems or components than those shown in FIG. 1A, may combine two or more systems, or may have a different configuration or arrangement of systems. Further, the infrastructure depicted in FIG. 1A and described herein can be implemented in various different environments including a standalone or cluster embodiment, as an on-premise or cloud environment (could be various types of clouds including private, public, and hybrid cloud environments), on-premises environment, a hybrid environment, and the like.

In certain embodiments, the data to be analyzed or queried may be stored by storage system 106. The data stored in storage system 106 may come from one or multiple data sources. The data may be organized and stored in various forms such as an object store, block store, just a bunch of disks (jbod), as in disks on the compute nodes, and the like, and combinations thereof. Storage system 106 may comprise volatile memory and/or non-volatile memory for storing the data. For example, storage system 106 may include a database storing business data that is to be analyzed. Business data is generally multi-dimensional and semantically rich. Storage system 106 represents the storage layer of analytics platform 100 comprising physical storage components (e.g., rotational hard disks, SSDs, memory caches, etc.) that persist data, and also contain software that provides myriad data structures for the storage of relational/spatial/graph data in ways that optimally serve specific query workloads. The data in storage system 106 does not have to be all located in one location but can be stored in a distributed manner. The data may be organized and stored in various storage/computing environments such as a data lake, a data warehouse, a Hadoop cluster, and the like.

The memory resources of storage system 106 and processing system 150 may include a system memory and non-volatile memory. System memory may provide memory resources for the one or more processors. System memory is typically a form of volatile random access memory (RAM) (e.g., dynamic random access memory (DRAM), Synchronous DRAM (SDRAM), Double Data Rate SDRAM (DDR SDRAM)). Information related to an operating system and applications or processes executed by the one or more processors may be stored in system memory. For example, during runtime, an operating system/kernel may be loaded into system memory. Additionally, during runtime, data related to one or more applications executed by a server computer may be loaded into system memory. For example, an application being executed by a server computer may be loaded into system memory and executed by the one or more processors. A server computer may be capable of executing multiple applications in parallel.

Non-volatile memory may be used to store data that is to be persisted. Non-volatile memory may come in different forms such as a hard disk, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like. In certain instances, when an application is deployed to or installed on a server computer, information related to the application may be stored in non-volatile memory.

In certain embodiments, the data in storage system 106 may be stored in a relation database in tables that are logically structured as one or more star schemas, or in systems with specialized storage structures such as multi-dimensional arrays (also commonly called multi-dimensional cubes). A star schema comprises of a central fact table referencing any number of dimension tables. Each fact table stores facts or metrics in the form of fact records. The fact tables may be linked to dimension tables that associate the facts with their context. The dimension tables store context information that describes the metrics data stored in the fact table rows. Since a fact table is usually associated with many dimensions, graphically the structure appears like a star hence the name. There is generally an order of magnitude difference between the number of facts and the number of unique dimensions values with the facts greatly outnumbering the dimensions. For example, there may be hundreds of millions of sales fact records for an enterprise, but just a few dimensions (e.g., a few thousand) such as stores, states where sold, etc. As a result, sizes of fact tables are generally very large, and an order of magnitude larger than dimension tables The term star schema is used here in its most general form to capture the logical relation between fact rows with many dimension table rows; so variations like snowflake schemas are also implied and included under the term star schema as used in this disclosure. Snow flake schemas distinguish from star schemas on the point that the relation between fact rows and dimensions could be indirect (requiring more than a direct association, for example sales fact rows link to a customer row that links to a customer address row).

Another way to look at analytical data is as an n-dimensional cube. A typical analysis focuses on some arbitrary subspace (also called a slice) of this vast multi-dimensional space. The focus of any particular analysis can span multiple dimensions and activities, can have multiple steps, involve arbitrary linkages between entities and their activities. In the relational world, data cubes may be modeled as star schemas.

Figure 4:
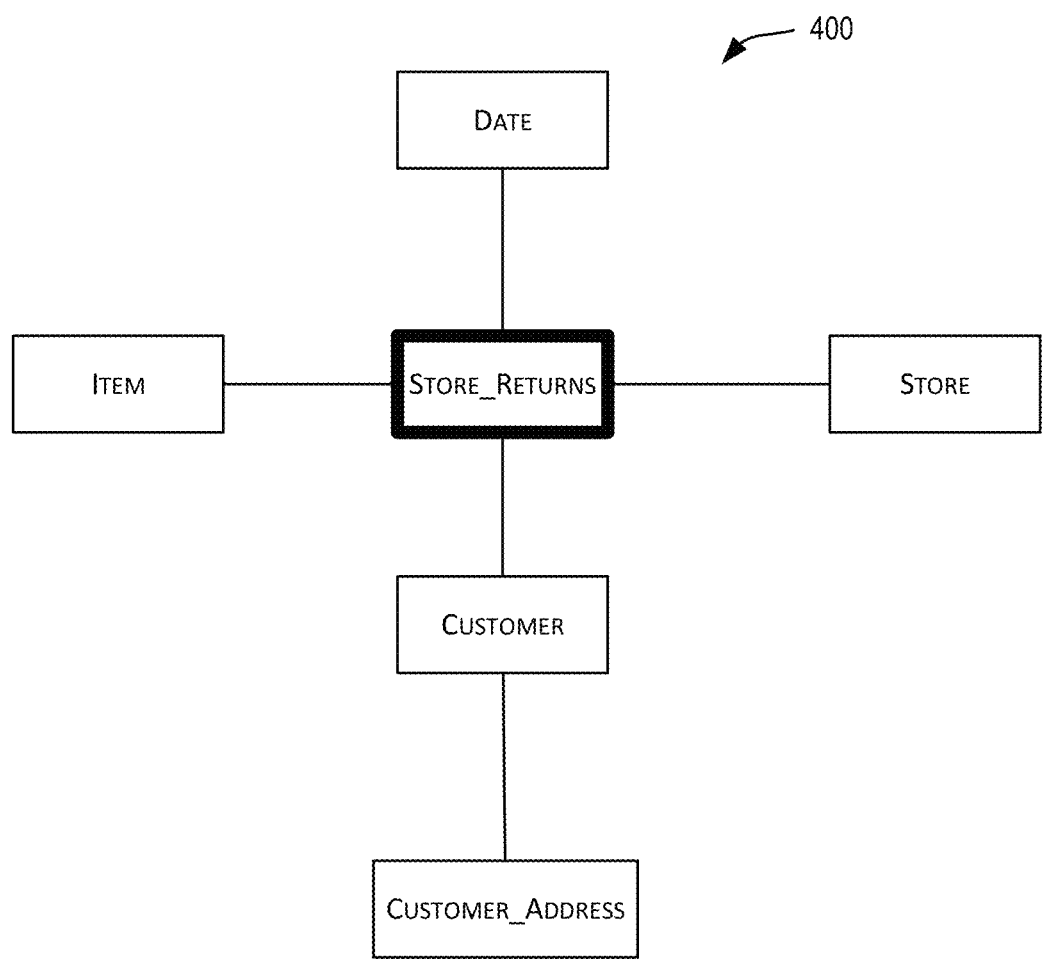
FIG. 4 depicts a star schema, in accordance with certain embodiments.

In a relational database, an event or transaction (e.g., the sale of a product) may be captured in a large fact table that joins to many dimension tables. An analytics solution may comprise many such star schemas where the fact tables have a common set of dimensions. FIG. 4 depicts an example star schema 400 corresponding to data related to transactions for store returns. Schema 400 captures the store return transactions and describes one-to-many relationships between fact records and dimension records. Per schema 400 depicted in FIG. 4, Store_Returns is a fact table (shown using an emphasized border) storing fact records containing metrics information related to store return transactions, and the other tables (Date, Store, Item, Customer, Customer_Address) are dimension tables storing context information for the fact records. Each return transaction is recorded with associated context including information about the store where returned including the store identifier, the city and state, information about the customer who returned the item, and time information (month, day, year) of the transaction. Star schema 400 indicates that the store returns are dimensioned by Date, Customer, Item, Store, and Customer_Address dimension records and can be joined with Store_Returns fact records.

Figure 2:
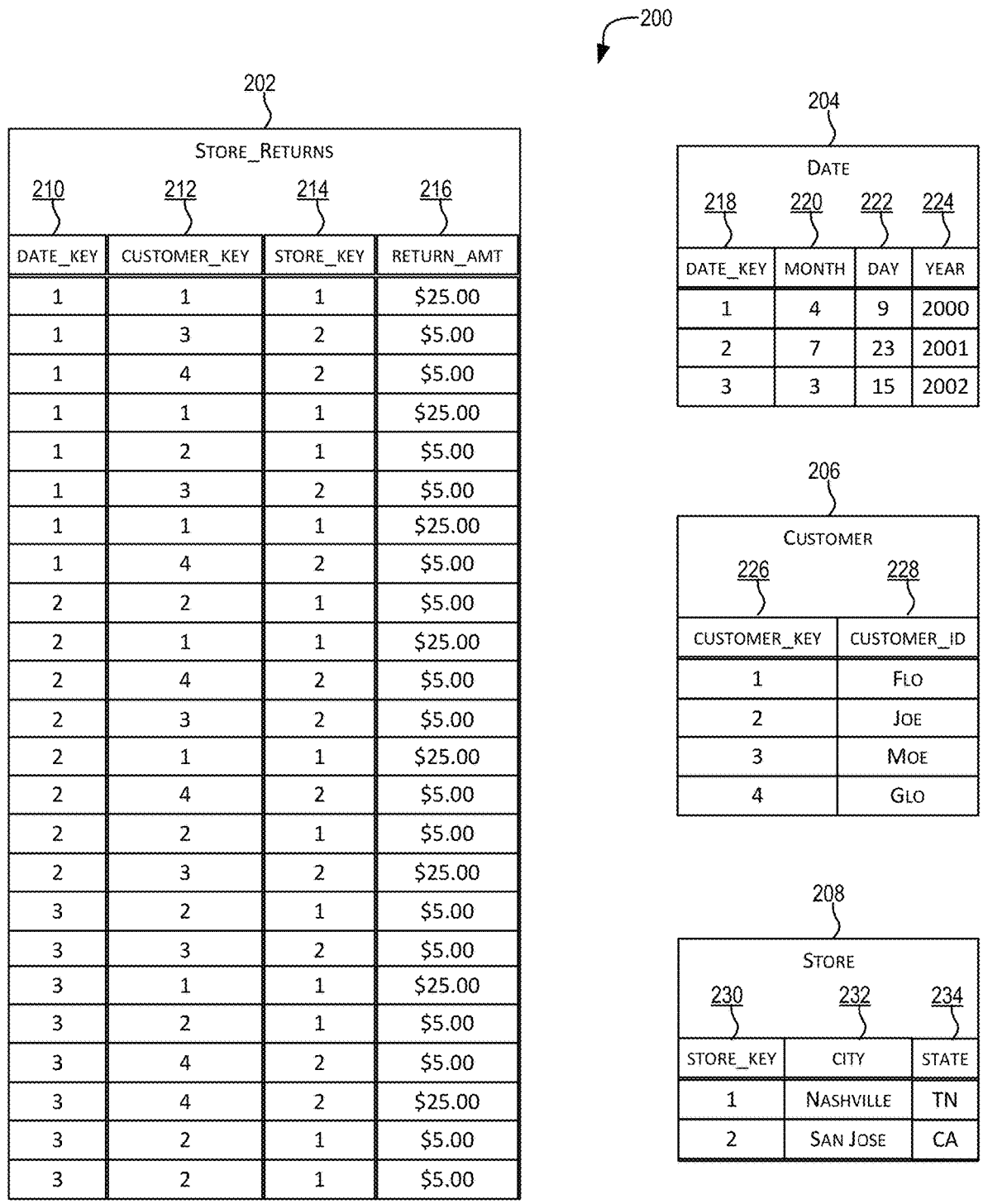
FIG. 2 depicts a set of fact and dimension tables, in accordance with certain embodiments.

FIG. 2 depicts example database data 200 comprising a fact table 202 and a plurality of dimension tables 204-208 that are each related to fact table 202 corresponding to star schema 400 depicted in FIG. 4. Fact table 202 comprises foreign key columns 210, 212, and 214 that can be joined with primary key columns 218 in table 204, 226 in table 206, and 230 in table 208, respectively, to add columns but not rows to fact table 202. Although FIG. 2 depicts database data 200 as tables, it should be appreciated that database data 200 can be represented as indices, materialized views, and/or any other set of tuples.

In the example of FIG. 2, fact table 202 further comprises fact records storing a fact metric column 216 (return_amt). Foreign key columns 210, 212, and 214 enable fact metric column 216 to be analyzed in terms of one or more dimension columns, such as dimension columns 220, 222, 224, 228, 232, and 234. Generally, and as depicted in FIG. 2, there are typically many more fact records than dimension records. For example, fact records may number in the millions, whereas dimension records may number in the thousands.

Processing system 150 may be configured to enable analysis of the data stored by storage system 106. The analysis may be performed using analytical queries, such as SQL queries. Processing system 150 may be configured to receive one or more queries 130. In certain use cases, queries 130 may be input by a user using an interface provided by processing system 150. In other cases, queries 130 may be received by processing system 150 from other applications, systems or devices. In some use cases, processing system 150 may generate its own queries.

In certain embodiments, for a query, processing system 150 is configured to generate an enhanced query plan for the query. Various different techniques described below in more detail may be used to generate the enhanced query plan. Processing system 150 may then execute the enhanced query plan against the data stored by storage system 106 and generate a result set. Processing system 150 may then output the result set as a response to the received query.

As in the embodiment depicted in FIG. 1A, OLAP indexing 126 (e.g., OLAP indexes) may be provided for very quickly scanning/reading facts from fact sources in a relational database. In certain embodiments, processing system 150 may be configured to generate one or more of OLAP indexes 126.

Figure 16:
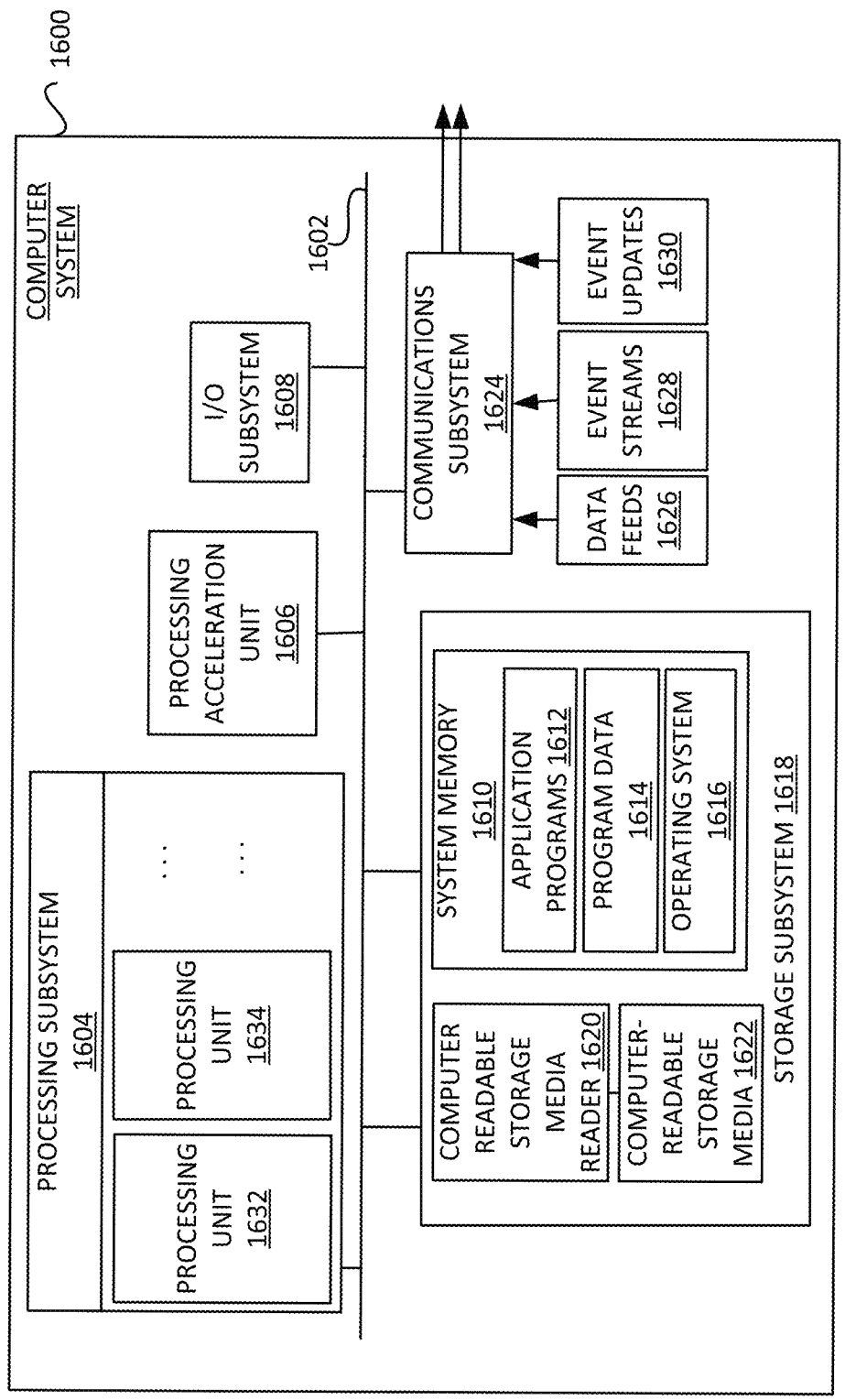
FIG. 16 illustrates a computer system that may be used to implement certain embodiments.

In certain embodiments, analytics platform 100 depicted in FIG. 1A may run on a cluster of one or more computers. For example, analytics platform 100 may be implemented using a distributed computing framework provided by Apache Spark or Apache Hadoop. Each computer may comprise one or more processors (or Central Processing Units (CPUs)), memory, storage devices, a network interface, I/O devices, and the like. An example of such a computer is depicted in FIG. 16 and described below. The one or more processors may comprise single or multicore processors. Examples of the one or more processors may include, without limitation, general purpose microprocessors such as those provided by Intel®, AMD®, ARM®, Freescale Semiconductor, Inc., and the like, that operate under the control of software stored in associated memory. The software components of analytics platform 100 may run as applications on top of an operating system. An application executed by a server computer may be executed by the one or more processors.

As a result of the enhanced query plan generated by processing system 150, the execution of the query for which the enhanced query plan is generated is made faster. This translates to faster response times for the queries. These fast response times enable analysis of the multidimensional data stored in storage system 106 in an interactive manner without compromising the results or the data being analyzed. Interactive queries may be run, for example, against data associated with machine learning technologies, click streams and event/time-series, and more generally against any datasets that can quickly grow in size and complexity.

Further, the queries are run directly on the data stored in databases in storage system 106, and not on any pre-aggregated data. The queries can thus be run on large datasets in-place without the need to create pre-aggregate data or extracts. Instead, querying can be performed on the actual original raw data itself. In certain embodiments, the querying is made faster by using predicate conditions and using in-memory OLAP indexes with a fully distributed compute engine, as described herein. This enables analytics platform 100 to facilitate ad-hoc queries, which cannot be run on pre-aggregated data. An ad-hoc query is one that is not pre-defined. An ad-hoc query is generally created to analyze information as it becomes available. Analytics platform 100 described herein provides the ability to run interactive ad-hoc queries on very large (terabytes and beyond) multidimensional data (e.g., data stored in a data lake) in a very cost effective manner; running such interactive ad-hoc queries on very large (terabytes and beyond) multidimensional data in the past using conventional techniques was very cost prohibitive and did not scale.

Further, the implementation of the analytics platform using Apache Spark natively enables the querying to be performed at scale. An elastic environment is provided where computer and storage (e.g., new data being available for analysis) can scale independently.

In analytics platform 100, the data to be queried is stored in a central location from where it can be analyzed using one or more different analysis tools. Unique preparations of the data to enable by different tools is not needed. Different users can access data with their tools of choice including Zeppelin or Jupyter notebooks running Python or R, BI tools like Tableau, and the like.

Performing interactive querying at scale is difficult for large volumes of multidimensional data. This is because interactive querying requires fast response times. For large amounts of multidimensional data, query performance gets degraded as the volume of data (e.g., terabytes of data) increases and as the number of users trying to access the datasets at the same time increases. Further, joins between fact and dimension tables can cause additional performance bottlenecks. In the past, pre-aggregation techniques have been used to alleviate this problem. For example, OLAP cubes, extracts and materialized pre-aggregated tables have been used to facilitate the analysis of multidimensional data.

Pre-aggregated data (also referred to as aggregated data or aggregates) is data that has been generated from some underlying data (referred to as original or raw data) using one or more pre-aggregation (or aggregation) techniques. Data aggregation or pre-aggregation techniques includes any process in which data is expressed in a summary form. Pre-aggregated data may include precomputed or summarized data, and may be stored in pre-aggregated tables, extracts, OLAP cubes, etc. When facts are aggregated, it is either done by eliminating dimensionality or by associating the facts with a rolled up dimension. Thus pre-aggregated data does not include all the details from the original or raw data from which the per-aggregated data is generated.

However, pre-aggregation has several downsides. All pre-aggregation techniques result in loss of granularity. Pre-aggregation results in loss in details of the data since only certain pre-determined pre-aggregations are provided. For example, the original or raw dataset may records sales information on a per day basis. If pre-aggregation based upon per month is then performed on this data, the per-day or daily information is lost. It is impractical to build pre-aggregation data sets or cubes for all combinations of all dimensions and metrics. Pre-aggregation thus limits the ability to perform ad-hoc querying because key information behind (e.g., the per day information) the higher-level pre-aggregated summaries (e.g., per month information) is not available. The queries are run against the pre-aggregated data, and not on the original or raw data from which the pre-aggregations were generated. Aggregation thus changes the grain at which analysis may be performed. The grain of facts refers to the lowest level at which events are recorded. For example, sales of a product may be recorded with sale time and a timestamp. Aggregation of the sales can be across multiple levels such as revenue by channel and product or revenue by category, product, store, state, etc. The ability to explore data at multiple granularities and dimensions is important. The right granularity for pre-aggregation is difficult to anticipate in advance. Thus, pre-aggregated cubes and materialized summary tables break down when it comes to Big Data analytics.

Analytics platform 100 avoids the various downsides associated with pre-aggregation based analyses techniques. Analytics platform 100 provides a framework for performing data analysis of multidimensional data at different granularities and dimensions at scale and speed.

For purposes of this application, the term "non-pre-aggregated data" is used to refer to data that does not include pre-aggregated or pre-computed data. In certain embodiments, analytics platform 100 enables querying to be performed on non-pre-aggregated data stored in storage system 106. This enables ad-hoc querying to be performed on the non-pre-aggregated data stored in storage system 106. Additionally, because of the query plan enhancements provided by processing system 150, the response time for the queries is dramatically reduced, thus enabling for interactive queries to be run. Analytics platform 100 described herein provides the ability to run interactive ad-hoc queries on very large (terabytes and beyond) multidimensional data (e.g., data stored in a data lake) in a very cost effective manner; running such interactive ad-hoc queries on very large (terabytes and beyond) multidimensional data in the past using conventional techniques was very cost prohibitive and did not scale.

Figure 1B:
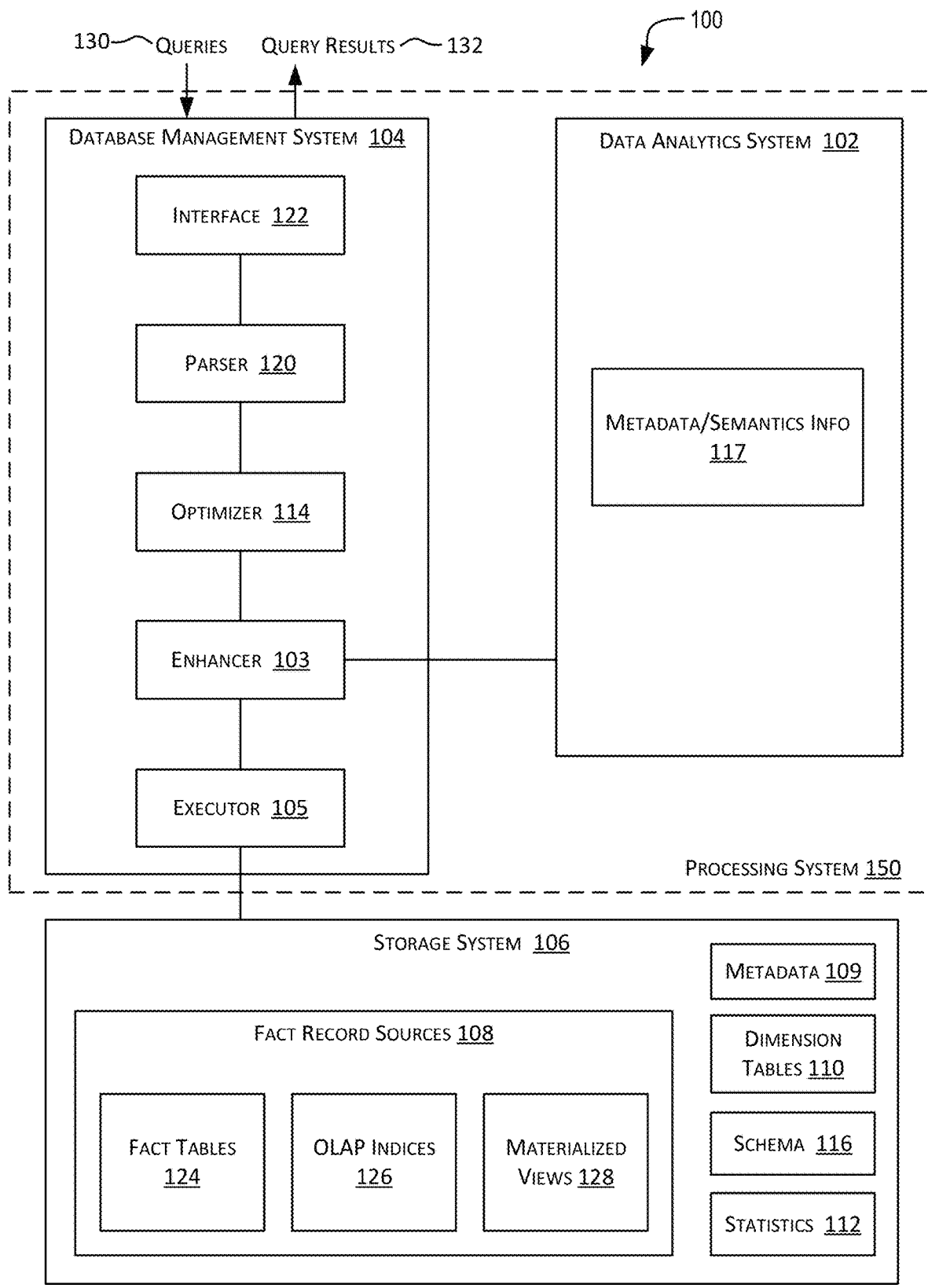

FIG. 1B is a simplified block diagram showing a more detailed view of analytics platform 100 depicted in FIG. 1A according to certain embodiments. Analytics platform 100 depicted in FIG. 1B is merely an example and is not intended to be limiting. One of ordinary skill in the art would recognize many possible variations, alternatives, and modifications. For example, in some implementations, data analytics platform 100 may have more or fewer components than those shown in FIG. 1B, may combine two or more components, or may have a different configuration or arrangement of components. Further, the infrastructure depicted in FIG. 1B and described herein can be implemented in various different environments including a stand-alone embodiment, a cloud environment (could be various types of clouds including private, public, and hybrid cloud environments), on-premises environment, a hybrid environment, and the like.

In the example of FIG. 1B, processing system 150 depicted in FIG. 1A comprises a data analytics system 102 and a database management system (DBMS) 104 that may be communicatively coupled to each other and also to storage system 106. In some embodiments, data analytics system 102, DBMS 104, and storage system 106 may represent different logical layers of an OLAP database system. In some embodiments, data analytics system 102, DBMS 104, and storage system 106 may be physically separate systems. In other embodiments, they may be combined into one system. DBMS 104 and data analytics system 102 together provide a powerful analytics platform that combines business intelligence techniques with the capabilities of Apache Spark.

Storage system 106 may store the data to be analyzed in fact and dimension tables. As shown in FIG. 1B, there may be multiple sources 108 of the fact records including fact tables 124, OLAP indexes 126, materialized views 128, and/or other sources. A fact table 124 may comprises one or more rows and one or more columns, where each row may represent a fact record and the columns may represent fields of the records. In some embodiments, storage system 106 may be distributed and/or virtualized within environment 100.

Storage system 106 may also store the context associated with the fact records as one or more dimension tables 110 storing one or more dimension records. Typically, fact records stores values for a metric that can be analyzed in terms of dimension records in dimension tables 110. For example, fact records may comprise sales amounts, and dimension records may comprise date values according to which the sales amounts can be aggregated, filtered, or otherwise analyzed. Fact record sources 108 (e.g., fact tables, OLAP indexes, and materialized views) and dimension tables 110 and records are discussed in greater detail below.

Storage system may store metadata 109. Metadata 109 may include information about relational artifacts such as tables, columns, views, etc.

In the example of FIG. 1B, storage system 106 may additionally store other pieces of information associated with a database management system such as schema information 116 and statistics information 112. Schema information 116 may identify a structure of the tables, indices, and other artifacts associated with the database. For example, for a star schema, schema information 116 may comprise information describing relationships between/among fact records and dimension records. For example, schema information 116 may be used to determine that sales data can be queried according to a time dimension and a geographical region dimension. In certain embodiments, schema information 116 may be defined by a domain expert or analyst. Schema information 116 may define a star schema such as the schemas depicted in FIGS. 4 and 9.

Statistics 112 may comprise information about fact records or dimension records and other information related to query plans and performance related attributes of database management system 104. For example, statistics 112 may comprise table-level statistics (e.g., the number of rows in the table, the number of data blocks used for the table, or the average row length in the table) and/or column-level statistics (e.g., the number of distinct values in a column or the minimum/maximum value found in a column).

DBMS 104 may be configured (e.g., comprise software, which when executed by one or more processors enables the functionality) to provide functionality that enables one or more databases to be created, data to be added to the databases, data stored in the databases to be updated and/or deleted, and other functions related to managing the databases and the stored data. DBMS 104 may also be configured to receive one or more queries 130 for analyzing the data stored in storage system 106, perform analysis corresponding to the queries, and output query results 132. Queries 130 may be in different forms and languages such as Structured Query Language (SQL).

A query 130 may be received from one or more sources such as a user of DBMS 104, from another system, and the like. For example, in the embodiment depicted in FIG. 1B, in certain instances, a query may be received from data analytics system (DAS) 102. DAS 102 may be configured to perform analysis of the data stored in storage system 106. DAS 102 may comprise software configured to generate analytical queries for execution by DBMS 104 on data stored by storage system 106. For example, if storage system 106 stores sales records, DAS 102 may generate and send to DBMS 104 queries for analyzing the sales records (e.g., queries to analyze sales trends, queries to analyze advertisement campaigns, and other queries to gain insights or extract useful patterns about business activities). In certain embodiments, DAS 102 may use information stored in storage system 106 (e.g., schema information 116) for generating an analytical query. For example, star schema 116 may be used to determine that sales data can be queried according to a time dimension and a geographical region dimension. Results retrieved by DBMS 104 corresponding to queries received from DAS 102 may be provided by DBMS 104 to DAS 102.

As depicted in FIG. 1B, DBMS 104 may provide an interface 122 for receiving queries 130. Parser 120 may be configured to perform syntactic and semantic analysis of the received query. For example, for a SQL query, parser 120 may be configured to check the SQL statements in the query for correct syntax and check whether the database objects and other object attributes referenced in the query are correct.

After a query has passed the syntactic and semantic checks performed by parser 120, optimizer 114 may be configured to determine a query plan for efficiently executing the query. Optimizer 114 may output a query plan for optimally executing the query. In certain embodiments, an execution plan comprises a series or pipeline of operations/operators that are to be executed. An execution plan may be represented by a rooted tree or graph with the nodes of the tree or graph representing individual operations/operators. A query plan graph is generally executed starting from the leaves of the graph and proceeding towards the root. The leaves of a query plan typically represent fact scan operations in which fact records or rows are scanned or read from a fact source such as a fact table. The output of any relational operator in a query plan is a computed dataset. The computed dataset (e.g., a set of rows or records) returned by an operation in the query plan is provided as input to and consumed by the next operation (also referred to as a parent operation or downstream operation) in the query plan pipeline. In the last operation in the query plan pipeline (root of the query plan graph), the fact rows are returned as the result of the SQL query. The rows returned by a particular operation in a query plan thus become the input rows to the next operation (the parent operation or downstream operation of the particular operation) in the query plan pipeline. A set of rows returned by an operation is sometimes referred to as a row set and a node in a query plan that generates a row set is referred to as a row source. A query plan thus represents a flow of row sources from one operation to another. Each operation of the query plan retrieves rows from the database or accepts rows from one or more other child or upstream operations (or row sources).

In certain embodiments, optimizer 114 may perform cost-based optimization to generate a query plan. In certain embodiments, optimizer 114 may strive to generate a query plan for a query that is able to execute the query using the least amount of resources including I/O, CPU resources, and memory resources (best throughput). Optimizer 114 may use various pieces of information, such as information about fact sources 108, schema information 116, hints, and statistics 112 to generate a query plan. In certain embodiments, optimizer 114 may generate a set of potential plans and estimate a cost to each plan, where the cost for a plan is an estimated value proportional to the expected resource use needed to execute the plan. The cost for a plan may be based upon access paths, operations in the plan (e.g., join operations). Access paths are ways in which data is retrieved from a database. A row or record in a fact table may be retrieved by a full table scan (e.g., the scan reads all the rows/records in a fact table and filters out those that do not meet the selection criteria), using an index (e.g., a row is retrieved by traversing an index, using indexed column values), using materialized views or rowid scans. Optimizer 114 may then compare the costs of the plans and choose a plan with the lowest cost.

In certain embodiments, enhancer 103 is configured to further enhance/optimize the query plan chosen by optimizer 114 and generate an enhanced optimized query plan. The enhanced query plan generated by enhancer 103 is better than the query plan generated by optimizer 114 because it executes faster than the non-enhanced query plan and may, in many instances, use fewer memory resources than the non-enhanced query plan.

The optimized enhanced query plan generated by enhancer 103 may then be provided to executor subsystem 105, which is configured to execute the query plan against the data stored in storage system 106. Results obtained by executor 105 from executing the query plan received from enhancer 103 may then be returned by DBMS 104 as a result response to the input query. Executor 105 represents the execution layer of the runtime processes that processes queries based upon the enhanced query plan provided to them. They may contain operator/operations implementation (e.g., SQL, Graph, Spatial, etc.) that operate on data tuple streams and transform them in specific ways.

Enhancer 103 may use various techniques for generating an enhanced query plan from a query plan generated by optimizer 114. In certain embodiments, enhancer 103 may use metadata/semantics information 117 stored by DAS 102 to further optimize and enhance the query plan generated by optimizer 114. For example, based upon semantics information available for a star schema (e.g., from a star schema semantic model), enhancer 103 may be configured to infer dimensional context/predicate conditions in the query plan generated by optimizer 114 that are applicable during the scan operation of a source of fact records. This inferred information may be used by enhancer 103 to further optimize the query plan generated by optimizer 114. In certain embodiments, enhancer 103 performs a method of converting the inferred dimension context/predicates as applicable predicate conditions on the scan operation on the source of fact records utilizing field/column functional dependencies defined in the semantic data (e.g., in the semantic model of the star schema or cube). In certain instances, enhancer 103 may apply the inferred dimensional context/predicate conditions on an index source of fact records (e.g., an OLAP index fact source) that leverages the data structures within the index.

In general, for purposes of this application, the term fact source is used to refer to a source of fact records. A fact source may be any relation that is a source of fact (e.g., of fact records). A fact source could be an original fact table or some other materialization of the facts. Common materialization techniques include pre-aggregated views and cube representation such as OLAP indices. For example, a fact source may be a fact table (e.g., a fact table in a relational database based upon a star schema), an index (e.g., an OLAP index on a star schema or cube such as a pre-joined index that provides the ability to quickly access facts for any arbitrary sub-region of multi-dimensional space), or a materialized view (e.g., a materialized view at some aggregation level for a star schema). A fact source represents any dataset or table that is a source of facts records (e.g., business facts). The facts may be at a certain dimension grain.

As indicated above, enhancer 103 may use metadata/ semantics information 117 for inferencing the dimensional context/predicate conditions. Semantics information 117 may include business intelligence information. For example, semantics information 117 may include business data having rich value and structural semantics based upon real-world processes, organizational structures, cubes information, and the like. The semantics information may comprise information about business models like business hierarchies and functional dependencies in data. This hierarchies and dependencies information is used by enhancer 103 to generate enhanced query plans thus resulting in speeding-up execution of queries. For example, dependencies metadata information may comprise information describing relationships (e.g., hierarchical or non-hierarchical) between different fields (e.g., columns) of database data. For example, dependency metadata may comprise information describing a hierarchical relationship between values of a "city" field column and values of a "state" field column (e.g., San Francisco is a city within the state of California). Enhancer 103 may use the dependency metadata, along with the granularity of the result of query sub-plans, to infer predicate condition applicability on fact source scans within the query sub-plans. In certain embodiments, the semantics information may be determined, without any user input, from analyzing information about the structure and schema of the database storing the data being analyzed by the query.

The semantics information used by enhancer 103 to enhance the query plan may be available or ascertained from multiple sources. As one example, the semantics information may be available from business intelligence (BI) data sources. For example, as shown in the embodiment depicted in FIG. 1B, DAS 102 may include or have access to various data sources storing BI information comprising semantics information 117. In other embodiments, the semantics information may be the structure of the data being analyzed and the data structures used to store the data. For example, for a database storing data being analyzed, schema information 116 for the database may be used to determine the semantics information. Enhancer 103 may use schema information 116 to infer predicate condition applications and further predicate conditions based upon predicates in the input query.

Although optimizer 114 and enhancer 103 are shown as separate subsystems in FIG. 1B, this is not intended to be limiting. In alternative embodiments, enhancer 103 may be part of optimizer 114. In such an embodiment, optimizer 114 chooses a query plan and then enhances it using the techniques described in this disclosure. In certain embodiments, enhancer 103 may be part of DAS 102 instead of DBMS 104. In such a scenario, DBMS 104 may work co-operatively with DAS 102 to generate an enhanced query plan. In certain embodiments, parser 120, optimizer 114, enhancer 103, and executor 105 may be collectively referred to as the query engine of DBMS 104.

As indicated above, a database storing data records, such as the example depicted in FIG. 2, may then be analyzed using analytical queries, such as SQL queries. A typical query may involve one or more fact sources that are combined with dimension tables and each other. In certain embodiments, as disclosed herein, enhancer 103 analyzes the query plan generated by an optimizer for a query from the perspective of each fact source scan and attempts to infer dimension context (e.g., dimension filters) that can be applied on fact rows so that the number of fact rows processed is significantly reduced and/or the overall cost of performing the scan operation is reduced. In case of star-joins (joins that represent the combining of fact sources with their dimension context) the following can be used to identify the various dimensions contexts to be inferred and applied to the fact sources:

The fact that joins along the edges of a star schema represent the combining of a lossless decomposition (so no new facts are introduced) can be utilized.

The functional dependencies in the semantic model of the star schema can be utilized.

In the case of OLAP Index fact sources, rewrites can be performed.

Since a fact source can pre-join facts with their dimensions, joins in the star schema are classified as fact source joins in the context of a fact source. Star schema joins are the ones that are traversed when forming a fact source.

An analytical query may be received to be executed against database data 200 for analyzing the data stored in database 200. An example of such a query is shown below as Query A:

| Query A |
|---|
| 1) WITH customer_total_return AS |
| 2) ( SELECT |
| 3) customer_key AS ctr_customer_key, |
| 4) store_key AS ctr_store_key, |
| 5) SUM(return_amt) AS ctr_total_return |
| 6) FROM store_returns sr, date d |
| 7) WHERE sr.date_key = d.date_key AND year = 2000 |
| 8) GROUP BY customer_key, store_key) |
| 9) SELECT customer_id |
| 10) FROM customer_total_return ctr1, store s, customer c |
| 11) WHERE ctr1.ctr_total_return > |
| 12) (SELECT AVG(ctr_total_return) * 1.2 |
| 13) FROM customer_total_return ctr2 |
| 14) WHERE ctr1.ctr_store_key = ctr2.ctr_store_key) |
| 15) AND store_key = ctr1.ctr_store_key |
| 16) AND state = 'TN' |
| 17) AND ctr1.ctr_customer_key = customer_key |
| 18) ORDER BY customer_id |
| 19) LIMIT 100 |

The natural language equivalent of Query A is to "identify 'problematic' customer-store relationships, where 'problematic' is defined as those having return amounts that exceed 20% of the average for the store." The question is about the relationship of customers and the stores they visit, and not about overall customer behavior. Further, the analysis is being done for the state of Tennessee.

Figure 3:
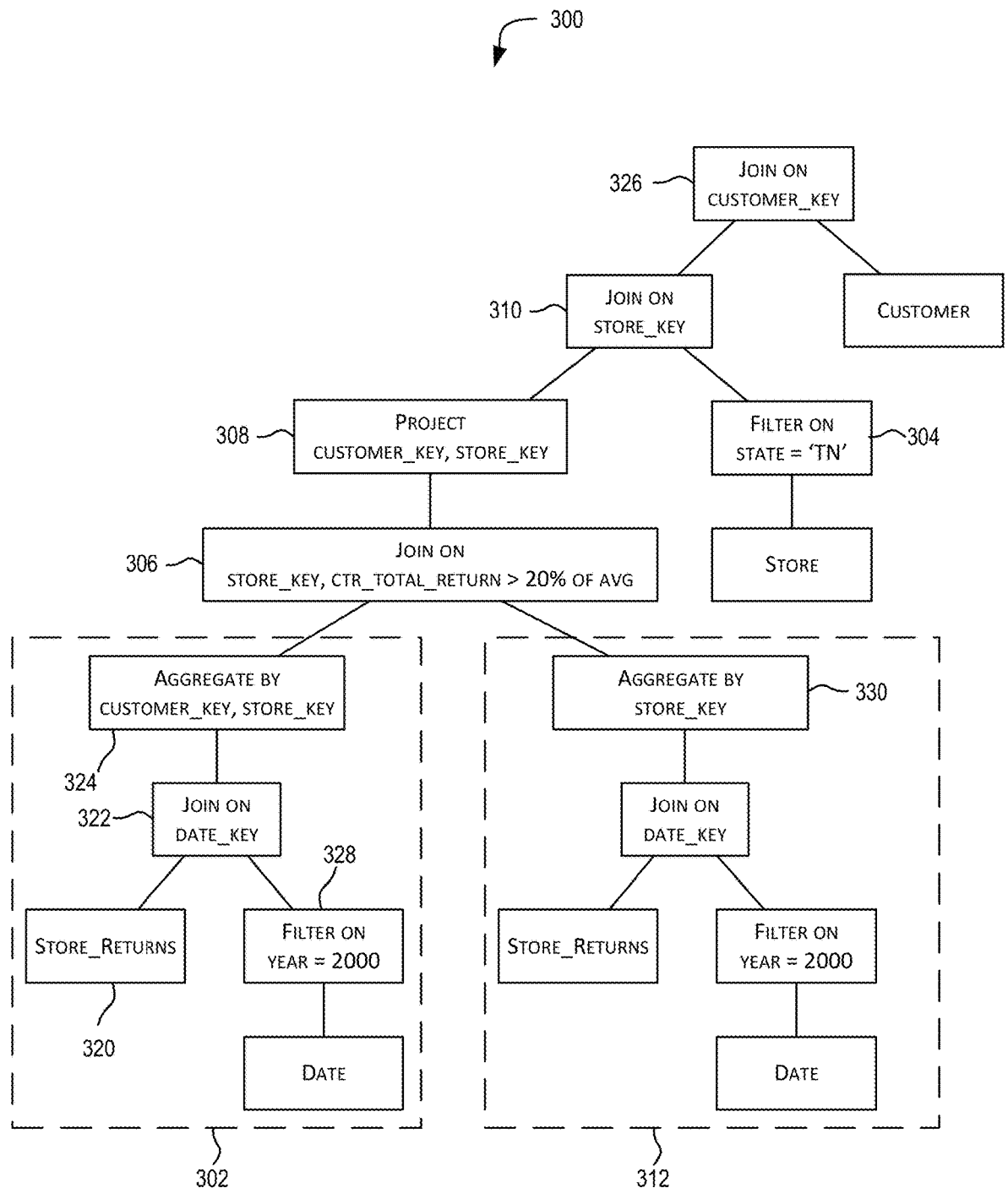
FIG. 3 depicts a query plan, in accordance with certain embodiments.

Upon receiving a query, such as Query A shown above, the database management system is configured to parse the query and then generate a query plan for the query. The query plan is then executed by the database management system against the stored data records to obtain results pertaining to the query. FIG. 3 is a logical tree or graph representation of a query plan 300 that may be generated for Query A. Query plan 300 may represent a query plan generated and chosen by optimizer 114. Query plan 300 represents a logical flow graph of how data in the relationship tables is operated on. As previously described, a query plan represents a flow of row sources from one operation to another in the query plan pipeline. Each operation of the query plan retrieves rows from the database or accepts rows from one or more other operations (or row sources).

Query plan 300 comprises four leaf nodes that represent fact or dimension tables. The non-leaf nodes in the query plan represent various relational operators. Examples shown in FIG. 3 include a filter operator, a join operator, an aggregation operator, and a project operator. A non-leaf node takes rows outputs by its children nodes as inputs and rows output by the non-leaf node as provided as input to the parent nodes of the non-leaf node, or if the non-leaf node is a root node, the rows or records output by the root node are provided as results of the query execution. For example, in FIG. 3, node 310 takes rows output by nodes 308 and 304 as inputs, node 308 takes rows output by node 306 as input, node 304 takes rows or records returned by the scan of the store table as input.

In query plan 300, the left aggregation sub-plan 302 involves computing return amounts at the Customer and Store grains, and the right aggregation sub-plan 312 computes return amounts at the Store grain. These are then joined to extract information about Customer, Store combinations whose return amounts exceed the corresponding Store Average by 20%. After this, the rows are filtered on the store's state being Tennessee.

Queries generally involve multiple layers, some of which are building block layers that compute values from the raw facts. For example, an analytical query can be thought of as layers of multidimensional calculations that are combined by operations like joining, union, ordering and taking the top/bottom-n of sets. Even a relatively simple question posed by Query A involves performing multiple Aggregate-Join passes on the store returns star schema as shown in query plan 300. Each Aggregate-Join involves scanning very large fact tables and joins with one or more dimension tables, where most of the dimension tables are small relative to the fact table.

Query plan 300 depicted in FIG. 3 comprises a sub-plan 302, which corresponds to the subquery in lines 2-8 of Query A. Although in the example of FIG. 3, sub-plan 302 corresponds to a subquery, it should be appreciated that a query sub-plan is not limited to subqueries. Rather, a query sub-plan may correspond to any part of a database query.

Sub-plan 302 comprises a filter operation and a join operation for evaluating the predicate in line 7 of Query A. According to plan 300, the predicate condition "year=2000" is to be evaluated against "Date" dimension records, thereby filtering them. Thereafter, the predicate condition "sr.date_key=d.date_key" is to be evaluated by joining "Store_Returns" fact records with the filtered "Date" dimension records. However, performing a join operation can be computationally intensive, because it typically involves processing a large number (e.g., millions) of fact records.

In a separate branch of query plan 300 not connected to sub-plan 302, plan 300 further comprises a filter operation 304 (filter on state='TN'), which corresponds to line 16 of Query A. According to plan 300, filter operation 304 is to be performed separately from the operations of sub-plan 302. Thereafter, the filtered "Store" dimension records are to be joined with some of the results of executing the operations in sub-plan 302 after going through nodes 306 and 308.

Plan 300 involves two fact scans on fact table Store_Returns. However, the context of the entire query is the state of Tennessee and the year 2000. However, in plan 300, sub-plan 302 that includes the scan of fact source Store_Returns does not restrict the records to only those where the state is Tennessee. As a result, non-Tennessee records are also provided for processing to the join operation in sub-plan 302 and from sub-plan 302 to the join operation 306. Thus, these fact records (i.e., store returns in year 2000 for all states) would unnecessarily be carried forward to operations 306, 308, and 310, because at 310, those fact records that are not in TN will not join and be filtered out. Carrying these unnecessary records through 306, 308, and 310 is wasteful in terms of resources needed for execution of query plan 300 due to the number of records being carried forward in the query plan and adds to the time needed for execution of query plan 300 (i.e., execution of the query takes more time). This results in significant wasted computational resources and leads to increased execution time.

In certain embodiments, enhancer 103 is configured to infer the TN filter condition from one part of the query plan and change the query plan such that the inferred condition is applied to another unrelated part of the query plan so as to reduce the number of fact records that are being carried through the execution of the overall query plan and/or to reduce the overall cost of performing the scan operation. Rewriting of the query plan helps to avoid unnecessarily processing and carrying forward of fact records. Query plan 300 may be rewritten using inferences drawn from star schema information 116 and/or semantics metadata 117. Enhancer 103 may use star schema 116 and/or semantics metadata 117 to rewrite query plan 300.

For example, as depicted in FIG. 4, star schema 400 indicates that "Store" dimension records can be joined with "Store_Returns" fact records. Thus, enhancer 103 can infer that a predicate condition for filtering "Store" dimension records can also be used to filter "Store_Returns" fact records.

Based upon inferences drawn from star schema 116 and/or semantics metadata 117, enhancer 103 may rewrite and enhance query plan 300 by propagating a predicate condition in the query plan from outside a query sub-plan in the query plan to inside the query sub-plan. A predicate condition that is not connected to a sub-plan or sub-portion of a query plan is inserted into or associated with the sub-plan or sub-portion such that the number of fact records that are output from the sub-plan after the rewriting is less than the number of fact records that are output from the sub-plan prior to the rewriting and/or the overall cost of performing the scan operation in the sub-plan is reduced, without impacting the overall query results obtained from query execution. In this manner, as a result of the rewriting, irrelevant fact records that are going to be filtered out during a later operation in the original query plan are now, as a result of the rewriting, filtered out earlier in the query plan, thereby reducing the number of fact records that have to be carried forward in the execution of the query plan and avoiding subsequent processing that is unnecessary. As indicated above, fact records may number in the millions. So reducing the number of fact records that have to be carried forward in the query plan pipeline from one operation in the query plan to another operation in the query plan significantly improves overall query execution (i.e., makes it faster) and reduces wastage of a considerable amount of computational resources (e.g., I/O resources, processing (e.g., CPU) resources, and memory resources).

Figure 5:
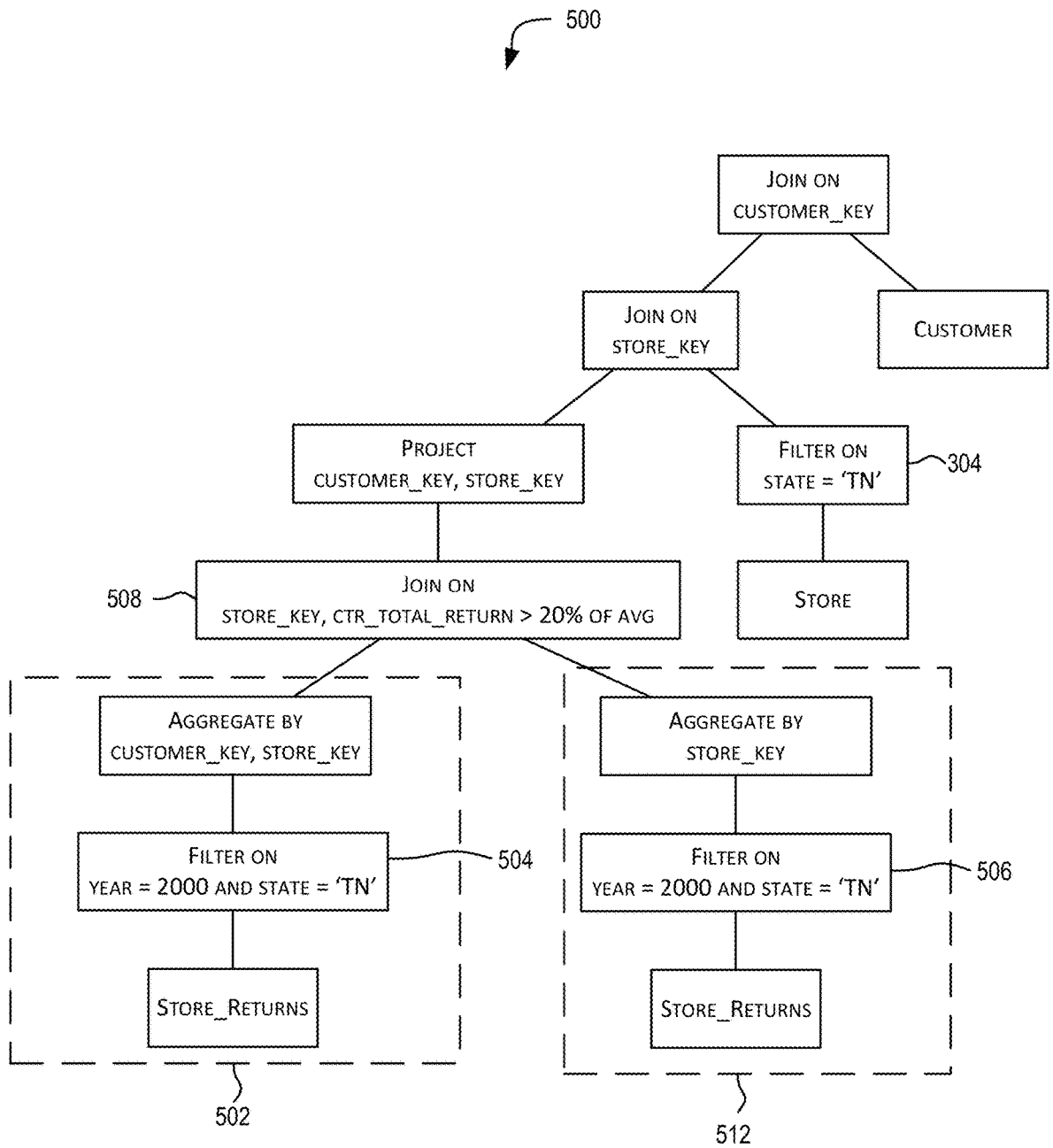
FIG. 5 depicts a rewritten query execution plan, in accordance with certain embodiments.

FIG. 5 is a logical tree or graph representation of a rewritten enhanced query plan 500 that may be generated by enhancer 103 for executing Query A according to certain embodiments. Plan 500 represents the rewritten version of plan 300 depicted in FIG. 3. Plan 500 comprises a sub-plan 502, which corresponds to the subquery in lines 2-8 of Query A. In FIG. 5, sub-plan 302 in FIG. 3 has been rewritten as sub-plan 502. Compared to sub-plan 302, rewritten sub-plan 502 not only has the "year=2000" condition but now also has the additional condition "state=TN"). In this manner, the "state=TN" predicate condition from operation 304 in query plan 300 has been propagated to the filter operation in sub-plan 502 as an additional condition (in addition to year=2000). This rewritten filter operation 504 with both conditions is applied to the fact records scanned from the "Store_Returns" fact table. Thus, sub-plan 302 (or more specifically, filter operation 304) has been rewritten by enhancer 103 as sub-plan 502 by propagating the filter condition from filter operation 304 in FIG. 3 to filter operation 504 in sub-plan 502.

In a similar manner, in FIG. 5, sub-plan 312 in FIG. 3 has been rewritten as sub-plan 512. Compared to sub-plan 312, rewritten sub-plan 512 not only has the "year=2000" condition but now also has the additional condition "state=TN"). In this manner, the "state=TN" predicate condition from operation 304 in query plan 300 has been propagated to the filter operation in sub-plan 512 as an additional condition (in addition to year=2000). This rewritten filter operation 506 with both conditions is applied to the fact records scanned from the "Store_Returns" fact table. Thus, sub-plan 312 (or more specifically, filter operation 304) has been rewritten by enhancer 103 to sub-plan 512 by propagating the filter condition from filter operation 304 in FIG. 3 to filter operation 506 in sub-plan 512.

Rewriting the query plan in the manner described above enables filtering out any fact records from fact source Store_Returns unrelated to Tennessee so that computational resources are not wasted in further processing such irrelevant fact records. Compared to sub-plan 302, the number of facts records that are output by filter operation 504 and sub-plan 502 and made available to further operations in project plan 500 (e.g., the join operation 508) is a lot fewer than the number of records output by sub-plan 302 (specifically, by the join operation in sub-plan 302) and made available to the next operations in query plan 300. This is because only records that match the TN condition are output by filter operation 504 and sub-plan 502 to downstream operations (e.g., the join operation that gets fact records output by sub-plan 502) in plan 500; the non-Tennessee records are filtered out. In a similar manner, compared to sub-plan 312, the number of facts records that are output by filter operation 506 and sub-plan 512 and made available to further operations in project plan 500 (e.g., the join operation 508) is a lot fewer than the number of records output by sub-plan 312 (specifically, by the join operation in sub-plan 312) and made available to the next operations in query plan 300. This is because only records that match the TN condition are output by filter operation 506 and sub-plan 512 to downstream operations (e.g., the join operation 508 that gets fact records output by sub-plan 512) in plan 500; the non-Tennessee records are filtered out. This can result in a significant reduction in the number of records provided to the join operation; depending upon the size of the facts table as much as or greater than a 100× reduction in the number of fact records. As a result of this reduction in the number of fact records output by sub-plans 502 and 512, plan 500, and consequently the corresponding query for which query plan 500 is generated, executes faster (due to needing fewer CPU cycles for the execution) and may, in many instances, use fewer memory resources than non-enhanced query plan 300, while analyzing the same data and returning the same query results.

In the example depicted in FIGS. 3 and 5, a condition from one part of a query plan is propagated to another part of the query plan. In this example, the predicate condition (filter based upon State=TN) is propagated from one part of the query plan (e.g., from the filter operation 304 in FIG. 3) to another part (e.g., to filter operations 504 and 506 in FIG. 5) of the query plan. In this example, the operations or parts of the query plan graph to which the predicate condition is propagated are neither descendants nor ancestors of the portion of the tree from where the predicate condition is propagated, i.e., filter operations 504 and 506 are not descendants or ancestors of filter operation 304 in query plan 300 or 500.

Although in the example of FIG. 5, the predicate condition from filter operation 304 is propagated into sub-plans 302 and 312 to create rewritten sub-plans 502 and 512, it should be appreciated that this is merely an example. In general, a predicate condition from a first operation in a query plan graph may be propagated and associated with a different portion or operation in the query plan to generate an optimized enhanced rewritten query plan. This may depend on the data structures (e.g., materialized views) available.

In certain embodiments, as part of analyzing query plan 300, enhancer 103 focuses on Aggregate-Join sub-plans, which are sub-plans within the entire query plan that only contain Aggregate, Join, Project, Filter or Scan operators/operations. Examples of these are sub-plans 302 and 312 depicted in FIG. 3. The goal of enhancer 103 is to find predicate conditions or filters that can be pushed to the scans of fact source relations within these sub-plans.

In certain embodiments, the general pattern (Pattern A) that enhancer 103 looks for:

a node in the query plan representing a Join operation ("join node") that defines a join condition between a fact source scan (fs) and some other table scan (ot). Join conditions may be represented as a list of equality checks between columns of the fact source and the other table (fs.col1=ot.col1 and fs.col2=ot.col2 and . . . ).

The fact source side should not be null-supplying, i.e., along the path from the fact source scan to the join under consideration (j1) there must not be another join (j2) with the fact source-side being null-supplying (i.e., fs cannot be a descendant of the child c1 of j2, where j2 is an outer join and c1 is the null-supplying side in j2).

Pattern A is shown below. Lines 2 and 4 of Pattern A stand-in for any combination of Aggregate/Join/Project/Filter operations.

```
1.  Join (fs.col1 = ot.col1 and fs.col2 = ot.col2 and ... )
2.     project/filter/aggregate operations
3.        fact source scan (fs)
4.     project/filter/aggregate operations
5.        OtherTable scan (ot)
```

If a sub-plan in the overall query plan is found that matches the above Pattern A, then a 'semiJoin' restriction can be applied on the joining columns of the fact source (fs.col1, fs.col2, in Pattern A). Fact source rows can be restricted to the ones whose joining column values match some row in the OtherTable (on ot.col1, ot.col2 . . . ). Further if the OtherTable has some filter in effect, the fact source relation scan can be rewritten, as shown below:

```
1.  Left-Semi Join (fs.col1 = ot.col1 and fs.col2 = ot.col2 and ... )
2.     fact source scan (fs)
```

```
3.      Select distinct ot.col1, ot.col2, ...
4.         Filter
5.            OtherTable scan (ot)
```

The potential advantage of this rewrite is a reduction in fact source rows processed in subsequent operators of the query plan pipeline. The reduction in fact source rows informally depends on the selectivity of the filter on the OtherTable. The more selective the filter (e.g., an equality condition on a column with large number of distinct values) the better the chance that the reduction in fact source rows will be large. In case of star schemas joins, the joins are on a lossless decomposition (no new facts are added by the joins), so it is very likely that the benefit of a dimension filter on facts scanned is directly proportional to the filter's selectivity.

The cost of this rewrite is based on how the semi-join operation is performed. In the general case, this is done using a Left Semi-Join operator which typically will involve a join physical plan.

There are various techniques available for efficiently propagating a predicate condition within a query plan. The particular technique used may be selected based upon various factors including, without limitation, estimated computational savings and/or availability of certain data structures.

One technique involves performing a semi-join operation between fact records and dimension records. This may be achieved based upon evaluating a predicate condition against dimension records to determine a set of dimension keys that satisfy the predicate condition. This set of dimension keys is referred to herein as a "key in-list".

Figure 6:
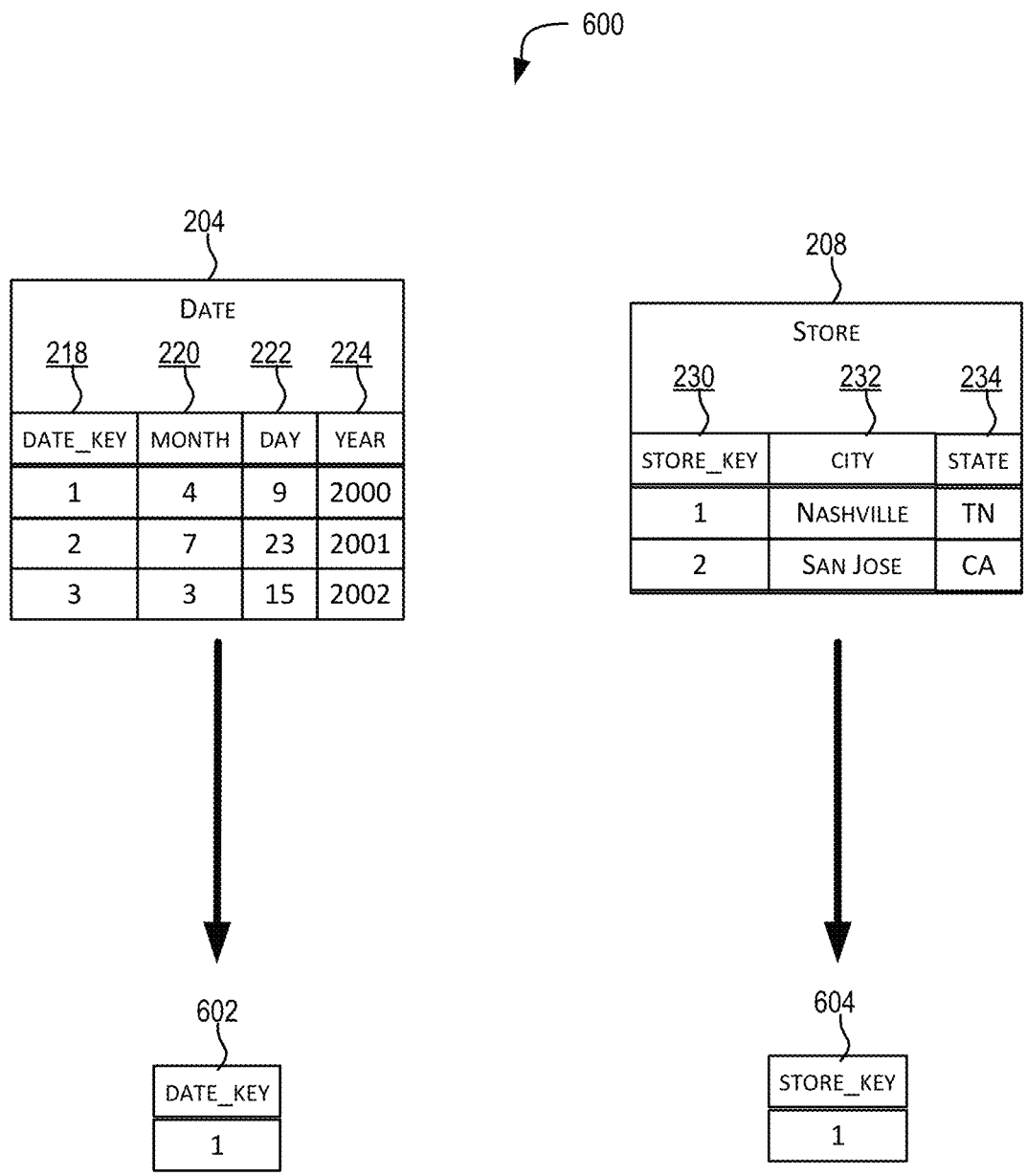
FIG. 6 depicts an approach for performing a semi-join operation, in accordance with certain embodiments.

FIG. 6 depicts example processing 600 for generating key in-lists 602 and 604 that can be used to efficiently evaluate Query A. More specifically, the predicate condition "year=2000" is evaluated against dimension table 204 to determine key in-list 602, and the predicate condition "state='TN'" is evaluated against dimension table 208 to determine key in-list 604. A key in-list is a list of foreign keys from the dimension records in the dimension table that satisfy the predicate condition. For example, for Date dimension table 204, the "year=2000" is satisfied by the first record depicted in FIG. 6 and the date_key=1 is the foreign key from that record. Key in-lists 602 and 604 can be used to scan and filter fact records, thereby propagating the predicate conditions to the fact records.

However, performing a semi-join operation may incur a significant amount of computational overhead. Scanning fact records can be computationally intensive, because there is typically a large number of fact records. Furthermore, generating a key in-list adds to the computational overhead of performing a semi-join operation. To be worthwhile, this overhead should be exceeded by the reduction in fact records that would otherwise be unnecessarily processed (e.g., the fact records unrelated to Tennessee). Thus, enhancer 103 may estimate the computational savings prior to rewriting a query plan to include a semi-join operation.

In the case of multiple predicate conditions, the query enhancer 103 may analyze the incremental savings of successively performing a semi-join operation. This may involve placing the predicate conditions in a decreasing order of computational savings that would result from applying each predicate condition in isolation. Then, enhancer 103 may analyze the predicate conditions in this order to estimate the incremental savings from applying the predicate conditions in succession. Thus, a semi-join operation may be specified for applying a successive predicate condition so long as the incremental savings is not insignificant.

Another technique for efficiently propagating a predicate condition to fact records involves a tabular representation of fact values (e.g., fact metric values or any other values from a fact table) joined with dimension values. Also involved are one or more indices (e.g., inverted indices) that enable efficient access to memory locations of dimension values included in the materialized view. Collectively, the tabular representation with the one or more indices are referred to herein as an "OLAP index". Typically an OLAP Index is single composite data layout format that is optimized for scanning arbitrary subsets of rows based on predicate conditions provided that uses techniques such as scan optimized column encoding, memory optimized columnar layout, vectorized scan operations etc.; predicate evaluation is also highly optimized, for example as a set of bitset operations. These features make OLAP Indexes ideally suited for ad-hoc analytical workloads.

Figure 7:
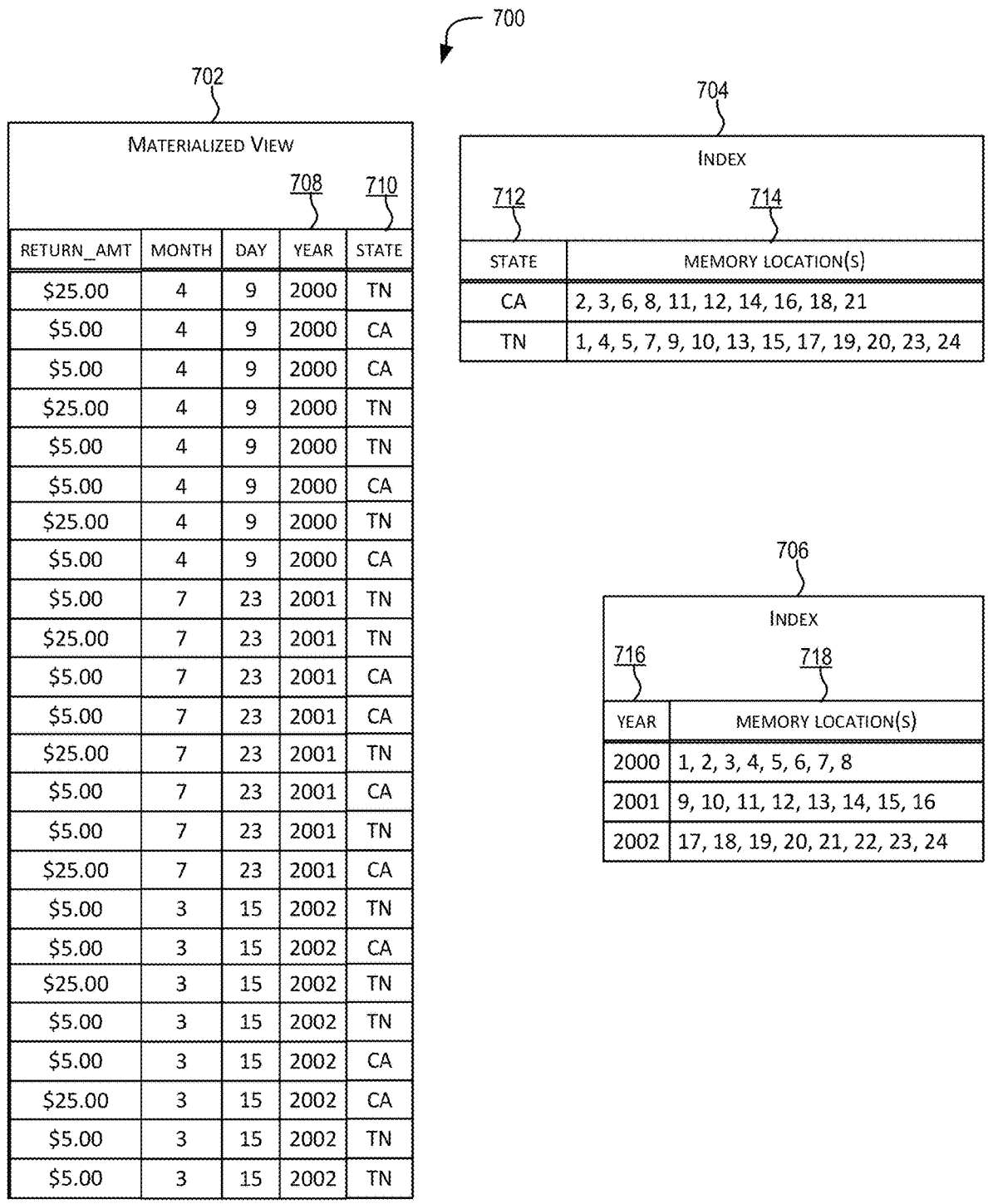
FIG. 7 depicts an online analytical processing (OLAP) index, in accordance with certain embodiments.

FIG. 7 depicts an example OLAP index 700 comprising dimension indices 704 and 706. OLAP index 700 further comprises a table 702 including data resulting from joining fact table 202 with dimension tables 204 and 208. An OLAP index, as depicted in FIG. 7, comprises data in columnar format along with one or more inverted indexes on dimension values. For each dimension value, a position bitmap is maintained.

In many databases, the values in a field (e.g., column 708 or 710) are stored contiguously within a range of memory addresses. For example, when data is read into system memory from storage, values of column 710 may be stored contiguously in volatile memory as columnar database data that can be efficiently accessed. To increase the efficiency of accessing particular column values, an index (e.g., a dimension index) may store mappings between field values and memory locations. In the example of FIG. 7, dimension index 704 indicates memory locations 714 for "state" dimension values 712 of column 710, and dimension index 706 indicates memory locations 718 of "year" dimension values 716 of column 708.

Thus, an OLAP index enables conservation of computational resources. Since an OLAP index comprises dimension values, predicate conditions may be evaluated directly against an OLAP index without generating in-lists. Furthermore dimension value bitmaps represent mappings from a dimension value to the subset of fact rows having the dimension value; each dimension predicate condition may be mapped to a bitmap or bitmap combination: for example State='TN' is the fact rows in the 'TN' value bitmap, State >'TN' is the fact rows in the bitmap obtained by combining by OR all bitmaps for all State values that are >'TN'; further evaluation of multiple dimension predicate conditions also may be evaluated as very fast bitmap combination functions like AND, OR, NOT without having to scan actual fact data. An index, such as depicted in FIG. 7, enables a predicate condition such as 'state="Tennessee"' and 'date="2000"' to be computed in a fast manner. An OLAP index materialization enables very efficient "skip scans" to be performed. The evaluation of predicate conditions (e.g., state="Tennessee"' or 'date="2000") results in a list of row identifiers, identifying fact rows that have data matching the predicate condition. For example, row identifiers 1, 4, 5, 7, 9, 10, 13, 15, 17, 19, 20, 23, and 24 correspond to fact records where the 'state="Tennessee"' condition is met. As another example, row identifiers 1, 2, 3, 4, 5, 6, 7, and 8 correspond to fact records where the 'date="2000"' condition is met. The rowid list can be used to skip large number of fact record rows during the facts scan operation. Typically, analytical queries focus on a small region of a vast multidimensional space, and hence skips scans execute significantly faster than scanning all the fact records (or fact rows) and then eliminating those that do not satisfy the filter predicate condition. Accordingly, the use of an OLAP index along with the predicate condition makes the fact scan operation even faster.

Although FIG. 7 depicts memory locations 714 and 718 as decimal values for the sake of clarity, it should be appreciated that memory locations 714 and 718 may be represented as binary values, hexadecimal values, or the like. In some embodiments, memory locations 714 and 718 may be maintained as position bitmaps, thereby enabling computationally cheap and fast bitmap AND operations to concurrently propagate multiple predicate conditions to fact records. Furthermore, although FIG. 7 depicts memory locations 714 and 718 as relative addresses (e.g., byte offsets) for the sake of clarity, it should be appreciated that memory locations 714 and 718 may be represented as absolute addresses in some embodiments.

In general, the benefits of evaluating a predicate condition against an OLAP index should always exceed any computational costs. Thus, there is no need for enhancer 103 to perform a cost-benefit analysis. However, a suitable OLAP index may not always be available. For example, there may not be an OLAP index comprising "state" dimension values against which the predicate condition "state='TN'" can be evaluated.

Yet another technique for efficiently propagating a predicate condition to fact records involves a hybrid of the aforementioned techniques and is referred to herein as the "index semi-join" technique. As suggested by its name, an index semi-join operation is a particular type of semi-join operation that involves an OLAP index, albeit an OLAP index unsuitable for directly evaluating a predicate condition.

Figure 8A:
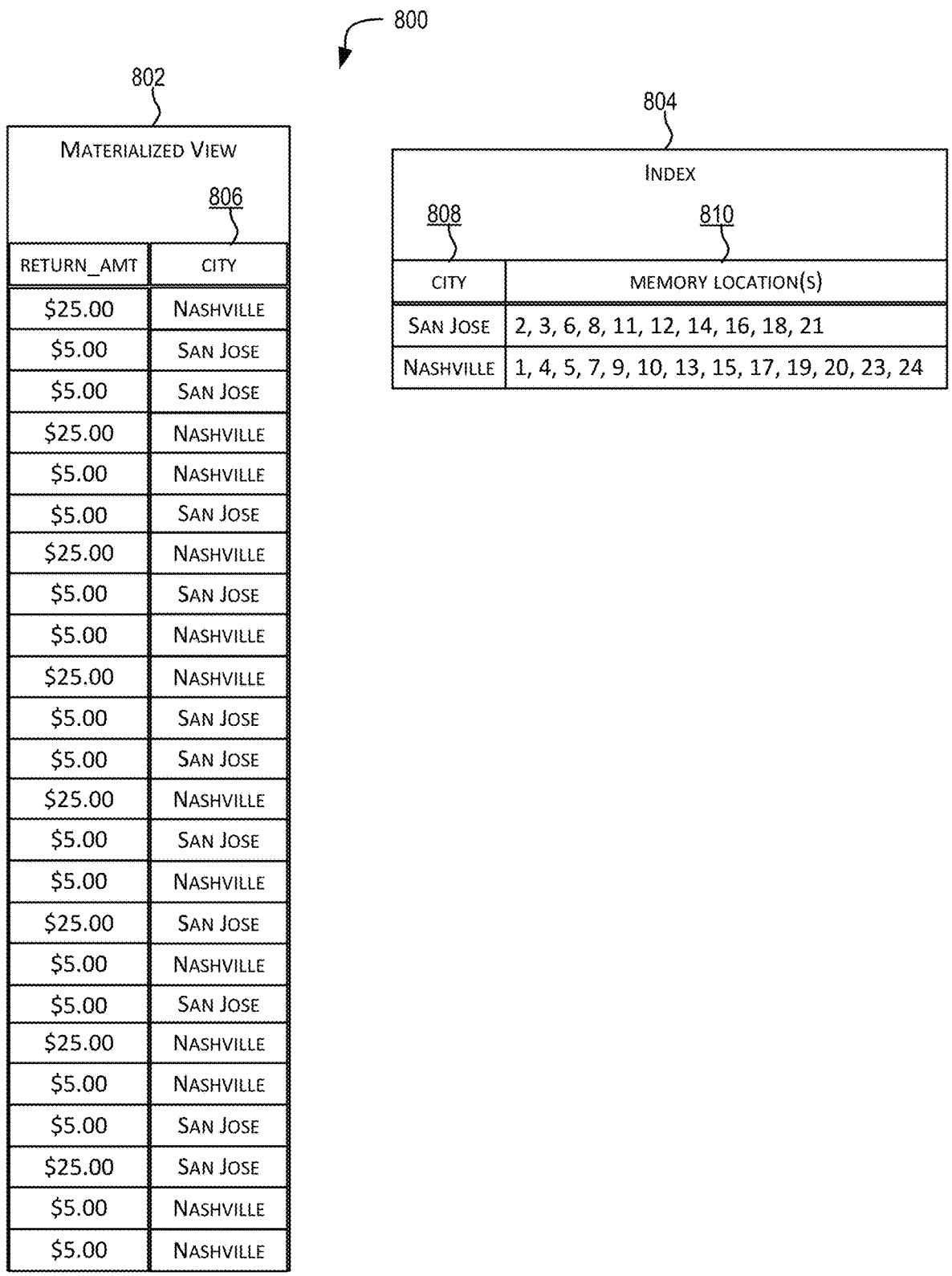
FIGS. 8A and 8B depict an approach for performing an index semi-join operation, in accordance with certain embodiments.

FIG. 8A depicts an example OLAP index 800 comprising a table 802 and a dimension index 804. Table 802 comprises data resulting from joining fact table Store_Returns 202 with dimension Store table 208. The values of column 806 may be stored contiguously in volatile memory as columnar database data, and dimension index 804 may be used to efficiently access particular column values. More specifically, dimension index 804 maps "city" dimension values 808 to memory locations 810 within the table.

Although FIG. 8A depicts memory locations 810 as decimal values for the sake of clarity, it should be appreciated that memory locations 810 may be represented as binary values, hexadecimal values, or the like. In some embodiments, memory locations 810 may be maintained as position bitmaps, thereby enabling computationally cheap and fast bitmap AND operations to concurrently propagate multiple predicate conditions to fact records. Furthermore, although FIG. 8A depicts memory locations 810 as relative addresses (e.g., byte offsets) for the sake of clarity, it should be appreciated that memory locations 810 may be represented as absolute addresses in some embodiments.

However, dimension index 804 is not suitable for directly evaluating the predicate condition "state='TN'". This is because dimension index 804 is based upon "city" values, not "state" values.

Nevertheless, dimension index 804 may still be used to propagate the predicate condition "state='TN'" to fact records based upon an index semi-join operation. This may involve evaluating the predicate condition against dimension records to determine a set of dimension values (e.g., non-key values) that satisfy the predicate condition and that are included in dimension index 804. This set of dimension values is referred to herein as a "value in-list".

Figure 8B:
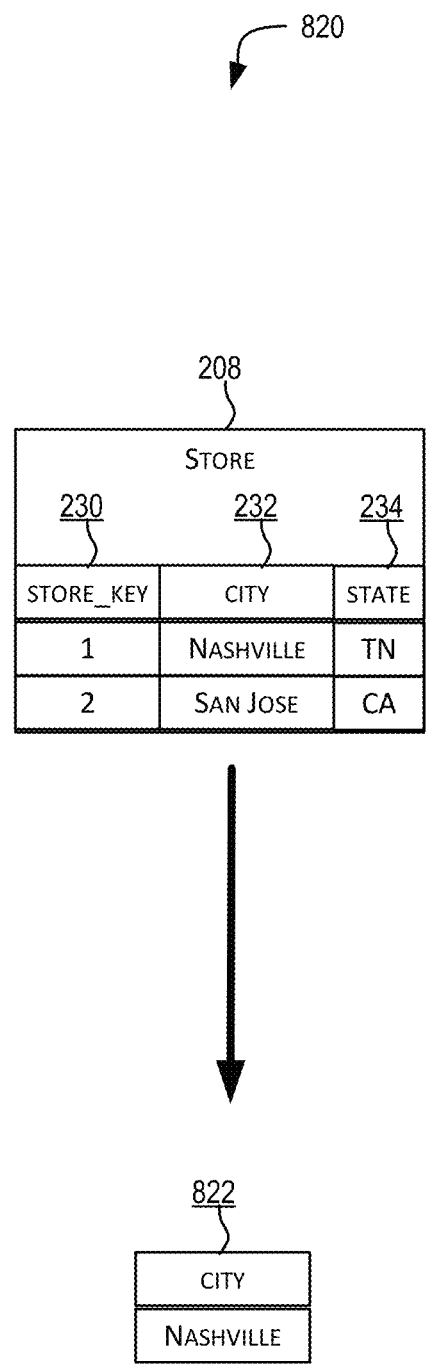

FIG. 8B depicts example processing 820 for generating a value in-list 822 that can be used to evaluate the predicate condition "state='TN'" against dimension index 804. More specifically, the predicate condition "state='TN'" is evaluated against dimension table 208 to determine value in-list 822 comprising one or more "city" values. In the example in FIG. 8B, this returns a single city value "Nashville". Value in-list 822 (e.g., "Nashville") can then be used to scan dimension index 804 for memory locations (e.g., locations 1, 4, 5, 7, 9, 10, 13, 15, 17, 19, 20, 23, and 24 for Nashville) corresponding to relevant records in table 802, thereby filtering the records of table 802 without scanning all of them.

Although performing an index semi-join operation conserves computational resources by avoiding scanning of all fact record, it incurs the computational overhead associated with generating a value in-list. To be worthwhile, this overhead should be exceeded by the reduction in fact records that would otherwise be unnecessarily processed (e.g., the fact records unrelated to Tennessee). Thus, enhancer 103 may estimate the computational savings prior to rewriting a query plan to include an index semi-join operation.

In the case of multiple predicate conditions, enhancer 103 may analyze the incremental savings of successively performing an index semi-join operation. This may involve placing the predicate conditions in a decreasing order of computational savings that would result from applying each predicate condition in isolation. Then, enhancer 103 may analyze the predicate conditions in this order to estimate the incremental savings from applying the predicate conditions in succession. Thus, an index semi-join operation may be specified for applying a successive predicate condition so long as the incremental savings is not insignificant.

As indicated above, not only can inferences be drawn from star schema information 116, but they can also be drawn from semantics metadata 117. An inference drawn from semantics metadata 117 can be used to translate a predicate condition so that it can be propagated to fact records. For example, semantics metadata 117 may include information indicating a hierarchical relationship between time values expressed in terms of weeks, months, quarters, etc. This information can then be used to translate a condition such as predicate condition "quarter=2" into "month BETWEEN 4 AND 6" so that the predicate condition may be evaluated against "month" values since the Date dimension table 204 depicted in FIG. 2 comprises month, day, and year fields but not a field for quarter. In this manner, a predicate condition based upon a value that is that is not a column in a dimension table can be translated to a value that is a column in the dimension table.

Figure 9:
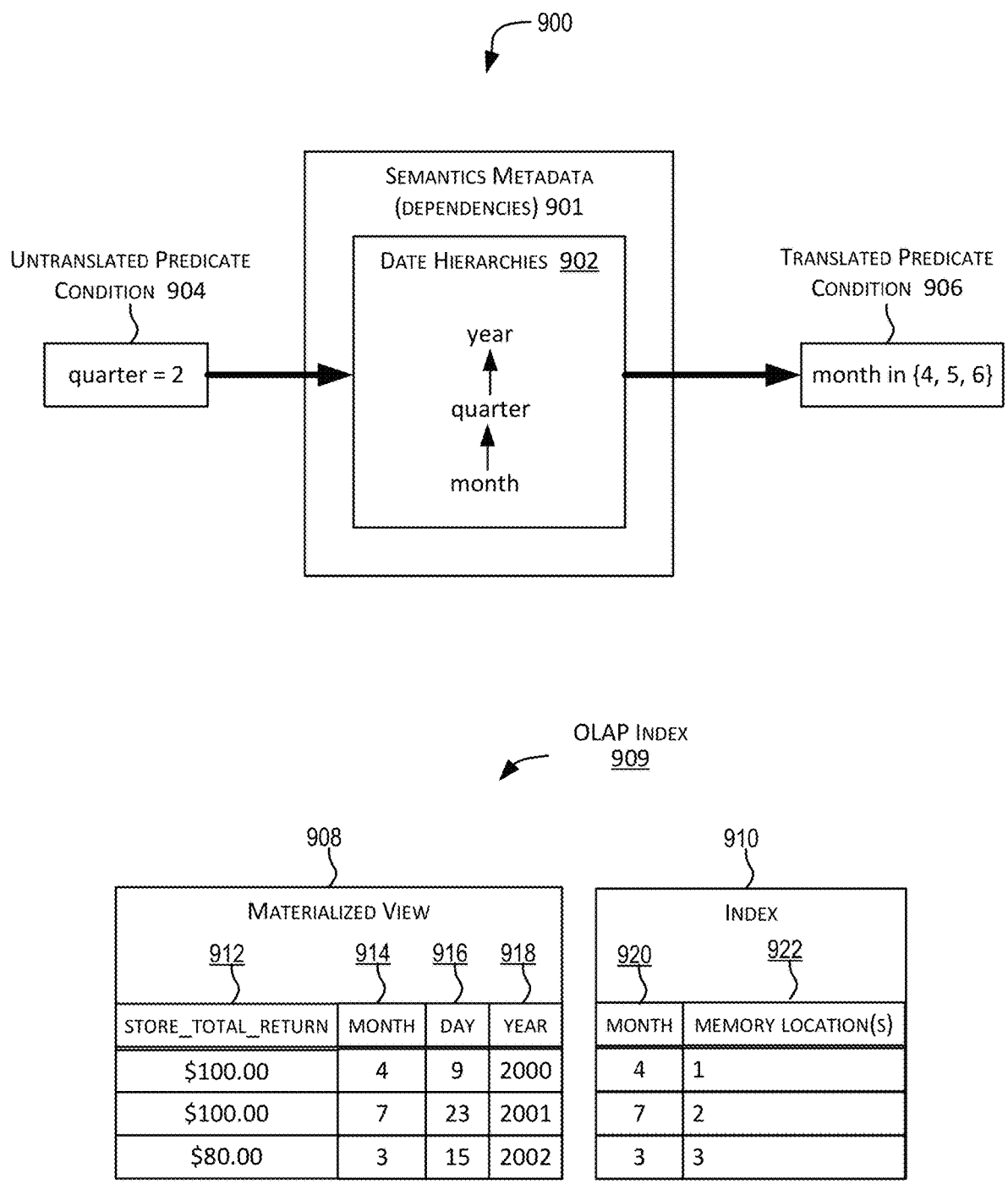
FIG. 9 depicts an approach for translating a predicate condition based upon functional dependencies, in accordance with certain embodiments.

FIG. 9 depicts an example 900 for propagating a predicate condition to fact records based upon functional dependencies according to certain embodiments. In the example of FIG. 9, "quarter=2" is an untranslated predicate condition 904 that may be identified for propagation to an OLAP index 909 depicted in FIG. 9 comprising a table 908 and a dimension index 910. However, none of columns 912, 914, 916, or 918 in table 908 is a "quarter" column, which makes it difficult to evaluate predicate condition 904 against the OLAP index 910.

Nevertheless, semantics metadata 901 may include dependency metadata that may be used to translate predicate condition 904 into predicate condition 906 based upon a dimension attribute in index 910. More specifically, semantics metadata 901 may comprise date hierarchies 902 (e.g., month to quarter, quarter to year) that can be used to convert predicate condition "quarter=2" into month-based predicate condition "month BETWEEN 4 AND 6". Thereafter, translated predicate condition 906 can be evaluated against dimension index 910, which maps month values 920 to memory locations 922. In this example, months 4, 5, and 6 satisfy the predicate condition and are mapped to their memory locations (or rowids). Although FIG. 9 depicts example processing 900 involving an OLAP index, it should be appreciated that a translated predicate condition may be propagated to any source of fact records using any suitable technique described herein.

In the example depicted in FIG. 9 and described above, the predicate condition based upon quarter is replaced with a constraining predicate condition based upon month. The replacement constraining predicate condition does not need to be equivalent of the original predicate condition; it just should return all the rows (fact records) returned by the predicate condition it replaces. The replacement strategy on equality and bound conditions (=, !=, <, >, <=, >=, in, between) is used for level-based hierarchies. For reasonable sized hierarchies, an in-memory representation of the hierarchies can be maintained and used by enhancer 103 to compute the replacement predicate condition during the generation of the enhanced query plan.

Since the goal is to reduce the number of fact records that are processed by execution of a query plan and/or to reduce the overall cost of performing scan operations in a query plan, application of predicate conditions plays a significant role in achieving this goal. In the example depicted in FIG. 9 and described above, the predicate condition that is provided in the query ("quarter=2") is different from the predicate condition ("month BETWEEN 4 AND 6") that replaces the provided predicate condition. Even though the two predicate conditions are different, application of the replacement predicate condition guarantees that any row returned by the supplied predicate condition is also returned by the replacement predicate condition. This offers a huge benefit in terms of performance of the query plan and the query. Replacement predicate conditions can be inferred by traversing functional dependencies. So in a quarter→month-→week date hierarchy, if we have a predicate condition on a week, if the week column is not pushable to the fact source, whereas the fact source can handle quarter predicate conditions, then we can push corresponding quarter predicate conditions, for example: week=1 can be pushed as quarter=1, week >25 can be pushed as quarter >2, and so on. Predicate condition translation is based on traversing the relationship tree that defines the dependency between columns. If these trees are maintained as in-memory structures then the translation is very fast and will not add much overhead to planning. This is certainly the case of hierarchies, where it is common to support member navigation through in-memory data structures.

Although FIG. 9 depicts an example involving a hierarchical relationship between the field specified in untranslated predicate condition 904 and the field specified in translated predicate condition 906, it should be appreciated that the techniques described herein are not limited to fields exhibiting hierarchical relationships. For example, semantics metadata 901 may include other types of information that may be used to perform translation of predicate conditions. For example, the semantics information may include information indicating that stores in the South do not sell winter clothes, thereby enabling a predicate condition expressed in terms of winter clothes to be translated into a predicate condition expressed in terms of geographical regions.

Any of the techniques described in this disclosure may be used to propagate a predicate condition to fact records. Propagating a predicate condition exhibits a transitive property in that a predicate condition may be propagated to fact records from dimension records that may not be directly joined with the fact records. For example, a predicate condition may be propagated across multiple dimension tables or across another fact table.

Figure 10A:
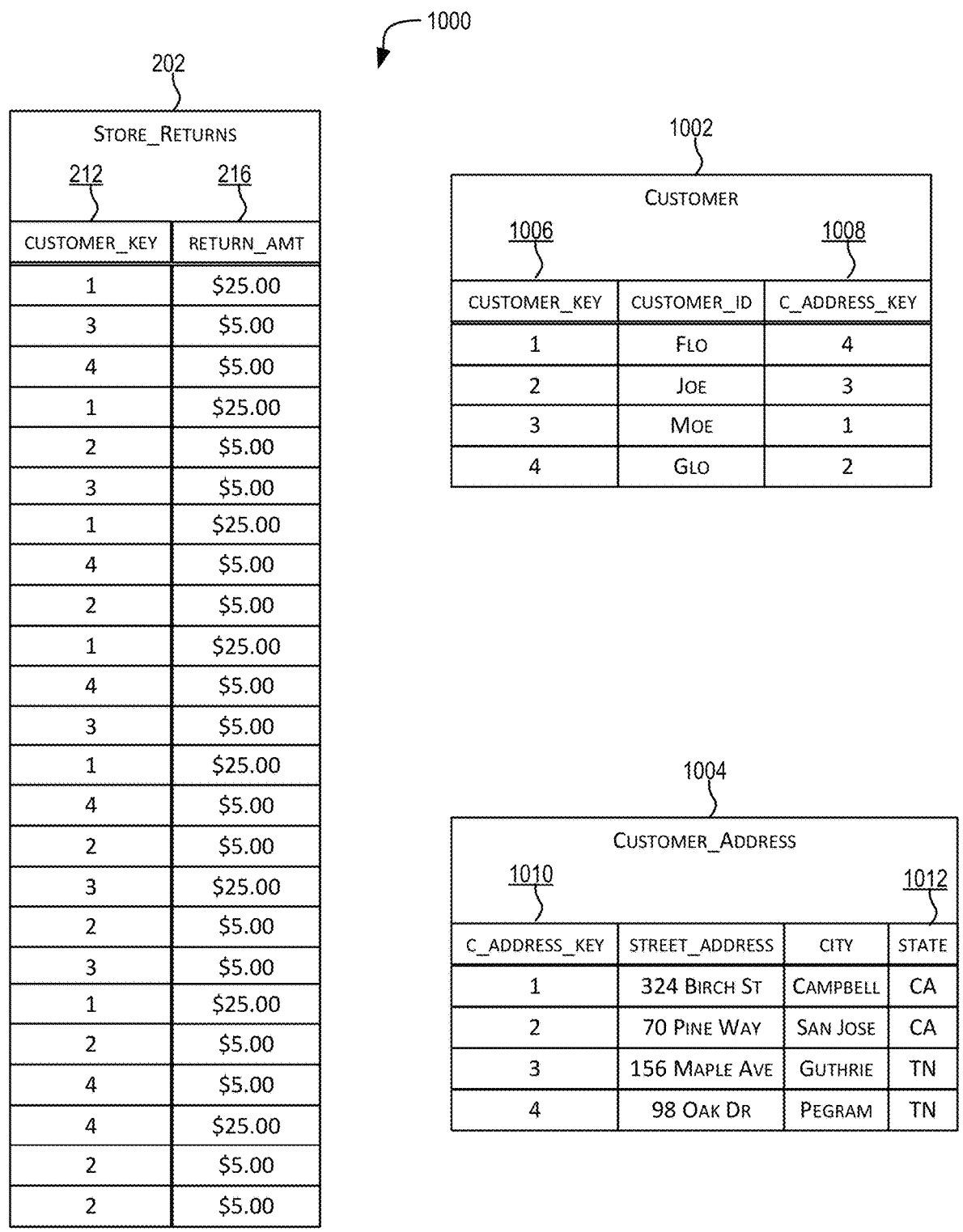
FIGS. 10A and 10B depict an approach for propagating a predicate condition from a first set of dimension records across a second set of dimension records to a set of fact records, in accordance with certain embodiments.

In some embodiments, a predicate condition may be propagated from a first set of dimension records across a second set of dimension records to a set of fact records. This can be illustrated with reference to the example depicted in FIG. 10A. FIG. 10A depicts an example database data 1000 comprising an abbreviated version of "Store_Returns" fact table 202, "Customer" dimension table 1002, and "Customer_Address" dimension table 1004. "Store_Returns" fact table 202 can be directly joined with "Customer" dimension table 1002 based upon columns 212 and 1006, and "Customer" dimension table 1002 can be directly joined with "Customer_Address" dimension table 1004 based upon columns 1008 and 1010. However, in the example of FIG. 10A, there are no columns that can be used to directly join "Store_Returns" fact table 202 with "Customer_Address" dimension table 1004.

Nevertheless, enhancer 103 may use star schema information 116 to infer that the predicate condition "state='TN'" can be propagated from "Customer_Address" dimension table 1004 to "Store_Returns" fact table 202, because they are each related to "Customer" dimension table 1002. Based on this inference, enhancer 103 may check for a table (or any other source of fact records) that relates a column of "Store_Returns" fact table 202 to a column of "Customer_Address" dimension table 1004.

Figure 10B:
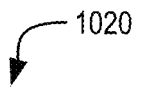

FIG. 10B depicts just such a table 1020. In the example of FIG. 10B, table 1020 comprises data resulting from a join operation involving "Store_Returns" fact table 202 and "Customer_Address" dimension table 1004 using columns 212 and 1006, and between "Customer" dimension table 1002 and "Customer_Address" dimension table 1004 using columns 1008 and 1010. Thus, table 1020 comprises a "state" column 1022 that corresponds to the "state" column 1012 of "Customer_Address" dimension table 1004.

Any of the techniques described herein may be used to propagate the predicate condition "state='TN'" to table 1020. For example, if there is an inverted index for the values of column 1022 in table 1020, the predicate condition may be evaluated against the inverted index to filter table 1020 to only scan fact rows that satisfy the "state='TN'" predicate condition.

For the example depicted in FIGS. 10A and 10B, the predicate condition can be propagated if the following conditions are met:

It has been already inferred that fact source Store_Returns table 202 (FS1) can be reduced based on the filters of dimension table Customer 1002 (T1).

The join between FS1 and T1 is a star schema Join in the star schema. This implies that this join operation does not add or remove any input fact records to the join.

The join between T1 and dimension table Customer_Address 1004 (T2)
        is not null-supplying on the T1 side
        is a star schema Join in the FS1.StarSchema then: if for each T1 joining column jc in T1 in the join T1-T2 there exists an equivalent column $ec_i$ in FS1, then we can apply the semiJoin restriction on the $ec_i$ columns in FS1.

Figure 11:
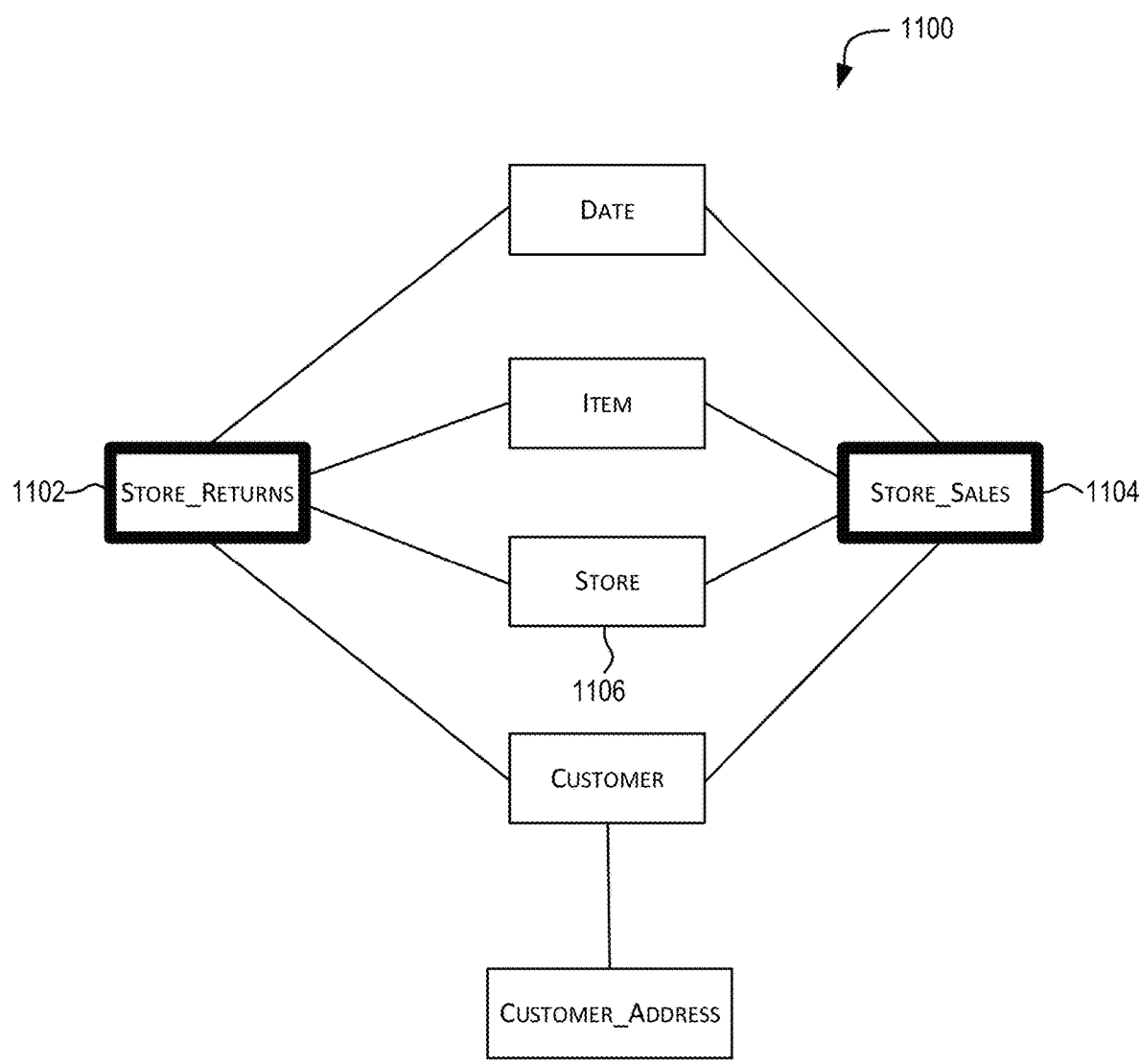
FIG. 11 depicts a schema comprising multiple fact tables, in accordance with certain embodiments.

In some embodiments, evaluation of a predicate condition may be propagated from a set of dimension records (from dimension table DT) across a first set of fact records (fact source 1 "FS1") to a second set of fact records (fact source 2 "FS2"). For example, this may be possible when a star schema comprises multiple sets of fact records. FIG. 11 depicts an example of such a schema 1100. Schema 1100 comprises two fact tables (shown with emphasized borders): "Store_Returns" fact records table 1102 and "Store_Sales" fact records table 1104. The other tables (Date, Store, Item, Customer, Customer_Address) are dimension tables storing context information for the fact records. The two fact tables are each capable of being joined with the dimension tables, such as with "Store" dimension records table 1106.

Figure 12A:
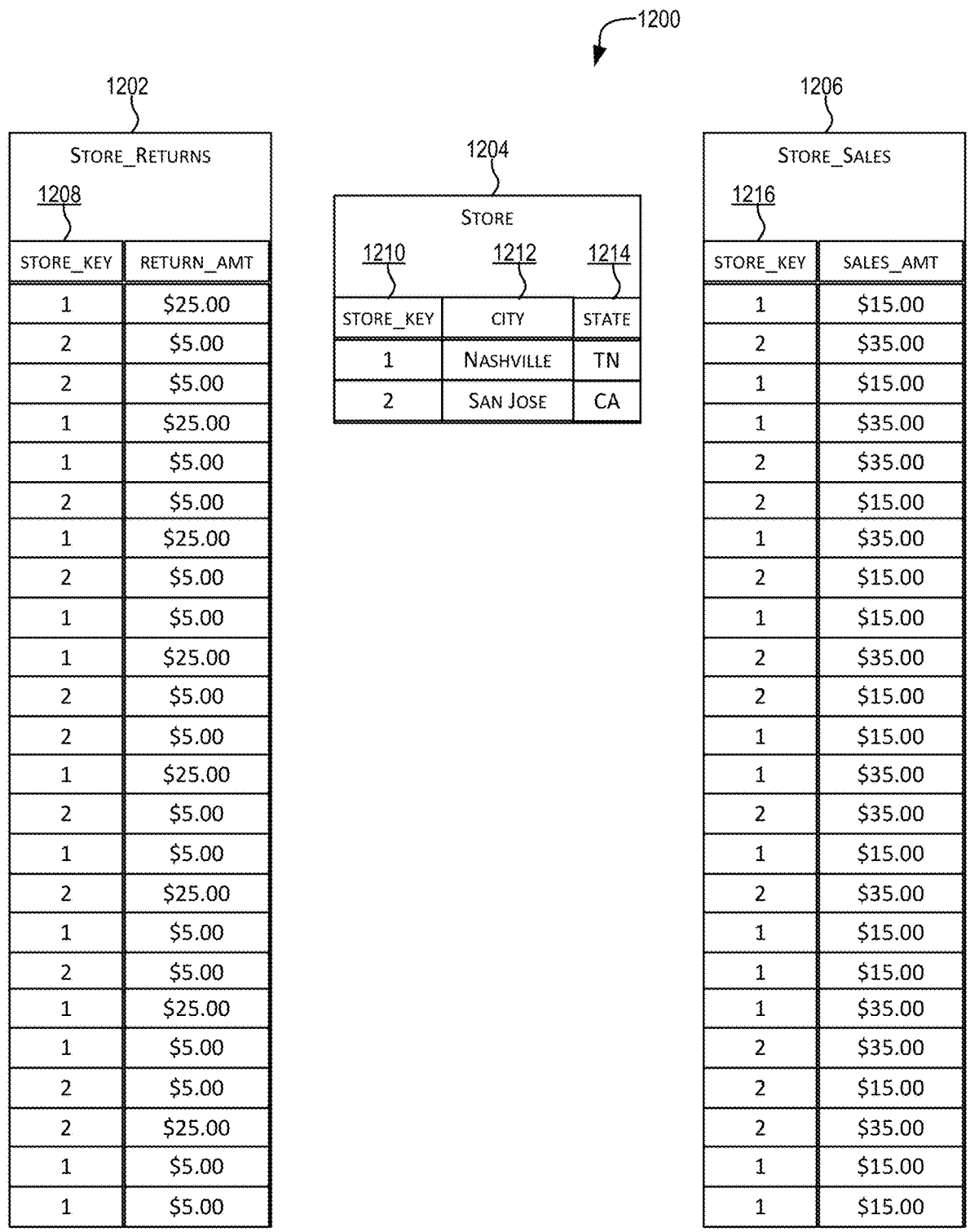
FIGS. 12A-C depict an approach for propagating a predicate condition across a set of dimension records (from dimension table DT) across a first set of fact records (fact source 1 "FS1") to a second set of fact records (fact source 2 "FS2"), in accordance with certain embodiments.

FIG. 12A depicts an example database data 1200 that may be described in schema 1100. Database data 1200 comprises "Store_Returns" fact table 1202, "Store" dimension table 1204, and "Store_Sales" fact table 1206. Although FIG. 12 depicts database data 1200 as tables, it should be appreciated that database data 1200 can be represented as indices, materialized views, and/or any other set of tuples.

"Store_Returns" fact table 1202 and "Store" dimension table 1204 can be joined based upon columns 1208 and 1210, which exhibit a foreign key-primary key relationship. Thus, a predicate condition (e.g., "state='TN'") involving any of columns 1212 and 1214 may be propagated from "Store" dimension table 1204 to "Store_Returns" fact table 1202 using any of the techniques described herein.

However, "Store_Sales" fact table 1206 can also be joined with "Store" dimension table 1204. This is because columns 1216 and 1210 also exhibit a foreign key-primary key relationship. Thus, based upon schema 1100 depicted in FIG. 11, enhancer 103 may infer that any filtering of "Store_Returns" fact table 1202 can also be applied to "Store_Sales" fact table 1206 using any of the techniques described herein.

Figure 12B:
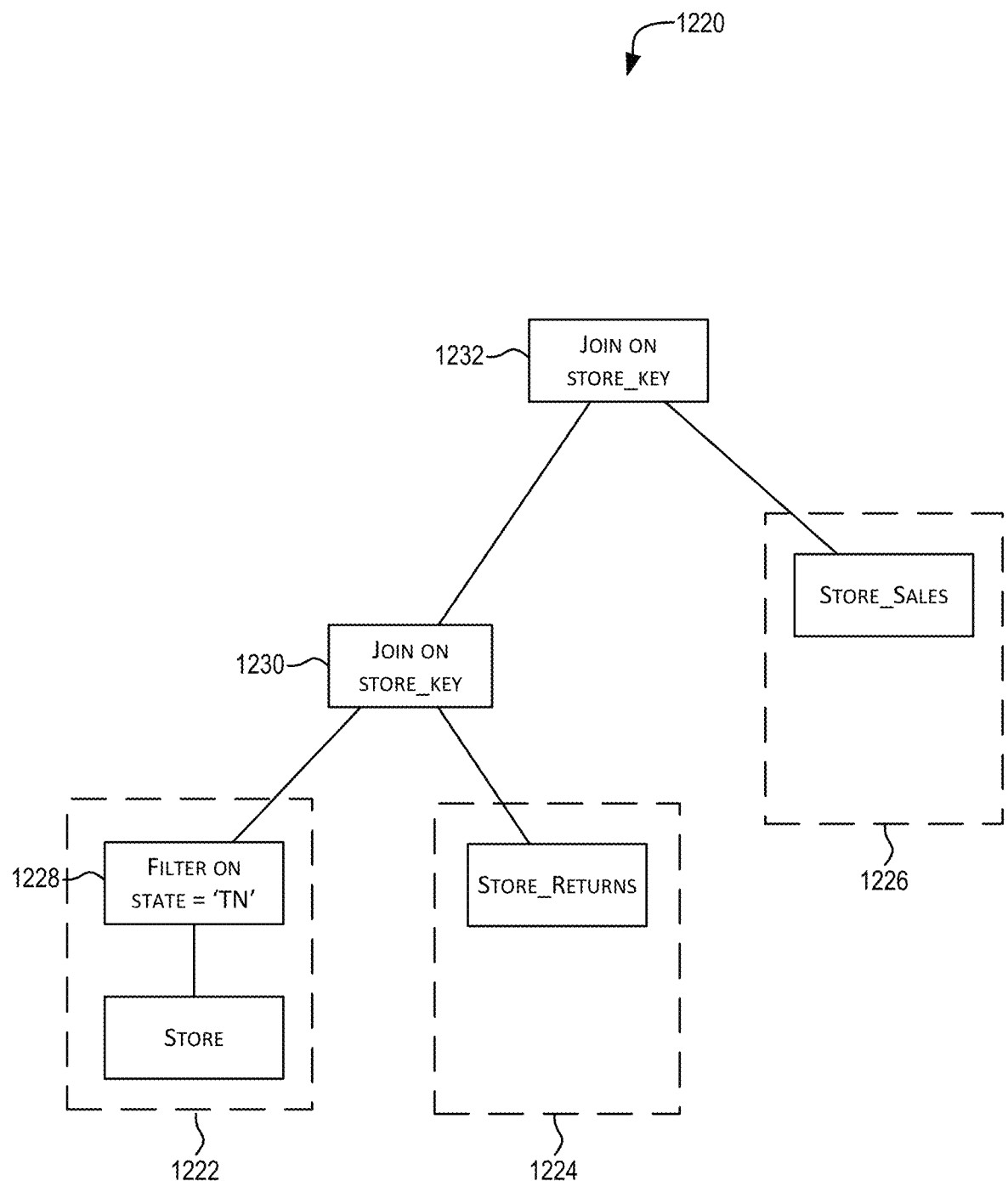

FIG. 12B depicts an example logical query plan 1220 comprising query sub-plans 1222, 1224, and 1226. According to query plan 1220, a join operation 1230 is performed between the results of performing operations in sub-plan 1222 and the results of performing operations in sub-plan 1224. Furthermore, plan 1220 specifies performing a join operation 1232 between the results of performing join operation 1230 and the results of performing operations in sub-plan 1226.

Although a filter operation 1228 is included in sub-plan 1222, filter operation 1228 is not included in sub-plans 1224 and 1226. This can result in a significant amount of unnecessary processing of all fact records from "Store_Returns" fact table 1202 when performing join operation 1230. In a similar manner, a significant amount of unnecessary processing may be performed when performing join operation 1232 on all fact records returned from "Store_Sales" fact table 1206 from sub-plan 1226. This unnecessary processing can significantly add to the total time taken for executing query plan 1220.

Figure 12C:
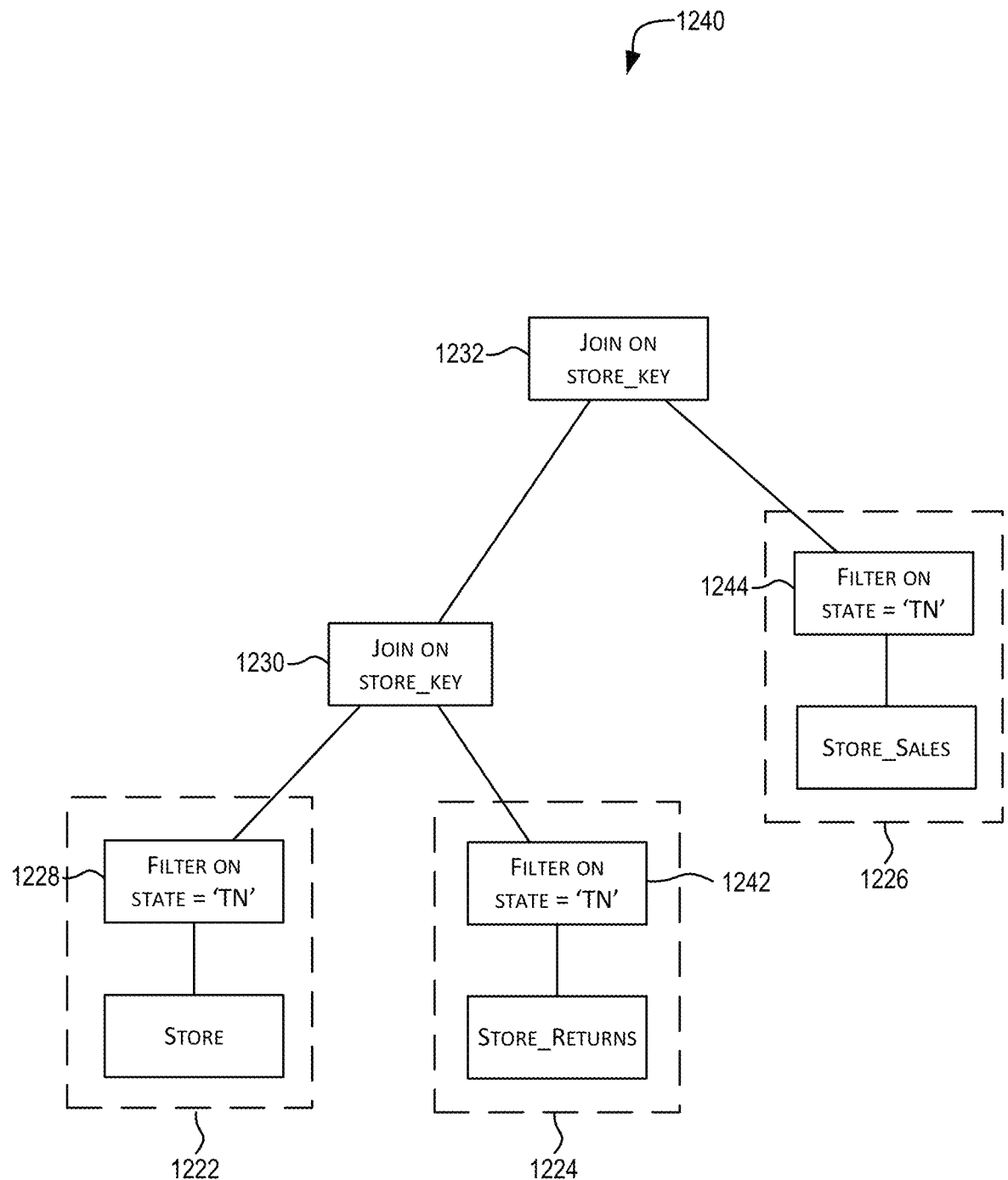

FIG. 12C depicts an example rewritten enhanced query plan 1240 that has been rewritten based upon query plan 1220 to reduce the number of fact records that are processed by the query plan. According to plan 1240, the predicate condition "state=TN" in filter operation 1228 is not only propagated into sub-plan 1224 as a filter operation 1242, but it is also propagated into sub-plan 1226 as a filter operation 1244. As a result of this, the number of fact records output by sub-plan 1224 and provided to join operation 1230 is fewer (assuming the Store_Returns table hold records where the state is not TN) than the fact records provided to join operation 1230 in query plan 1220. This is because, in plan 1240, only those fact records from fact table Store_Returns that meet the "state='TN'" predicate condition are provided to join operation 1230 instead of all fact records in plan 1220. In a similar manner, the number of fact records output by sub-plan 1226 and provided to join operation 1232 is fewer (assuming the Store_Sales table hold records where the state is not TN) than the fact records provided to join operation 1232 in query plan 1220. This is because, in plan 1240, only those fact records from fact table Store_Sales that meet the "state='TN'" condition are provided to join operation 1232 instead of all fact records in plan 1220. As a result of this, the computational overhead of performing join operations 1230 and 1232 may be significantly reduced by first filtering out any rows of "Store_Returns" fact table 1202 and "Store_Sales" fact table 1206 that do not satisfy the dimension predicate condition "state='TN'". Query plan 1240 thus executes much faster (e.g., uses fewer CPU cycles) and may, in many instances, use fewer memory resources, than the non-enhanced query plan 1220.

As described above, in certain embodiments, techniques are disclosed for transitive propagation of context across sub-queries involving the same (queries involving analysis of multiple grains of a fact) or different facts (e.g., queries involving comparing/combining different activities). In certain embodiments, these techniques may be applied if the following conditions hold:

A dimensional context application on a fact source FS2 based on a dimensional table DT has been determined.

There exists a join of another fact source FS1 with FS2 on the key columns of DT, and DT is also a dimension table in the star schema of FS2.

If the above conditions hold, then the dimensional context from DT can be applied on FS1

Figure 13A:
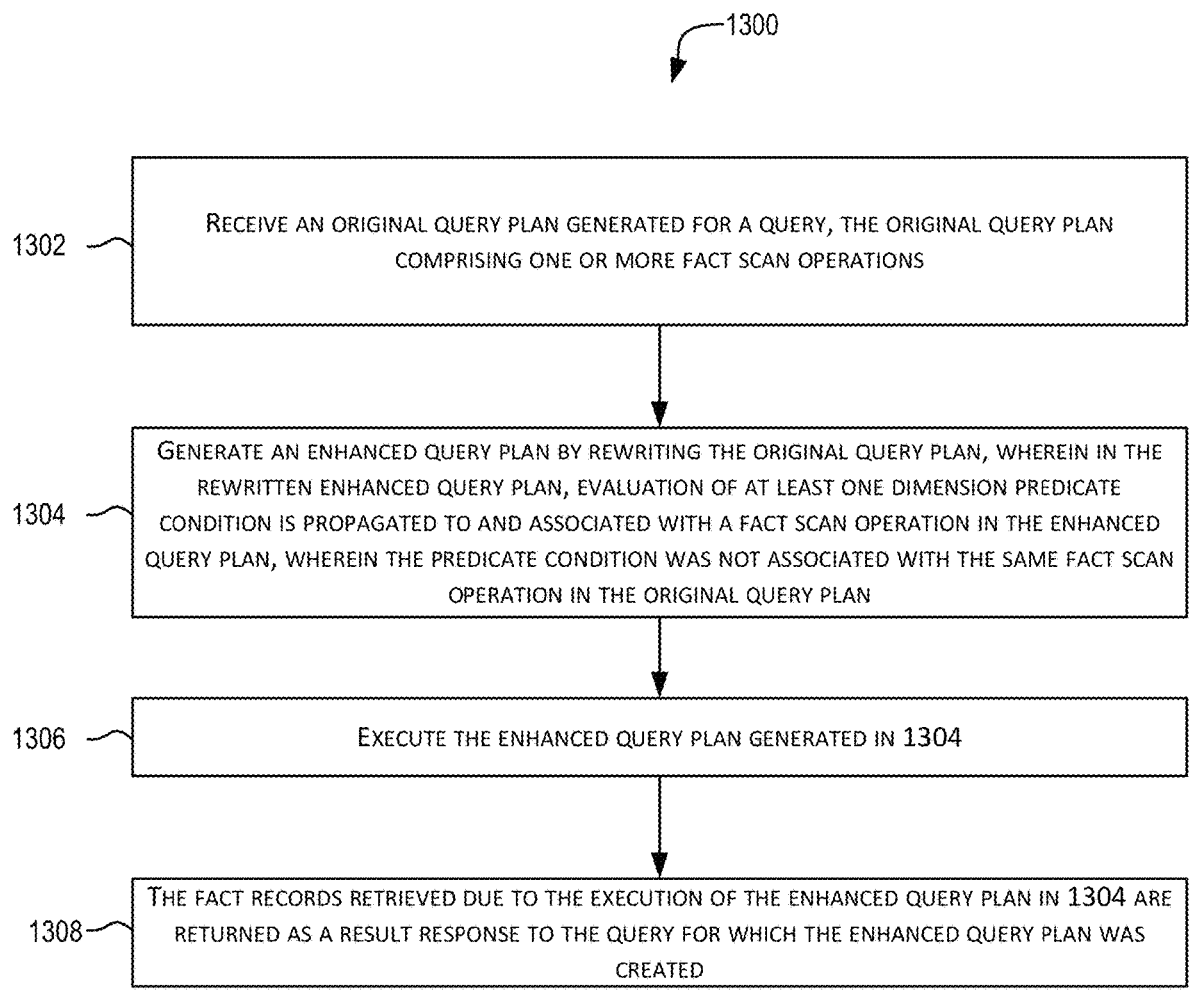
FIG. 13A is a simplified flowchart depicting a method of generating an enhanced query plan according to certain embodiments.

FIG. 13A is a simplified flowchart 1300 depicting a method of generating an enhanced query plan according to certain embodiments. Processing 1300 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 13 and described below is intended to be illustrative and non-limiting. Although FIG. 13 depicts the various processing steps occurring in a particular sequence or order, this is not intended to be limiting. In certain alternative embodiments, the steps may be performed in some different order or some steps may also be performed in parallel.

At 1302, a first or original query plan may be received. The original query plan may be a plan generated for a database query (e.g., a SQL query) provided to analytics platform 100 depicted in FIGS. 1A and 1B. The query may be an ad-hoc query to be run against non-pre-aggregated data stored in the database. With reference to the embodiment depicted in FIG. 1B, the original query plan may be generated by optimizer 114.

The original query plan may comprise a pipeline of operations (or operators). The operations (operators) may include, for example, fact scan (sometimes simply referred to as a scan operation), filter, join, aggregation, projection, and other operations. The operations in the original query plan may be hierarchically organized in a pipeline such that outputs of operations are provided as inputs to other downstream operation(s). The query plan may be represented as hierarchically as a rooted tree comprising parent and child nodes. In such a representation, operations are performed starting with operations represented by the leaf nodes of the tree. Outputs from the leaf nodes are then provided to the parent nodes, outputs from the parent nodes are provided to their parent nodes, and so on, until the root node where the output from the root node is provided is a result of the query for which the query plan is generated. For example, the original query plan received in 1302 may be as depicted in FIGS. 3 and/or 12B.

One or more operations in the original query plan may be grouped to form sub-plans. For example, the original query plan may comprise a first sub-plan that includes a fact table scan operation that involves scanning a source of fact records (e.g., a fact table). The first sub-plan may also include other zero or more other operations such as filter, join, aggregation, projection operations. For example, sub-plan 302 depicted in FIG. 3, and sub-plans 1222, 1224, and 1226 depicted in FIG. 12B. In the original query plan, fact records output by the first sub-plan (i.e., output from the first sub-plan as a result of operations performed in the first sub-plan) are provided as input to a parent operation in the original query plan pipeline.

At 1304, an enhanced query plan is generated by rewriting the original query plan. As a result of the rewriting, in the resultant enhanced query plan, evaluation of at least one dimension predicate condition is propagated to and associated with a fact scan operation in the enhanced query plan, wherein the predicate condition was not associated with the same fact scan operation in the original query plan. For example, a predicate condition may be inserted into the first sub-plan and associated with at least one fact scan operation in the first sub-plan. In the enhanced query plan, evaluation of the predicate condition is made as part of the sub-plan based upon propagating the predicate condition to the fact table. As a result of the propagation and association of the predicate condition with the first sub-plan and the fact scan operation, the enhanced query plan executes faster than the original query plan. For example, in some instances, as a result of associating the predicate condition with a fact scan operation, the fewer fact rows/records are processed by the enhanced query plan as compared to the original query plan. This is because only those fact records that satisfy the predicate condition are provided for parent or downstream operations in the query plan pipeline; fact records that do not satisfy the predicate condition are filtered out and not provided to the parent operation, which may, for example, be a join operation. This results in a decreased number of fact records being provided to the next and subsequent operations in the query plan pipeline. This reduces the computational overhead associated with subsequently performing the join operation and other subsequent operations in the query plan pipeline. Since fewer fact records need to be processed and carried forward in the query plan pipeline, the enhanced query plan executes faster and uses fewer resources (e.g., processing resources, memory resources) than the original query plan.

In some other instances, the predicate condition associated with a fact scan operation is such that, even though the total number of fact records output from the fact scan operation to downstream operations in the query plan pipeline may not be reduced, the cost associated with performing the fact scan operation (e.g., the CPU cycles or time required to perform the fact scan operation) is reduced as compared with the same fact scan operation in the original query plan.

As a result, the enhanced query rewritten in 1304 executes faster than the original query plan received in 1302. Consequently, the query for which the enhanced query plan is generated executes faster and possibly use fewer memory resources. The enhanced query plan is thus an enhancement and improvement over the original query plan. In the embodiment depicted in FIG. 1B, the processing in 1304 may be performed by enhancer 103.

At 1306, the enhanced query plan generated in 1304 may be executed. As indicated above, due to the propagation of one or more predicate conditions to one or more operations in the query plan, the enhanced query plan executes faster (i.e., using less time) and may, in many instances, use fewer memory resources than the non-enhanced original query plan.

At 1308, the fact records retrieved from the database as a result of execution of the enhanced query plan in 1306 may be output as a response to the query for which the original and enhanced query plans were generated. In the embodiment depicted in FIG. 1B, the processing in 1306 and 1308 may be performed by executor 105.

Figure 13B:
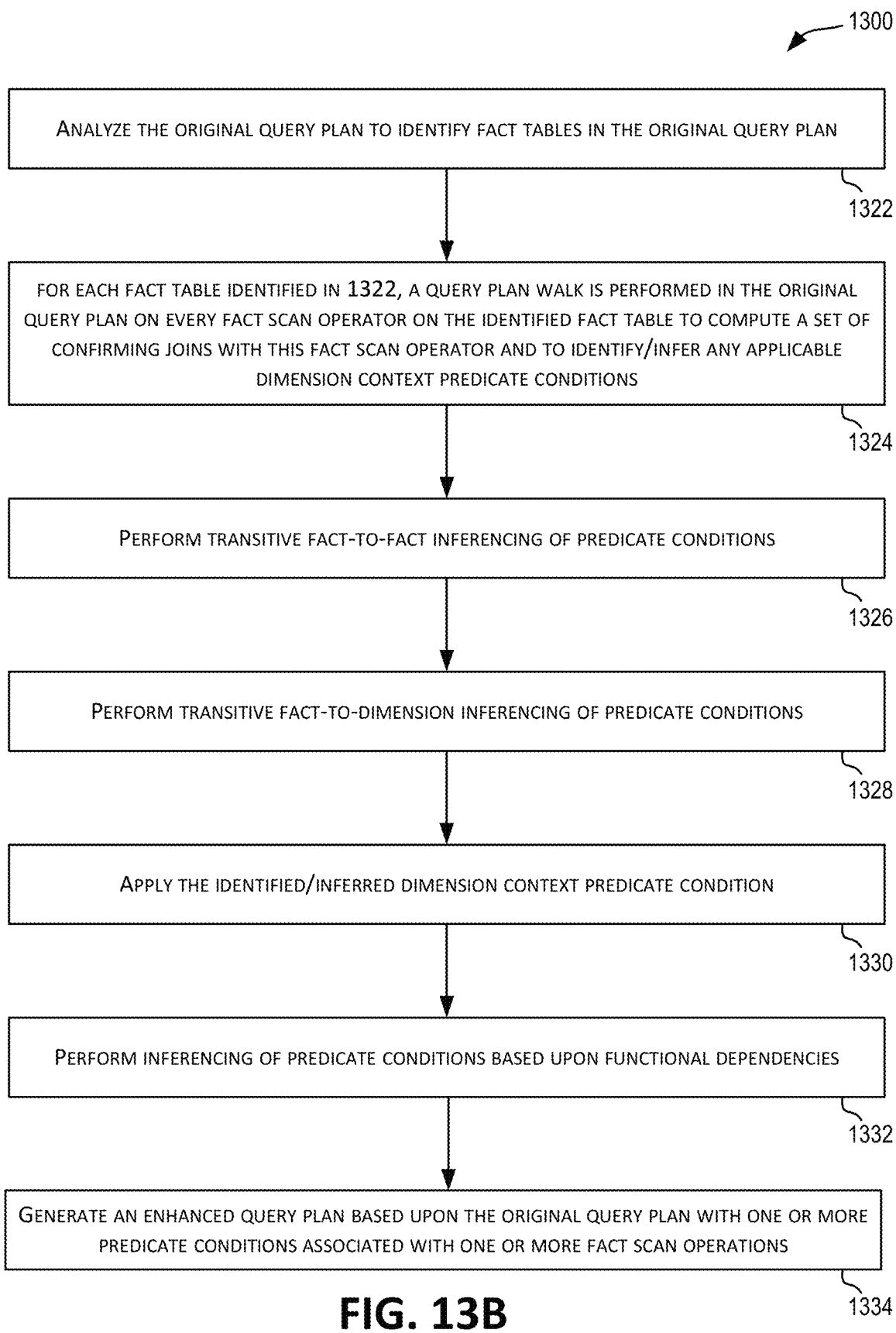
FIG. 13B is a simplified flowchart depicting more details related to a method of generating an enhanced query plan according to certain embodiments.

FIG. 13B is a simplified flowchart 1320 depicting a method of generating an enhanced query plan according to certain embodiments. The processing in FIG. 13B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 13B and described below is intended to be illustrative and non-limiting. Although FIG. 13B depicts the various processing steps occurring in a particular sequence or order, this is not intended to be limiting. In certain alternative embodiments, the steps may be performed in some different order or some steps may also be performed in parallel.

In certain embodiments, the processing depicted in FIG. 13B may be performed as part of the processing performed in 1304 in FIG. 13A. For the embodiment depicted in FIG. 1B, the processing depicted in FIG. 13B may be performed by enhancer 103. The inputs to enhancer 103 include an original query plan generated for a query, for example, a SQL query plan generated for a SQL query. Enhancer 103 also has access to metadata information and schema information such as information about relational schemas, star schema definitions, functional dependencies among columns of tables, available physical structures of data such as OLAP indexes on star schemas, and the like. For purposes of FIG. 13B and the accompanying description, it is assumed that the metadata and schema information is stored in a metastore. The output of the processing depicted in FIG. 13B is an enhanced query plan that executes faster than the original query plan and, in many instances, uses fewer resources than the original query plan, while returning the same results as the original query plan. As described above, the enhanced query plan executes faster than the original query plan because it processes fewer number of fact records than the original query plan and/or the cost of processing the fact records in the enhanced query plan is less than in the original query plan because the fact records are processed more efficiently.

As depicted in FIG. 13B, at 1322, the original query plan is analyzed to identify fact tables in the original query plan. This may be performed using various different techniques. For example, fact tables in the original query plan may be identified by matching tables in the original query plan against fact tables in the metastore, through user hints at the query level or session/connection level, and other techniques.

At 1324, for each fact table identified in 1322, a query plan walk is performed in the original query plan on every fact scan operator on the identified fact table to compute a set of confirming joins with this fact scan operator and to identify/infer any applicable dimension context predicate conditions. In certain embodiments, a walk on a fact table scan operator in the original query plan involves starting from the fact scan operator and traversing up the original query plan until the root node of the original query plan is reached. For example, for the query plan depicted in FIG. 3, a walk for the Store_Returns fact table scan operation in sub-plan 302 involves starting from this node 320 and visiting all of its ancestor nodes: node 322, node 324, node 306, and so on until and including root node 326.

In order to identify/infer applicable dimension context predicate conditions for the fact scan operation for the fact table during the walk, enhancer 103 maintains the 'grain' of the output of each visited node operation/operator. The output of any relational operator in a query plan is a computed dataset. The "grain" of any table (base dataset) or computed dataset is a set of dimension columns in its schema. For a fact table, its grain includes all associated dimension keys. For example, in FIG. 4, grain of Store_Returns is Date_key, Item_key, Store_key, Customer_key. Further for every dimension, since all attributes are functionally determinable by the key attribute, they are valid in the grain of the fact table. So for example, Year, Quarter, Month, etc. are determinable by the Date_key and so they are valid in the Store_Returns grain. Applying similar arguments, all dimension columns in FIG. 4 are valid in the grain of Store_Returns table.

Now in FIG. 3, the Aggregator operation/operator 324 outputs rows by Customer_key, Store_key, so the grain of the dataset defined by operation 324 is Store_key, Customer_key. But again, by functional dependency all Customer and Store columns are valid in its grain. So, for fact table Store_Returns, a dataset defined on the star schema depicted in FIG. 4 with schema: (Cust_Name, Item_Category, Store_Name, Qty) may have a grain of (Cust_Name, Item_Category, Store_Name).

At the start of a walk, the grain for a fact table for a fact scan operation is all the attributes in associated dimensions of the fact table. So in FIG. 3, for the Store_Returns in sub-plan 302, this would be all the columns from the Date, Item, Store and Customer dimension tables, also included is the ancillary Customer attributes from Customer_Address dimension table. This is based on the star schema defined for the fact table in FIG. 4.

During the walk in 1324, special processing is performed upon encountering a node corresponding to a Join operation. This involves capturing confirming joins with the fact table and attempting to infer applicable context that can be propagated from the "other-side" of the Join to the fact scan operation side or "fact-side." For example, in FIG. 3, for the Join operation node 322, the fact-side would be Store_Returns node 320, and the other-side would be the Filter operation node 328. As another example, in FIG. 3, for node 306, the fact-side would be the left sub-tree 302 and the other-side would be the right sub-tree 312.

A confirming join implies that the join does not change the grain of the fact-side. For example, one of the most common confirming pattern involves the join condition being the same as the condition on an edge in the star schema. Accordingly, for a query involving the star schema depicted in FIG. 4, the join must be between Store_Returns and Store on store_key, or Store_Returns and customer_key, and so on. In contrast, examples of non-confirming joins would include a join between a Store_Returns materialization (such as materialized view or OLAP index) and Customer on customer_name, or Store_Returns and a Store_Rent table on store_name; in this Store_Rent is not part of the star schema.

Upon encountering a confirming join, the inferencing logic then checks the following additional conditions on confirming joins: the fact-side grain must include the dimension grain that is being joined. If this is the case then any context (predicate conditions) on the other-side of the join that is functionally determined by the joining grain is applicable on the fact-side and hence on the fact table. For example, for the query plan depicted in FIG. 3, for the leftmost 'Join ON Date Key' node 322, the left fact-side subtree of the Join operator has the grain 'Customer, Item, Date, Store', the join on the other-side is on the Date dimension; so this is a confirming join at the grain of Date Key. All Date attributes can be determined by the Date Key, so a predicate on Year can be propagated to the fact scan operation on fact table Store_Returns represented by node 320. Similar analysis may be performed for the fact scan operation on Store_Returns fin sub-plan 312.

Information regarding the applicable grain is maintained and updated during a walk. At the start, all Dimension attributes in the grain are identified. On traversing an Aggregate operation/operator (e.g., nodes 324 and 330 in FIG. 3), the grain changes to the grouping columns. For example, in FIG. 3, on traversing the Aggregate operation/operator in node 324, the grain becomes (Customer_key, Store_key). In certain embodiments, rules are configured and maintained on how the grain is modified on traversing different type of relational operations/operators that are found in a query plan.

As part of the walk in 1324, for each fact table scan operator, information is maintained by enhancer 103 including a list of confirming joins with the joining table involved, a list of applicable one or more dimension context predicate conditions that has been identified or inferred for that fact scan operation. At the end of a walk for a fact scan operation, the fact scan operator being walked has a candidate list of applicable one or more dimension contexts (predicate conditions) and confirming joins.

At 1326, transitive fact-to-fact inferencing of predicate conditions is performed. This processing involves transitive inference of predicate conditions across the same facts or different facts. For each pair of fact scan operators, say "fs1" (fact scan on fact table ft1) and "fs2" (fact scan on fact table ft2), enhancer 103 looks for a join operator such that the join condition is on a dimension D1 with joining attribute D1.ja, such that D1 is in the star schema of both ft1 and ft2.

For example, in FIG. 12B:
fs1 is Store_Returns scan (box 1224);
fs2 is Store_Sales scan (box 1226);
the join that joins the two fact tables is node 1232;
the common dimension D1 is the Store dimension; and
the join is on the Store_key attribute of Store.

On finding such a pattern, if both fact tables involved are at the grain of the joining attributes D1.ja, then enhancer 103 can propagate any inferred dimension context on dimension D1 that is functionally determined by the joining grain for fs1 to fs2, and vice-versa. Accordingly, in FIG. 12B, the inferred context predicate condition 'State=TN' from Store_Returns scan (box 1224) can be propagated to Store_Sales scan (node 1226) via the join on Store_key in box 1232. Such fact-to-fact inferencing is transitive; so dimension context can propagate from fs1(on ft1) to fs2(on ft2) to f3(on ft3) and so on.

Figure 17:
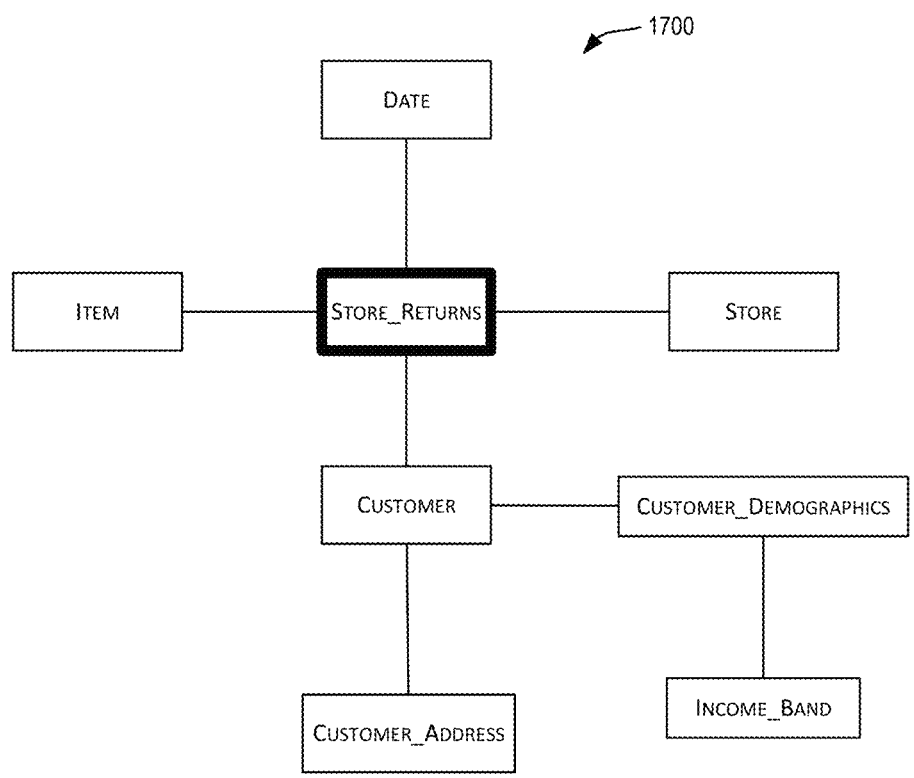
FIG. 17 depicts another schema, in accordance with certain embodiments.

At 1328, transitive fact-to-dimension inferencing of predicate conditions is performed. Since star schemas can be snowflake schemas, the length of the join path from a dimension table to the fact table in a star schema can be more than one. The processing in 1328 may be described using schema 1700 depicted in FIG. 17. In FIG. 17, Store_Returns is a fact table and the other tables are all dimension tables (note, schema 1700 is a slight variation of schema 400 depicted in FIG. 4. In FIG. 4, Income_Band is associated with Store_Returns only through a four table join: Income_Band join Customer_Demographics join Customer join Store_Returns. If there exists a physical representation of Store_Returns that contains Income_Band attributes, for example an OLAP index on Store_Returns that includes the income_upper_bound attribute, then it may be possible to apply income_upper_bound predicates on it. In order for enhancer 103 to infer the application of income_upper_bound context (predicate) on an OLAP index fact source it has to propagate through the three joins that connect Income_Band dimension table with the fact table: Income_Band join Customer_Demographic, Customer_Demographic join Customer, and Customer join Store_returns. This may be done by recursively building up the list of confirming joins of a fact scan operator, and every time a new applicable confirming join is encountered, an attempt is made to propagate any available dimension context from the other-side as in 1324.

At 1330, the one or more inferred dimension context predicate conditions are applied and associated with the fact scan operations. By this point, where applicable, each fact table scan operation/operator (or in general, fact source scan operation) identified in the original query plan is associated with a list or set of one or more applicable dimension context predicate conditions. As part of the processing in 1330, the predicate conditions identified for each fact scan operation are ordered based on their net benefit, where the net benefit for a predicate condition is a reduction in the cost of processing fact rows after applying the predicate condition minus the cost of applying the predicate condition.

Accordingly, as part of 1330, for each fact scan operation, a net benefit metric may be computed by enhancer 103 for each predicate condition in the list of applicable predicate conditions determined for that fact scan operation. Several factors may be considered by enhancer 103 for computing the net benefit metric and for performing the ordering such as:

- The available physical representations of the facts, such as the availability of an OLAP index on the facts and the columns in the OLAP Index. Note, not all dimension columns need to be in the OLAP index.
- The selectivity of the inferred dimension context; highly selective predicates are preferred over less selective predicates.
- The cost of applying the dimension context predicate condition. For example, pushing predicates to an OLAP Index Scan incurs almost no additional cost and is preferred; an Index Semi Join is preferred over a traditional Semi-Join because Index Semi Joins leverage the ability to do highly efficient skip scans in index scan operations/operators.

As part of 1330, after the ordering, for each fact scan operation, one or more predicate conditions from the list of predicate conditions are determined for associating with the fact scan based upon the ordering. In certain embodiments, for an fact scan operation, a predicate condition from the list that offers the best net positive benefit is selected to be associated with the fact scan operation.

In certain embodiments, for an fact scan operation more than one predicate conditions from the ordered list of predicate conditions for that fact scan operation may be associated with the fact scan operation. In such a scenario, after the predicate condition offering the highest net benefit has been associated with the fact scan operation, for each additional predicate condition in the ordered list, starting with the predicate condition offering the next best net benefit, a net benefit analysis is done considering the association of that additional predicate condition and all previously associated predicate conditions for that fact scan operation to determine if the additional predicate condition is to be associated with the fact scan operation. When multiple predicate conditions are associated with an fact scan operation, the benefits of applying additional predicate conditions typically diminishes with the number of predicate conditions that are associated.

After the processing in 1330, it is possible that for a particular fact scan operation, none of the one or more predicate conditions identified as applicable to that fact scan operation provide a net benefit. In this case, no predicate condition may be associated with that fact scan operation.

In 1332, enhancer 103 performs processing to determine whether execution of the query plan can be further optimized by inferencing any new one or more predicate conditions for one or more fact scan operations in the query plan based upon existing predicate conditions associated with the fact scan operations. An existing predicate condition for an fact scan operation may be a predicate condition (original predicate condition) associated with the fact scan operation in the original query plan and/or a predicate condition associated with the fact scan operation after the processing performed in 1330. Accordingly, as part of the processing performed in 1332, enhancer 103 may attempt to find a new translated predicate condition based upon an original predicate condition associated with the fact scan operation if the new predicate condition offers a greater net benefit for the fact scan operation than the original predicate condition. In a similar manner, for a predicate condition associated with a fact scan operation in 1330, enhancer 103 may attempt to find a new translated predicate condition based upon the associated predicate condition if the new predicate condition offers a greater net benefit for the fact scan operation than the predicate condition associated with the fact scan operation in 1330.

In certain embodiments, as part of 1322, enhancer 103 attempts to find an implied predicate from the identified/inferred predicates based on functional dependencies among dimension attributes. For example for the query plan depicted in FIG. 3, we show the application of the predicate condition 'State=TN' on the left Store_Returns in FIG. 5 box 502. Suppose this application of 'State=TN' was not cost efficient, possibly because the OLAP index available did not have the State attribute. In this case, enhancer 103 may use the following metadata information to infer a new predicate condition:

- the State and City columns are in a hierarchy;
- 'TN' has only 2 cities listed in the database; and
- City column is in the OLAP Index.

The above information may be used to possibly infer that the 'State=TN' dimension context can be applied as 'City=Memphis or City=Nashville', where the application of the inferred predicate condition involves a very fast OLAP Index scan. Application of this inferred predicate condition may provide net benefits towards the execution of the overall enhanced query plan. Another example of a translated predicate condition is depicted in FIG. 9 and described above.

In certain embodiments, the processing in 1322 is performed for a fact scan operation in the query plan only if: there is no original predicate condition (i.e., in the original query plan) associated with the fact scan operation; at least one predicate condition was identified in the list of predicate conditions eligible for association with the fact scan operation based upon the processing performed in 1324, 1326, and 1328; and, based upon the processing performed in 1330, it was determined that none of the predicate conditions in the list determined for the fact scan operation offered any positive net benefits and thus were not associated with the fact scan operation in 1330. In such a scenario, enhancer 103 may perform the processing in 1332 on one or more predicate conditions in the list of predicate conditions identified for the fact scan operation, to see if any such translated new predicate condition offers positive net benefits for the fact scan operation. If such a translated new predicate condition is found, then it may be associated with the fact scan operation by enhancer 103 in 1332. This is however not intended to be limiting. In some other embodiments, the processing in 1332 may be performed for any original predicate condition and/or any predicate condition associated with a fact scan operation in 1330.

At 1334, an enhanced query plan is generated based upon the original query plan with one or more predicate conditions associated with one or more fact scan operations. In certain embodiments, the original query plan is rewritten as the enhanced query plan such that, in the enhanced query plan, the one or more predicate conditions identified to be associated with one or more fact scan operations are actually associated with the fact scan operations. Accordingly, when the enhanced query plan is executed in 1308 as part of executing the query, the associated predicate conditions are evaluated against the fact scan operation they are associated with.

The enhanced query plans that are generated based upon the teachings disclosed herein offer several benefits over conventional techniques. As described above, analytical queries, such as SQL queries, typically involve calculations on multiple dimensions and entail multiple layers of calculations on one or more fact tables that are combined by navigating dimensional associations. As an example, a common example of a dimensional association is a hierarchy like Year-Quarter-Month or Country-State-City, etc. In the example depicted in FIG. 3, sub-plan 302 involves a calculation on Store_Returns of Customers at each Store, and sub-plan 312 involves a calculation about aggregate returns at a Store for all Customers of the Store. At node 306, these two are combined to discover 'problem' customers. Such multi-layer calculations on terabyte (or even higher) scale and beyond databases are very computationally intensive and answering arbitrary queries in 'think-time' is very challenging. The various inventive techniques disclosed herein provide an analytics platform that enables an interactive experience for ad-hoc queries at such scale including but not restricted to OLAP Indexing, and scale-out shared nothing architectures. The analytics platform described herein provides the ability to run interactive ad-hoc queries on very large (terabytes and beyond) multidimensional data (e.g., data stored in a data lake) in a very cost effective manner; running such interactive ad-hoc queries on very large (terabytes and beyond) multidimensional data in the past using conventional techniques was very cost prohibitive and did not scale.

Often times for a query, the intention of an analyst is to focus on a small region of the vast multi-dimensional space. For example in FIG. 3, the focus of the analysis is on the state of Tennessee. But with a query language like SQL, this analytical context can get obscured because writing such multidimensional calculations using relational algebra operators can be unwieldy. Further SQL writing is often times done through SQL Generator tools or by data engineers who are not domain experts—their goal is to produce a SQL that gives the correct answer; they are not interested with carrying semantic information like analysis is on 'State of Tennessee' in a manner that makes it easy for the SQL query engine to generate a query plan that avoids unnecessary facts processing. Conventional relational query optimizers operate on relational schemas and hence lack knowledge about the very valuable multi-dimension cube semantic model that is the basis of how analysis questions are expressed; every analyst has this model in his/her head. The analytics platform disclosed herein performs processing to reverse engineer the context of the analysis from the structure of the query plan by leveraging the relationships defined in the multi-dimension cube semantic model. In many cases this leads to inferring applicable dimension context (predicate conditions) that significantly reduce the resources needed to process the facts. At a large size of data scale (e.g., terabyte scale) and beyond this, reduction in fact processing cost, as described herein, has a major impact on the ability to process ad-hoc queries interactively.

As described above, an analytics platform is provided for making analytic queries execute more efficiently. In certain embodiments, an Apache Spark native analytics platform is provided. Query plans generated for analytics queries (e.g., SQL queries) are optimized to create optimized and enhanced query plans. Semantics information, such as business data and business intelligence data, is used to generate the enhanced query plans. Domain semantics are used to generate more efficient query plans. Business semantics are used for query execution optimization.

From a performance perspective, the enhanced query plans execute faster (because they require fewer CPU cycles for completing their execution) and may, in many instances, use fewer memory resources than non-enhanced query plans. As a result of rewritten query plans, corresponding queries can execute an order of magnitude faster (e.g., 10×, 25×, 100×, etc.) than before the rewriting. This is because fact tables are orders of magnitude bigger than dimension tables and so reducing the scan costs associated with processing fact records leads to huge performance gains.

As previously indicated, the analytics platform described herein may be implemented as an Apache Spark native solution using a Spark cluster. It thus fully utilizes the power of Apache Spark and its ecosystem like core components, scale in-out memory runtime, catalyst components, JDBC, metastore, etc.

As described herein, techniques are described for generating optimized query plan where the cost of processing and scanning fact records by the enhanced query plan is reduced compared to the unenhanced query plan. An analysis activity is often focused on a particular sub-population or sub-context rather than on the entire dataset. Inferring the context applicable to a query from semantics information and applying the context to the query plan (e.g., by context or predicate condition propagation) can lead to significant performance improvement in the execution of the query plan and consequently the query for which the query plan is generated. No matter the analysis domain, or the analysis activity, there are common patterns that can be identified to determine the context of the analysis. In certain embodiments, techniques are provided for identifying these patterns and generating optimized enhanced query plans.

Figure 14:
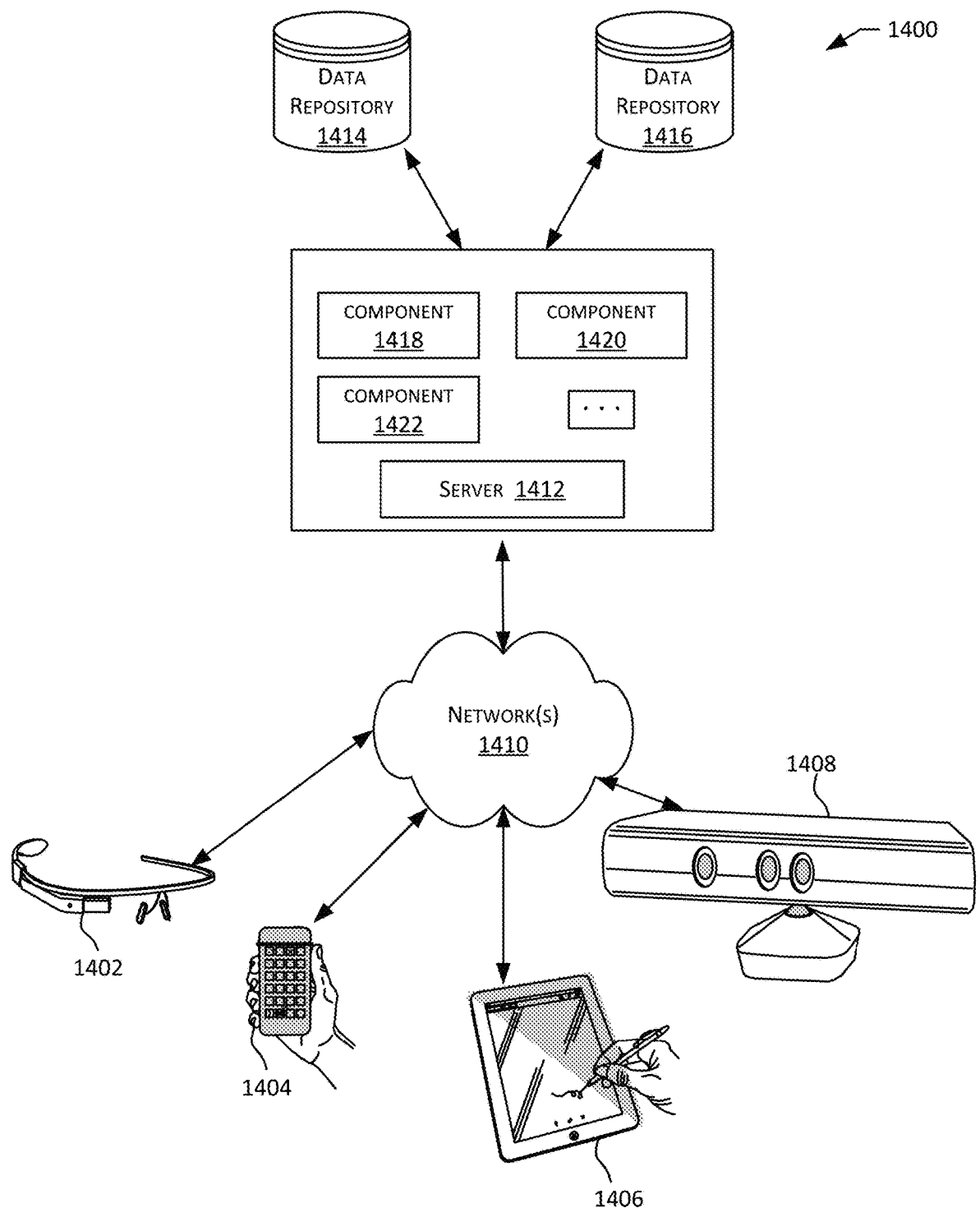
FIG. 14 depicts a simplified diagram of a distributed system for implementing an embodiment.

FIG. 14 depicts a simplified diagram of a distributed system 1400 for implementing an embodiment. In the illustrated embodiment, distributed system 1400 includes one or more client computing devices 1402, 1404, 1406, and 1408, coupled to a server 1412 via one or more communication networks 1410. Clients computing devices 1402, 1404, 1406, and 1408 may be configured to execute one or more applications.

In various embodiments, server 1412 may be adapted to run one or more services or software applications that enable execution of analytical queries as described above.

In certain embodiments, server 1412 may also provide other services or software applications that can include non-virtual and virtual environments. In some embodiments, these services may be offered as web-based or cloud services, such as under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in FIG. 14, server 1412 may include one or more components 1418, 1420 and 1422 that implement the functions performed by server 1412. These components may include software components that may be executed by one or more processors, hardware components, or combinations thereof. It should be appreciated that various different system configurations are possible, which may be different from distributed system 1400. The embodiment shown in FIG. 14 is thus one example of a distributed system for implementing an embodiment system and is not intended to be limiting.

Users may use client computing devices 1402, 1404, 1406, and/or 1408 to submit analytical queries in accordance with the teachings of this disclosure. A client device may provide an interface that enables a user of the client device to interact with the client device. The client device may also output information to the user via this interface. For example, query results may be output to a user via an interface provided by a client device. Although FIG. 14 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1410 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1412 can include one or more virtual machines running virtual operating systems, or other computing architectures involving virtualization such as one or more flexible pools of logical storage devices that can be virtualized to maintain virtual storage devices for the server. In various embodiments, server 1412 may be adapted to run one or more services or software applications that provide the functionality described in the foregoing disclosure.

The computing systems in server 1412 may run one or more operating systems including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more data repositories 1414, 1416. These data repositories may be used to store data and other information in certain embodiments. For example, one or more of the data repositories

1414, 1416 may be used to store database data, metadata, etc. Data repositories 1414, 1416 may reside in a variety of locations. For example, a data repository used by server 1412 may be local to server 1412 or may be remote from server 1412 and in communication with server 1412 via a network-based or dedicated connection. Data repositories 1414, 1416 may be of different types. In certain embodiments, a data repository used by server 1412 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1414, 1416 may also be used by applications to store application data. The data repositories used by applications may be of different types such as, for example, a key-value store repository, an object store repository, or a general storage repository supported by a file system.

Figure 15:
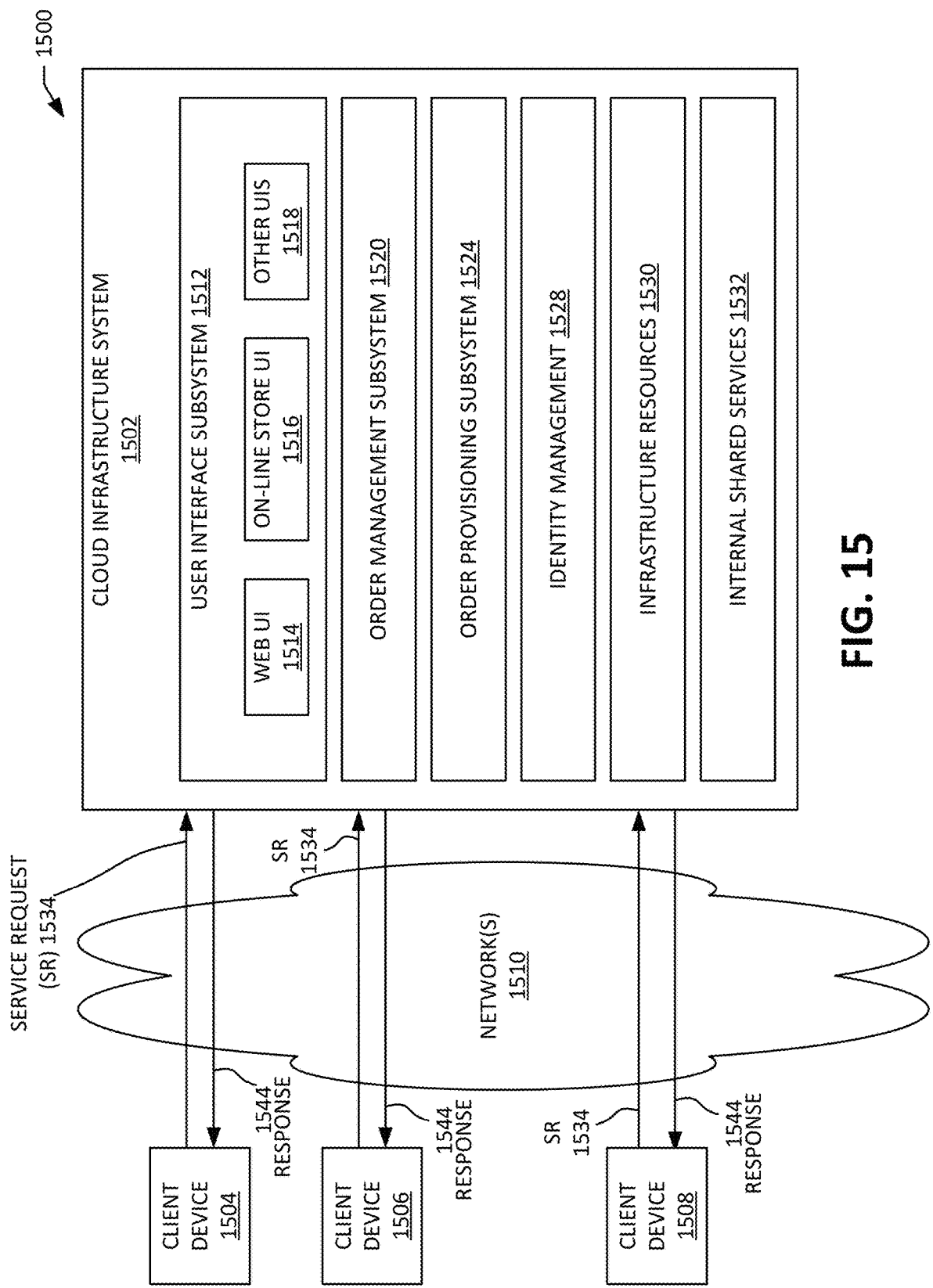
FIG. 15 is a simplified block diagram of a cloud-based system environment in accordance with certain embodiments.

In certain embodiments, the analytical platform provided functionalities described in this disclosure may be offered as services via a cloud environment. FIG. 15 is a simplified block diagram of a cloud-based system environment in which various services may be offered as cloud services, in accordance with certain embodiments. In the embodiment depicted in FIG. 15, cloud infrastructure system 1502 may provide one or more cloud services that may be requested by users using one or more client computing devices 1504, 1506, and 1508. Cloud infrastructure system 1502 may comprise one or more computers and/or servers that may include those described above for server 1412. The computers in cloud infrastructure system 1502 may be organized as general purpose computers, specialized server computers, server farms, server clusters, or any other appropriate arrangement and/or combination.

Network(s) 1510 may facilitate communication and exchange of data between clients 1504, 1506, and 1508 and cloud infrastructure system 1502. Network(s) 1510 may include one or more networks. The networks may be of the same or different types. Network(s) 1510 may support one or more communication protocols, including wired and/or wireless protocols, for facilitating the communications.

The embodiment depicted in FIG. 15 is only one example of a cloud infrastructure system and is not intended to be limiting. It should be appreciated that, in some other embodiments, cloud infrastructure system 1502 may have more or fewer components than those depicted in FIG. 15, may combine two or more components, or may have a different configuration or arrangement of components. For example, although FIG. 15 depicts three client computing devices, any number of client computing devices may be supported in alternative embodiments.

The term cloud service is generally used to refer to a service that is made available to users on demand and via a communication network such as the Internet by systems (e.g., cloud infrastructure system 1502) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1502. Cloud infrastructure system 1502 then performs processing to provide the services requested in the customer's subscription order. For example, system 1502 may services for servicing analytical queries as described in this disclosure. Cloud infrastructure system 1502 may be configured to provide one or even multiple cloud services.

Cloud infrastructure system 1502 may provide the cloud services via different deployment models. In a public cloud model, cloud infrastructure system 1502 may be owned by a third party cloud services provider and the cloud services are offered to any general public customer, where the customer can be an individual or an enterprise. In certain other embodiments, under a private cloud model, cloud infrastructure system 1502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1502 and the services provided may be shared by several organizations in a related community. Various other models such as hybrids of the above mentioned models may also be used.

Client computing devices 1504, 1506, and 1508 may be of different types (such as devices 1402, 1404, 1406, and 1408 depicted in FIG. 14) and may be capable of operating one or more client applications. A user may use a client device to interact with cloud infrastructure system 1502, such as to request a service provided by cloud infrastructure system 1502.

In some embodiments, the processing performed by cloud infrastructure system 1502 for providing cloud services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 15, cloud infrastructure system 1502 may include infrastructure resources 1530 that are utilized for facilitating the provision of various cloud services offered by cloud infrastructure system 1502. Infrastructure resources 1530 may include, for example, processing resources, storage or memory resources, networking resources, and the like.

In certain embodiments, to facilitate efficient provisioning of these resources for supporting the various cloud services provided by cloud infrastructure system 1502 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1502 may itself internally use services 1532 that are shared by different components of cloud infrastructure system 1502 and which facilitate the provisioning of services by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1502 may comprise multiple subsystems. These subsystems may be implemented in software, or hardware, or combinations thereof. As depicted in FIG. 15, the subsystems may include a user interface subsystem 1512 that enables users or customers of cloud infrastructure system 1502 to interact with cloud infrastructure system 1502. User interface subsystem 1512 may include various different interfaces such as a web interface 1514, an online store interface 1516 where cloud services provided by cloud infrastructure system 1502 are advertised and are purchasable by a consumer, and other interfaces 1518. For example, a customer may, using a client device, request (service request 1534) one or more services provided by cloud infrastructure system 1502 using one or more of interfaces 1514, 1516, and 1518. For example, a customer may access the online store, browse cloud services offered by cloud infrastructure system 1502, and place a subscription order for one or more services offered by cloud infrastructure system 1502 that the customer wishes to subscribe to. The service request may include information identifying the customer and one or more services that the customer desires to subscribe to.

In certain embodiments, such as the embodiment depicted in FIG. 15, cloud infrastructure system 1502 may comprise an order management subsystem (OMS) 1520 that is configured to process the new order. As part of this processing, OMS 1520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1520 may then invoke the order provisioning subsystem (OPS) 1524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1502 may send a response or notification 1544 to the requesting customer to indicate when the requested service is now ready for use. In some instances, information (e.g., a link) may be sent to the customer that enables the customer to start using and availing the benefits of the requested services.

Cloud infrastructure system 1502 may provide services to multiple customers. For each customer, cloud infrastructure system 1502 is responsible for managing information related to one or more subscription orders received from the customer, maintaining customer data related to the orders, and providing the requested services to the customer. Cloud infrastructure system 1502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1502 may provide services to multiple customers in parallel. Cloud infrastructure system 1502 may store information for these customers, including possibly proprietary information. In certain embodiments, cloud infrastructure system 1502 comprises an identity management subsystem (IMS) 1528 that is configured to manage customers information and provide the separation of the managed information such that information related to one customer is not accessible by another customer. IMS 1528 may be configured to provide various security-related services such as identity services, such as information access management, authentication and authorization services, services for managing customer identities and roles and related capabilities, and the like.

FIG. 16 illustrates an exemplary computer system 1600 that may be used to implement certain embodiments. For example, in some embodiments, computer system 1600 may be used to implement any of systems depicted in FIGS. 1A and 1B. As shown in FIG. 16, computer system 1600 includes various subsystems including a processing subsystem 1604 that communicates with a number of other subsystems via a bus subsystem 1602. These other subsystems may include a processing acceleration unit 1606, an I/O subsystem 1608, a storage subsystem 1618, and a communications subsystem 1624. Storage subsystem 1618 may include non-transitory computer-readable storage media including storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1604 controls the operation of computer system 1600 and may comprise one or more processors, application specific integrated circuits (ASICs), or field programmable gate arrays (FPGAs). The processors may include be single core or multicore processors. The processing resources of computer system 1600 can be organized into one or more processing units 1632, 1634, etc. A processing unit may include one or more processors, one or more cores from the same or different processors, a combination of cores and processors, or other combinations of cores and processors. In some embodiments, processing subsystem 1604 can include one or more special purpose co-processors such as graphics processors, digital signal processors (DSPs), or the like. In some embodiments, some or all of the processing units of processing subsystem 1604 can be implemented using customized circuits, such as application specific integrated circuits (ASICs), or field programmable gate arrays (FPGAs).

In some embodiments, the processing units in processing subsystem 1604 can execute instructions stored in system memory 1610 or on computer readable storage media 1622. In various embodiments, the processing units can execute a variety of programs or code instructions and can maintain multiple concurrently executing programs or processes. At any given time, some or all of the program code to be executed can be resident in system memory 1610 and/or on computer-readable storage media 1622 including potentially on one or more storage devices. Through suitable programming, processing subsystem 1604 can provide various functionalities described above. In instances where computer system 1600 is executing one or more virtual machines, one or more processing units may be allocated to each virtual machine.

In certain embodiments, a processing acceleration unit 1606 may optionally be provided for performing customized processing or for off-loading some of the processing performed by processing subsystem 1604 so as to accelerate the overall processing performed by computer system 1600.

I/O subsystem 1608 may include devices and mechanisms for inputting information to computer system 1600 and/or for outputting information from or via computer system 1600. In general, use of the term input device is intended to include all possible types of devices and mechanisms for inputting information to computer system 1600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1618 provides a repository or data store for storing information and data that is used by computer system 1600. Storage subsystem 1618 provides a tangible non-transitory computer-readable storage medium for storing the basic programming and data constructs that provide the functionality of some embodiments. Storage subsystem 1618 may store software (e.g., programs, code modules, instructions) that when executed by processing subsystem 1604 provides the functionality described above. The software may be executed by one or more processing units of processing subsystem 1604. Storage subsystem 1618 may also provide a repository for storing data used in accordance with the teachings of this disclosure.

Storage subsystem 1618 may include one or more non-transitory memory devices, including volatile and non-volatile memory devices. As shown in FIG. 16, storage subsystem 1618 includes a system memory 1610 and a computer-readable storage media 1622. System memory 1610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1600, such as during start-up, may typically be stored in the ROM. The RAM typically contains data and/or program modules that are presently being operated and executed by processing subsystem 1604. In some implementations, system memory 1610 may include multiple different types of memory, such as static random access memory (SRAM), dynamic random access memory (DRAM), and the like.

By way of example, and not limitation, as depicted in FIG. 16, system memory 1610 may load application programs 1612 that are being executed, which may include various applications such as Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1622 may store programming and data constructs that provide the functionality of some embodiments. Computer-readable media 1622 may provide storage of computer-readable instructions, data structures, program modules, and other data for computer system 1600. Software (programs, code modules, instructions) that, when executed by processing subsystem 1604 provides the functionality described above, may be stored in storage subsystem 1618. By way of example, computer-readable storage media 1622 may include non-volatile memory such as a hard disk drive, a magnetic disk drive, an optical disk drive such as a CD ROM, DVD, a Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1618 may also include a computer-readable storage media reader 1620 that can further be connected to computer-readable storage media 1622. Reader 1620 may receive and be configured to read data from a memory device such as a disk, a flash drive, etc.

In certain embodiments, computer system 1600 may support virtualization technologies, including but not limited to virtualization of processing and memory resources. For example, computer system 1600 may provide support for executing one or more virtual machines. In certain embodiments, computer system 1600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1600. Accordingly, multiple operating systems may potentially be run concurrently by computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to establish a communication channel to one or more client devices via the Internet for receiving and sending information from and to the client devices.

Communication subsystem 1624 may support both wired and/or wireless communication protocols. For example, in certain embodiments, communications subsystem 1624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

Communication subsystem 1624 can receive and transmit data in various forms. For example, in some embodiments, in addition to other forms, communications subsystem 1624 may receive input communications in the form of structured and/or unstructured data feeds 1626, event streams 1628, event updates 1630, and the like. For example, communications subsystem 1624 may be configured to receive (or send) data feeds 1626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1624 may be configured to receive data in the form of continuous data streams, which may include event streams 1628 of real-time events and/or event updates 1630, that may be continuous or unbounded in nature with no explicit end.

Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to communicate data from computer system 1600 to other computer systems or networks. The data may be communicated in various different forms such as structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1600 depicted in FIG. 16 is intended only as a specific example. Many other configurations having more or fewer components than the system depicted in FIG. 16 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. For example, while certain examples have been described using SQL queries, this is not intended to be limiting. In alternative embodiments, the teaching described herein can also be applied to queries other than SQL queries. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computing system, an original query plan generated for a query for querying data stored in a relational database, the original query plan comprising a first fact scan operation configured to scan fact records from a source of fact records, the original query plan further comprising a second operation configured to receive a set of records from the first fact scan operation;
   identifying, by the computing system, a first dimension context predicate condition to be associated with the first fact scan operation, wherein the first dimension context predicate condition corresponds to the first fact scan operation in an enhanced query plan that is configured to scan facts in one or more records of the source of fact records; and
   rewriting, by the computing system, the original query plan to generate the enhanced query plan, wherein, in the enhanced query plan, the first dimension context predicate condition is associated with the first fact scan operation, and the second operation receives only those one or more scanned fact records that satisfy the first dimension context predicate condition,
   wherein the enhanced query plan executes faster than the original query plan due to an association of the first dimension context predicate condition with the first fact scan operation.

2. The method of claim 1 wherein the data for querying is non-pre-aggregated data.

3. The method of claim 1 further comprising:
   executing the enhanced query plan to obtain a result set of records for the query; and
   providing the result set of records as a response to the query.

4. The method of claim 3 wherein the execution of the enhanced query plan takes fewer central processing unit (CPU) cycles than execution of the original query plan.

5. The method of claim 1 wherein a number of fact records received by and processed by the second operation is smaller in the enhanced query plan than in the original query plan.

6. The method of claim 1 wherein the identifying the first dimension context predicate condition to be associated with the first fact scan operation comprises:
identifying the first fact scan operation in the original query plan, the first fact scan operation operating on a first fact table; and
starting at the first fact scan operation, walking the original query plan to identify a list of one or more applicable dimension context predicate conditions for the first fact scan operation, the list of one or more applicable dimension context predicate conditions including the first dimension context predicate condition.

7. The method of claim 1 wherein the identifying the first dimension context predicate condition to be associated with the first fact scan operation comprises:
identifying, in the original query plan, the first fact scan operation operating on a first fact table;
identifying, in the original query plan, a second fact scan operation operating on a second fact table;
identifying, in the original query plan, a join operation between the second fact table and a dimension table, wherein the first dimension context predicate condition is associated with the dimension table; and
identifying a common dimension between the first fact table and the second fact table; and
wherein the first dimension context predicate condition is based upon an attribute from the common dimension.

8. The method of claim 1 wherein the identifying the first dimension context predicate condition to be associated with the first fact scan operation comprises:
identifying a plurality of dimension context predicate conditions applicable for the first fact scan operation;
computing a net benefit metric for each dimension context predicate condition in the plurality of dimension context predicate conditions, wherein the net benefit metric for a particular dimension context predicate condition in the plurality of dimension context predicate conditions is a measure of a reduction in a cost of processing fact rows from the source of fact records minus a cost of applying the particular dimension context predicate condition to the first fact scan operation;
ordering the plurality of dimension context predicate conditions for the first fact scan operation based upon net benefit metrics computed for the plurality of dimension context predicate conditions; and
selecting, from the plurality of dimension context predicate conditions, a dimension context predicate condition to be associated with the first fact scan operation based upon the ordering.

9. The method of claim 1 wherein the identifying the first dimension context predicate condition to be associated with the first fact scan operation comprises:
identifying an applicable dimension context predicate condition for the first fact scan operation;
computing a net benefit metric for the applicable dimension context predicate condition;
determining, based upon the net benefit metric computed for the applicable dimension context predicate condition that the applicable dimension context predicate condition is not to be associated with the first fact scan operation; and
inferring the first dimension context predicate condition from the applicable dimension context predicate condition using functional dependencies information.

10. The method of claim 1, wherein the source of fact records is a table storing fact records, a materialized view, or an online analytical processing (OLAP) index.

11. The method of claim 1 further wherein identifying the first dimension context predicate condition comprises:
identifying a third operation in the original query plan, wherein the first dimension context predicate condition is associated with the third operation.

12. The method of claim 11 wherein the third operation is associated with a dimension table.

13. The method of claim 1 further wherein identifying the first dimension context predicate condition comprises:
identifying a second dimension context predicate condition to be associated with the first fact scan operation; and
translating the second dimension context predicate condition to the first dimension context predicate condition.

14. The method of claim 13 wherein the translating comprises using functional dependencies information to translate the second dimension context predicate condition to the first dimension context predicate condition.

15. The method of claim 13 wherein the second dimension context predicate condition specifies a value for a first dimension field and the first dimension context predicate condition specifies a value for a second dimension field different from the first dimension field, wherein the second dimension field is a column field in a dimension table or in the source of fact records.

16. The method of claim 1 further comprising:
identifying a first sub-plan in the original query plan, the first sub-plan comprising the first fact scan operation, wherein the first sub-plan only comprises one or more aggregate, join, project, filter, or fact scan operations; and
wherein the enhanced query plan includes the first sub-plan with the first dimension context predicate condition being associated with the first fact scan operation.

17. The method of claim 1 further comprising:
determining, based upon a star schema, that the source of fact records is capable of being joined with a dimension table; and
wherein the first dimension context predicate condition includes a condition related to a dimension key in the dimension table to be joined with the source of fact records.

18. The method of claim 1 wherein:
the source of fact records is an OLAP index, the OLAP index comprising a table and an index indexing dimension values in the table;
the table comprises data resulting from joining a fact table storing fact records with a dimension table comprising the dimension values; and
the first dimension context predicate condition is evaluated against the dimension values in the OLAP index.

19. A non-transitory computer-readable memory storing a plurality of instructions executable by one or more processors, the plurality of instructions comprising instructions that when executed by the one or more processors cause the one or more processors to perform processing comprising:
receiving an original query plan generated for a query for querying data stored in a relational database, the original query plan comprising a first fact scan operation configured to scan fact records from a source of fact records, the original query plan further comprising a second operation configured to receive a set of records from the first fact scan operation;

identifying a first dimension context predicate condition to be associated with the first fact scan operation, wherein the first dimension context predicate condition corresponds to the first fact scan operation in an enhanced query plan that is configured to scan facts in one or more records of the source of fact records; and rewriting the original query plan to generate the enhanced query plan, wherein, in the enhanced query plan, the first dimension context predicate condition is associated with the first fact scan operation, and the second operation receives only those one or more scanned fact records that satisfy the first dimension context predicate condition;

executing the enhanced query plan to obtain a result set of records for the query, wherein the enhanced query plan executes faster than the original query plan due to an association of the first dimension context predicate condition with the first fact scan operation; and providing the result set of records as a response to the query.

20. A system comprising:

one or more processors; and a memory coupled to the one or more processors, the memory storing a plurality of instructions executable by the one or more processors, the plurality of instructions comprising instructions that when executed by the one or more processors cause the one or more processors to perform processing comprising:

receiving an original query plan generated for a query for querying data stored in a relational database, the original query plan comprising a first fact scan operation configured to scan fact records from a source of fact records, the original query plan further comprising a second operation configured to receive a set of records from the first fact scan operation;

identifying a first dimension context predicate condition to be associated with the first fact scan operation, wherein the first dimension context predicate condition corresponds to the first fact scan operation in an enhanced query plan that is configured to scan facts in one or more records of the source of fact records; and rewriting the original query plan to generate the enhanced query plan, wherein, in the enhanced query plan, the first dimension context predicate condition is associated with the first fact scan operation, and the second operation receives only those one or more scanned fact records that satisfy the first dimension context predicate condition;

executing the enhanced query plan to obtain a result set of records for the query, wherein the enhanced query plan executes faster than the original query plan due to an association of the first dimension context predicate condition with the first fact scan operation; and providing the result set of records as a response to the query.

* * * * *

UNITED STATES PATENT AND TRADEMARK OFFICE
CERTIFICATE OF CORRECTION

PATENT NO. : 11,036,735 B2
APPLICATION NO. : 16/248061
DATED : June 15, 2021
INVENTOR(S) : Butani It is certified that error appears in the above-identified patent and that said Letters Patent is hereby corrected as shown below:

In the Specification

In Column 24, Line 33, delete "other table" and insert -- OtherTable --, therefor.

In Column 24, Line 58, delete "fs.col2, in" and insert -- fs.col2, . . . in --, therefor.

In Column 26, Line 58, delete "'date="2000"'" and insert -- 'year="2000"' --, therefor.

In Column 26, Line 61, delete "state="Tennessee"'" and insert -- 'state="Tennessee"' --, therefor.

In Column 26, Line 61, delete "'date="2000")" and insert -- 'year="2000"') --, therefor.

In Column 27, Line 1, delete "'date="2000"'" and insert -- 'year="2000"' --, therefor.

In Column 32, Line 37, after "FS1" insert -- . --.

In Column 36, Line 66, delete "f3(on" and insert -- fs3(on --, therefor.

In Column 47, Line 35, delete "Enhanced ISA (EISA), in" and insert -- Extended ISA (EISA) --, therefor.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*